(12) United States Patent
Makinen et al.

(10) Patent No.: US 11,991,343 B2
(45) Date of Patent: May 21, 2024

(54) OPTICAL METHOD AND SYSTEM FOR LIGHT FIELD DISPLAYS BASED ON DISTRIBUTED APERTURES

(71) Applicant: InterDigital Madison Patent Holdings, SAS, Paris (FR)

(72) Inventors: Jukka-Tapani Makinen, Oulu (FI); Kai Ojala, Oulu (FI)

(73) Assignee: InterDigital Madison Patent Holdings, SAS, Paris (FR)

( * ) Notice: Subject to any disclaimer, the term of this patent is extended or adjusted under 35 U.S.C. 154(b) by 27 days.

(21) Appl. No.: 17/616,140

(22) PCT Filed: Jun. 5, 2020

(86) PCT No.: PCT/US2020/036341
§ 371 (c)(1),
(2) Date: Dec. 2, 2021

(87) PCT Pub. No.: WO2020/247763
PCT Pub. Date: Dec. 10, 2020

(65) Prior Publication Data
US 2022/0311990 A1 Sep. 29, 2022

Related U.S. Application Data

(60) Provisional application No. 62/870,858, filed on Jul. 5, 2019, provisional application No. 62/858,671, filed on Jun. 7, 2019.

(51) Int. Cl.
*H04N 13/305* (2018.01)
*H04N 13/366* (2018.01)
(52) U.S. Cl.
CPC ......... *H04N 13/305* (2018.05); *H04N 13/366* (2018.05)

(58) Field of Classification Search
CPC .... H04N 13/305; H04N 13/366; H04N 13/31; H04N 13/322; H04N 13/302;
(Continued)

(56) References Cited

U.S. PATENT DOCUMENTS 2,588,373 A   3/1952  Erban
4,210,391 A   7/1980  Cohen
(Continued)

FOREIGN PATENT DOCUMENTS

CA    2905147    9/2014
CN    1797175 A  7/2006
(Continued)

OTHER PUBLICATIONS

Erdenebat, Munkh-Uchral, et al., "Integral-Floating Display With 360 Degree Horizontal Viewing Angle". Journal of the Optical Society of Korea, vol. 16, Issue 4, Dec. 2012, pp. 365-371.
(Continued)

*Primary Examiner* — Tung T Vo
(74) *Attorney, Agent, or Firm* — Smadar Gefen

(57) ABSTRACT

Systems and methods are described for providing a 3D display, such as a light-field display. In some embodiments, a display device includes a light-emitting layer comprising an addressable array of light-emitting elements. An optical layer overlays the light-emitting layer. The optical layer includes a plurality of distributed lenses. In some embodiments, the distributed lenses include non-contiguous lens regions. In some embodiments, distributed lens regions with different optical centers are interlaced with one another. A spatial light modulator is operative to provide control over which lens regions transmit light from the light-emitting layer outside the display device. In some embodiments, the
(Continued)

use of interlaced and/or non-contiguous distributed lenses provides improved display resolution with a reduction in diffraction effects.

17 Claims, 46 Drawing Sheets

(58) Field of Classification Search
CPC .. H04N 13/349; H04N 13/363; H04N 13/398; G02B 30/29; G02B 3/08; G02B 3/0068
USPC .......................................................... 348/51
See application file for complete search history.

(56) References Cited

U.S. PATENT DOCUMENTS

| | | | |
|---|---|---|---|
| 4,452,509 A | 6/1984 | VanBreemen | |
| 5,083,854 A | 1/1992 | Zampolin | |
| 5,132,839 A | 7/1992 | Travis | |
| 5,392,140 A * | 2/1995 | Ezra | H04N 13/32 |
| | | | 348/E13.043 |
| 5,465,175 A | 11/1995 | Woodgate | |
| 5,742,262 A | 4/1998 | Tabata | |
| 6,064,424 A | 5/2000 | Van Berkel | |
| 6,118,584 A | 9/2000 | Van Berkel | |
| 6,201,565 B1 | 3/2001 | Balogh | |
| 6,369,954 B1 | 4/2002 | Berge | |
| 6,554,430 B2 | 4/2003 | Dorval | |
| 6,642,969 B2 | 11/2003 | Tew | |
| 6,665,100 B1 | 12/2003 | Klug | |
| 6,795,241 B1 * | 9/2004 | Holzbach | G02B 3/0056 |
| | | | 348/E13.028 |
| 6,919,900 B2 | 7/2005 | Wilt | |
| 6,999,071 B2 | 2/2006 | Balogh | |
| 7,161,729 B2 | 1/2007 | Kim | |
| 7,408,601 B1 | 8/2008 | Huang | |
| 7,446,733 B1 | 11/2008 | Hirimai | |
| 7,518,149 B2 | 4/2009 | Maaskant | |
| 7,573,491 B2 | 8/2009 | Hartkop | |
| 7,607,780 B2 | 10/2009 | Kim | |
| 7,701,637 B2 | 4/2010 | Redert | |
| 7,782,523 B2 | 8/2010 | Ishii | |
| 7,891,815 B2 | 2/2011 | Nayar | |
| 7,936,392 B2 | 5/2011 | Ng | |
| 7,961,182 B2 | 6/2011 | Tachi | |
| 7,962,033 B2 | 6/2011 | Georgiev | |
| 7,994,527 B2 | 8/2011 | Denbaars | |
| 8,047,660 B2 | 11/2011 | Penn | |
| 8,077,195 B2 | 12/2011 | Grobetamann | |
| 8,287,127 B2 | 10/2012 | Gao | |
| 8,328,360 B2 | 12/2012 | Gao | |
| 8,432,436 B2 | 4/2013 | Debevec | |
| 8,587,498 B2 | 11/2013 | Connor | |
| 8,823,702 B2 | 9/2014 | Smithwick | |
| 8,836,769 B2 | 9/2014 | Tsubaki | |
| 8,848,006 B2 | 9/2014 | Wetzstein | |
| 8,860,790 B2 * | 10/2014 | Ericson | H04N 13/128 |
| | | | 348/51 |
| 8,872,085 B2 | 10/2014 | Gruhlke | |
| 8,958,137 B2 | 2/2015 | Haussler | |
| 9,250,446 B2 | 2/2016 | Krijn | |
| 9,298,168 B2 | 3/2016 | Taff | |
| 9,304,387 B2 | 4/2016 | Park | |
| 9,383,562 B2 | 7/2016 | Hartell | |
| 9,383,587 B2 | 7/2016 | Balogh | |
| 9,405,124 B2 | 8/2016 | Hirsch | |
| 9,462,261 B2 | 10/2016 | Sung | |
| 9,519,153 B2 | 12/2016 | Robinson et al. | |
| 9,523,797 B2 | 12/2016 | Yun | |
| 9,560,342 B2 | 1/2017 | Cho | |
| 9,568,885 B2 | 2/2017 | Ang | |
| 9,664,914 B2 | 5/2017 | Gu | |
| 9,709,829 B2 | 7/2017 | Mcgrew | |
| 9,709,851 B2 | 7/2017 | Seo | |
| 10,154,252 B2 | 12/2018 | Yamagishi | |
| 10,394,036 B2 | 8/2019 | Hua | |
| 11,543,575 B2 * | 1/2023 | Redmond | G02B 5/32 |
| 11,546,574 B2 * | 1/2023 | Arieli | G02B 30/24 |
| 11,567,451 B2 * | 1/2023 | Song | G03H 1/02 |
| 11,681,359 B2 * | 6/2023 | Woodgate | G02B 30/33 |
| | | | 315/297 |
| 2001/0050813 A1 * | 12/2001 | Allio | G03B 35/24 |
| | | | 359/462 |
| 2002/0163482 A1 * | 11/2002 | Sullivan | H04N 13/395 |
| | | | 348/E13.058 |
| 2003/0112507 A1 | 6/2003 | Divelbiss | |
| 2003/0156077 A1 | 8/2003 | Balogh | |
| 2003/0176214 A1 | 9/2003 | Burak | |
| 2004/0135973 A1 | 7/2004 | Gustafsson | |
| 2005/0086766 A1 | 4/2005 | Fawcett, Jr. | |
| 2005/0094483 A1 | 5/2005 | Demers | |
| 2005/0180019 A1 | 8/2005 | Cho | |
| 2005/0190140 A1 | 9/2005 | Asahi | |
| 2006/0061846 A1 | 3/2006 | Sprague | |
| 2007/0035829 A1 * | 2/2007 | Woodgate | G02B 3/0037 |
| | | | 348/E13.044 |
| 2007/0109505 A1 * | 5/2007 | Kubara | G03B 21/10 |
| | | | 348/E13.058 |
| 2007/0139624 A1 | 6/2007 | Decusatis | |
| 2007/0171521 A1 | 7/2007 | Sugawara | |
| 2007/0247598 A1 | 10/2007 | Refai | |
| 2008/0007671 A1 | 1/2008 | Klenke | |
| 2008/0037120 A1 | 2/2008 | Koo | |
| 2008/0157412 A1 | 7/2008 | Kihara | |
| 2008/0204847 A1 | 8/2008 | Kamm | |
| 2008/0297593 A1 | 12/2008 | Debevec | |
| 2009/0225244 A1 | 9/2009 | Wang | |
| 2009/0316058 A1 * | 12/2009 | Huizinga | G02B 6/0053 |
| | | | 349/65 |
| 2010/0033788 A1 | 2/2010 | Xie | |
| 2010/0079584 A1 | 4/2010 | Sung | |
| 2010/0103486 A1 | 4/2010 | Kroll | |
| 2010/0157026 A1 | 6/2010 | Reichelt | |
| 2010/0214659 A1 | 8/2010 | Levola | |
| 2010/0232000 A1 | 9/2010 | Futterer | |
| 2011/0037953 A1 | 2/2011 | Nizani | |
| 2011/0128555 A1 | 6/2011 | Rotschild | |
| 2011/0149391 A1 * | 6/2011 | Brott | G02B 30/27 |
| | | | 359/463 |
| 2011/0211256 A1 * | 9/2011 | Connor | G09G 3/3473 |
| | | | 359/463 |
| 2011/0234770 A1 | 9/2011 | Zerrouk | |
| 2011/0242150 A1 | 10/2011 | Song | |
| 2011/0248987 A1 | 10/2011 | Mitchell | |
| 2012/0062991 A1 | 3/2012 | Krijn | |
| 2012/0105929 A1 | 5/2012 | Sung | |
| 2012/0140131 A1 | 6/2012 | Lanman | |
| 2012/0236403 A1 * | 9/2012 | Sykora | H04N 13/307 |
| | | | 359/463 |
| 2013/0128087 A1 | 5/2013 | Georgiev | |
| 2013/0222384 A1 | 8/2013 | Futterer | |
| 2014/0028663 A1 | 1/2014 | Smithwick | |
| 2014/0043460 A1 | 2/2014 | Hartell | |
| 2014/0063077 A1 | 3/2014 | Wetzstein | |
| 2014/0347361 A1 | 11/2014 | Alpaslan | |
| 2015/0033539 A1 | 2/2015 | El-Ghoroury | |
| 2015/0056561 A1 | 2/2015 | Ang | |
| 2015/0097756 A1 | 4/2015 | Ziarati | |
| 2016/0014398 A1 | 1/2016 | Kroon | |
| 2016/0116752 A1 | 4/2016 | Wu | |
| 2016/0150225 A1 | 5/2016 | Kurashige | |
| 2016/0161752 A1 | 6/2016 | Negoita | |
| 2016/0313556 A1 | 10/2016 | Futterer | |
| 2016/0320615 A1 * | 11/2016 | Nakamura | G02B 27/0961 |
| 2016/0370695 A1 | 12/2016 | Miyasaka | |
| 2016/0378062 A1 * | 12/2016 | Watanabe | G03H 1/2294 |
| | | | 359/9 |
| 2017/0010473 A1 | 1/2017 | Ide | |
| 2017/0023708 A1 * | 1/2017 | Zhou | H04N 13/305 |
| 2017/0045764 A1 | 2/2017 | Gere | |
| 2017/0102545 A1 | 4/2017 | Hua | |
| 2017/0108704 A1 | 4/2017 | Ishida | |
| 2017/0129272 A1 | 5/2017 | Rich | |

(56) References Cited

U.S. PATENT DOCUMENTS

| | | | |
|---|---|---|---|
| 2017/0276957 A1 | 9/2017 | Matsuki | |
| 2017/0315371 A1 | 11/2017 | Johnson | |
| 2017/0371076 A1 | 12/2017 | Hua | |
| 2018/0308401 A1 | 10/2018 | French | |
| 2019/0045174 A1* | 2/2019 | Grover | H04N 13/307 |
| 2019/0086706 A1 | 3/2019 | Robinson | |
| 2019/0139472 A1* | 5/2019 | Liu | G02B 26/004 |
| 2020/0142355 A1* | 5/2020 | An | G03H 1/2294 |
| 2020/0363772 A1* | 11/2020 | Popov | G03H 1/2202 |
| 2020/0371378 A1 | 11/2020 | Makinen | |
| 2021/0026298 A1* | 1/2021 | Song | G03H 1/0808 |
| 2021/0041718 A1 | 2/2021 | Balogh | |
| 2021/0223568 A1 | 7/2021 | Makinen | |

FOREIGN PATENT DOCUMENTS

| | | |
|---|---|---|
| CN | 1860403 A | 11/2006 |
| CN | 101123735 A | 2/2008 |
| CN | 101209583 A | 7/2008 |
| CN | 101855902 A | 10/2010 |
| CN | 102450026 A | 5/2012 |
| CN | 102768410 A | 11/2012 |
| CN | 102854630 | 1/2013 |
| CN | 103529554 A | 1/2014 |
| CN | 104756494 A | 7/2015 |
| CN | 104769485 A | 7/2015 |
| CN | 105929547 A | 9/2016 |
| CN | 106164748 A | 11/2016 |
| CN | 106569381 A | 4/2017 |
| CN | 106773589 | 5/2017 |
| CN | 106940483 A | 7/2017 |
| CN | 107783304 A | 3/2018 |
| CN | 109164618 A | 1/2019 |
| CN | 109643082 A | 4/2019 |
| CN | 111065957 | 4/2020 |
| EP | 0797784 A1 | 10/1997 |
| EP | 0635138 B1 | 12/1997 |
| EP | 0961502 A2 | 12/1999 |
| EP | 1069454 A1 | 1/2001 |
| EP | 1447703 A1 | 8/2004 |
| EP | 2045648 B1 | 4/2009 |
| GB | 2403815 A | 1/2005 |
| JP | 3623265 B2 | 6/1996 |
| JP | H08166556 A | 6/1996 |
| JP | 2003005129 | 1/2003 |
| JP | 2005078000 | 3/2005 |
| JP | 2007017536 A | 1/2007 |
| JP | 2011002663 A | 1/2011 |
| JP | 2014130305 A | 7/2014 |
| JP | 2015079194 A | 4/2015 |
| JP | 2017173486 A | 9/2017 |
| WO | 1993021548 A1 | 10/1993 |
| WO | 9618925 | 6/1996 |
| WO | 0144858 A2 | 6/2001 |
| WO | 02059691 | 8/2002 |
| WO | 2005011292 | 2/2005 |
| WO | 2005086766 A2 | 9/2005 |
| WO | 2005094483 A2 | 10/2005 |
| WO | 2008142156 | 11/2008 |
| WO | 2011014743 | 2/2011 |
| WO | 2011149641 | 12/2011 |
| WO | 2012025786 | 3/2012 |
| WO | 2012062681 A1 | 5/2012 |
| WO | 2013163468 A1 | 10/2013 |
| WO | 2014033484 | 3/2014 |
| WO | 2014063716 A1 | 5/2014 |
| WO | 2016004998 A1 | 1/2016 |
| WO | 2015077718 A9 | 6/2016 |
| WO | 2016135434 | 9/2016 |
| WO | 2016140851 | 9/2016 |
| WO | 2017005614 A1 | 1/2017 |
| WO | 2017046372 A1 | 3/2017 |
| WO | 2017055894 | 4/2017 |
| WO | 2017062289 A1 | 4/2017 |
| WO | 2018014048 A2 | 1/2018 |
| WO | WO2019040484 A | 2/2019 |
| WO | 2019089283 A1 | 5/2019 |
| WO | WO2019107901 A | 6/2019 |

OTHER PUBLICATIONS

Xia, Xinxing, et al., "A 360-degree floating 3D display based on light field regeneration", Optical Society of America, vol. 21, No. 9, May 2013, 11 pages.

International Preliminary Report on Patentability for PCT/US2018/047313 dated Feb. 25, 2020, 7 pages.

Kim, N. et al. "Advances in the light field displays based on integral imaging and holographic techniques." Chinese Optics Letters 12, No. 6: 060005. Jun. 10, 2014. (5 pages).

Jianshe, M. et al. "Holographic Display System of Digital Micro-Mirror Devices Based on LED Light Source." Acta Optica Sinica vol. 36, No. 7: 0709001 Jul. 2016 (7 pages).

Katal, Goldy et al., "Digital Light Processing and its Future Applications". International Journal of Scientific and Research Publications, vol. 3 Issue 4, Apr. 2013, pp. 1-8.

International Search Report and Written Opinion of the International Searching Authority for PCT/US2018/057147 dated Feb. 1, 2019, 12 pages.

Weitao, Song et. al., "Design of Light Field Head-Mounted Display", Visual Communications and Image Processing, vol. 9293, Dec. 17, 2014, pp. 92930J-92930J.

International Search Report and Written Opinion of the International Searching Authority for PCT/US2019/018018 dated Apr. 26, 2019, 11 pages.

Lim, Yongjun, et. al., "360-Degree Tabletop Electronic Holographic Display". Optics Express, vol. 24, Issue 22, Oct. 31, 2016, pp. 24999-25009.

Waldis, Severin, et. al., "Uniform Tilt-Angle Micromirror Array for Multi Object Spectroscopy". Proceedings of SPIE, MOEMS and Miniaturized Systems VI, vol. 6466, p. 646603, (2007), 12 pages.

Urey, Hakan, "Diffractive Exit-Pupil Expander for Display Applications". Applied Optics, vol. 40, No. 32, Nov. 10, 2001, pp. 5840-5851.

Toussaint, Kimani C., et. al., "Generation of Optical Vector Beams with a Diffractive Optical Element Interferometer". Optics Letters vol. 30, Issue 21, Nov. 1, 2005, pp. 2846-2848.

Burvall, Anna, et. al., "Telephoto Axicon". Proceedings of SPIE, vol. 5962, Optical Design and Engineering II, (2005), 8 pages.

Flores, Angel, et. al., "Achromatic Hybrid Refractive-Diffractive Lens with Extended Depth of Focus". Applied Optics vol. 43, Issue 30, (2004), pp. 5618-5630.

Marrella, Alessandro et al., "Privacy-Preserving Outsourcing of Pattern Mining of Event-Log Data—an Use-Case from Process Industry". IEEE International Conference on Cloud Computing Technology and Science (CloudCom), (2016), pp. 545-551.

Zhang, Yan, et. al., "Multi-View Autostereoscopic 3D Display". International Conference on Optics, Photonics and Energy Engineering (OPEE), IEEE, vol. 1, (2010) pp. 58-61.

Yan, Jun, et. al., "Autostereoscopic Three-Dimensional Display Based on a Micromirror Array". Applied Optics, vol. 43, Issue 18, (2004), pp. 3686-3696.

Wu, L., et. al., "A Large-Aperture, Piston-Tip-Tilt Micromirror for Optical Phase Array Applications". IEEE 21st International Conference on Micro Electro Mechanical Systems, (2008), pp. 754-757.

Jia, Kemiao, et al., "High-Fill-Factor Micromirror Array with Hidden Bimorph Actuators and Tip-Tilt-Piston Capability". Journal of Microelectromechanical Systems, vol. 20, Issue 3, (2011), pp. 573-582.

Braga-Mele, Rosa, et. al., "Multifocal Intraocular Lenses: Relative Indications and Contraindications for Implantation". Journal of Cataract & Refractive Surgery, vol. 40, No. 2, (2014), pp. 313-322.

Findl, Oliver, "Intraocular Lens Materials and Design". Chapter 12 in Achieving Excellence in Cataract Surgery, a Step-by-Step Approach (edited by Michael Colvard, MD, FACS), (2009), pp. 95-108.

Kololuoma, Terho K., et. al., "Fabrication and Characterization of Hybrid-Glass-Based Axicons" Optical Engineering, vol. 41, No. 12, (2002), pp. 3136-3141.

(56) References Cited

OTHER PUBLICATIONS

Jesacher, Alexander, et., al., "Multi-Focal Light Microscopy Using Liquid Crystal Spatiallight Modulators". IEEE International Symposium on Optomechatronic Technologies, (2012), pp. 1-2.

International Preliminary Report on Patentability for PCT/US2018/057147 dated May 5, 2020, 8 pages.

International Preliminary Report on Patentability for PCT/US2019/018018 dated on Aug. 27, 2020, 8 pages.

International Search Report and Written Opinion of the International Searching Authority for PCT/US2019/047761 dated Nov. 15, 2019, 13 pages.

Geng, Jason, "Three-Dimensional Display Technologies". Advances in Optics and Photonics, vol. 5, No. 4, Nov. 22, 2013, p. 497.

Wetzstein, Gordon, et. al. "Tensor Displays: Compressive Light Field Synthesis using Multilayer Displays with Directional Backlighting". ACM Transactions on Graphics, vol. 31, No. 4, Article 80, Jul. 2012, pp. 1-11.

Wacyk, Ihor, et. al., "Ultra-High Resolution and High-Brightness AMOLED". Proceedings of SPIE vol. 8383, (2012), pp. 1-14.

Business Wire, "Kopin Debuts Lightning OLED Microdisplay With 2k×2k Resolution for Mobile VR at 2017 CES". Business Wire Press Release, available at: https://www.businesswire.com/news/home/20170104005430/en/, Jan. 4, 2017, 6 pages.

International Preliminary Report on Patentability for PCT/US2019/047761 dated Mar. 2, 2021, 9 pages.

Feather, G., et al., "The digital micromirror device for projection display." In Proceedings IEEE International Conference on Wafer Scale Integration, International Conference on Water Scale Integration (ICWSI), IEEE, 1995, pp. 43-51 (9 pages).

Dudley, D. et al., "Emerging digital micromirror device (DMD) applications." In MOEMS display and imaging systems, International Society for Optics and Photonics, 2003, vol. 4985, pp. 14-25 (12 pages).

Hornbeck, L. J. "Current status of the digital micromirror device (DMD) for projection television applications." In Proceedings of IEEE International Electron Devices Meeting, . IEEE, 1993, pp. 381-384 (4 pages).

International Search Report and Written Opinion of the International Searching Authority for PCT/US2020/039334 dated Nov. 30, 2020, 16 pages.

Invitation to Pay Additional Fees and, Where Applicable, Protest Fee, for PCT/US2020/039334 dated Oct. 9, 2020, 9 pages.

International Preliminary Report on Patentability for PCT/US2020/039334 dated Dec. 28, 2021, 11 pages.

Chen, H., et al., "A Low Voltage Liquid Crystal Phase Grating With Switchable Diffraction Angles." Scientific Reports vol. 7, Article 39923, Jan. 2017 (8 pages).

Ma, Y., et al., "Fast switchable ferroelectric liquid crystal gratings with two electro-optical modes." AIP Advances 6, No. 3, 035207, 2016 (11 pages).

Moheghi, A., et al,. "PSCT for switchable transparent liquid crystal displays." In SID Symposium Digest of Technical Papers, 54.3, 2015, pp. 817-820 (4 pages).

Ma, J. et al., "Bistable polymer stabilized cholesteric texture light shutter." Applied Physics Express 3, No. 2 (2010): 021702 (3 pages).

Yamaguchi, R., et al., "Normal and Reverse Mode Light Scattering Properties in Nematic Liquid Crystal Cell Using Polymer Stabilized Effect." Journal of Photopolymer Science and Technology vol. 28, No. 3 (2015): 319-323 (5 pages).

Hassanein, G. N. "Optical tuning of polymer stabilized liquid crystals refractive index." J. Laser Opt. Photonics vol. 5, No. 2, 2018 (5 pages).

Butt, H., et al., "Electrically tunable scattering from devitrite-liquid crystal hybrid devices." Advanced Optical Materials 5, No. 1 (2017): 1600414 (17 pages).

Jia, J. et al., ia, "A scalable diffraction-based scanning 3D colour video display as demonstrated by using tiled gratings and a vertical diffuser." Scientific reports 7, No. 1, 2017 (9 pages).

SeeFront "true 3D no glasses" Apr. 2018 (6 pages).

International Search Report and Written Opinion of the International Searching Authority for PCT/US2020/036341, dated Sep. 18, 2020, 10 pages.

International Preliminary Report on Patentability for PCT/US2020/036341 dated Dec. 16, 2021 (8 pages).

Lee, V. W., et al., "Micro-LED technologies and applications." Information Display 32, No. 6 2016 pp. 16-23 (8 pages).

Templier, François, et. al. "A Novel Process for Fabricating High-Resolution and Very Small Pixel-pitch GaN LED Microdisplays". SID Symposium Digest of Technical Papers, vol. 48, No. 1, (2017), pp. 268-271 (4 pages).

Qin, Z., et al., "Image formation modeling and analysis of near-eye light field displays." Journal of the Society for Information Display 27, No. 4, 2019 (6 pages).

Maznev, A. A., et al., "Upholding the diffraction limit in the focusing of light and sound." Wave Motion 68, 2017 (14 pages).

Peng, X., et al., "Randomized apertures: high resolution imaging in far field." Optics express vol. 25, No. 15, Jul. 2017, 18296-18313 (18 pages).

Smith, Neil R., et al. "Agile wide-angle beam steering with electrowetting microprisms". Optics Express, vol. 14, No. 14, pp. 6557-6563, Jul. 10, 2006 (7 pages).

Kim, Junoh, et al. "Electro-wetting lenticular lens with improved diopter for 2D and 3D conversion using lensshaped ETPTA chamber". Optics Express, vol. 26, No. 15, pp. 19614-19626, Jul. 23, 2018 (13 pages).

Wang, Hongjuan, et al. "Large-aperture transparent beam steering screen based on LCMPA". Applied Optics, vol. 55, No. 28, pp. 7824-7829, Oct. 1, 2016 (7 pages).

McManamon, Paul F., et al. "A review of phased array steering for narrow-band electrooptical systems." Proceedings of the IEEE, vol. 97, No. 6, 2009, pp. 1078-1096 (19 pages).

Shang, Xiaobing, et al. "Fast switching cholesteric liquid crystal optical beam deflector with polarization Independence". Scientific Reports, vol. 7, No. 1, 2017 (8 pages).

Huang, Yi-Pai, et al. "Autostereoscopic 3D Display with Scanning Multi-electrode Driven Liquid Crystal (MeD-LC) Lens". 3D Research, vol. 1, No. 1, pp. 39-42, 2010 (4 pages).

Zhang, Xiangyu, et. al., "A Novel Spatio-Temporal Multiplexing Multi-View 3D Display." Conference on Lasers and Electro-Optics, Pacific Rim, Optical Society of America, 2017 (4 pages).

Xia, Xinxing, et al. "Time-multiplexed multi-view three-dimensional display with projector array and steering screen". Optics Express, vol. 26, No. 12, pp. 15528-15538, Jun. 11, 2018 (11 pages).

Mishra, Kartikeya, et al. "Recent Developments in Optofluidic Lens Technology". Micromachines, vol. 7, 102, 2016 (24 pages).

Love, Gordon D., et al., "High-Speed Switchable Lens Enables the Development of a Volumetric Stereoscopic Display". Optics Express, vol. 17, No. 18, Aug. 31, 2009, pp. 15716-15725.

Matsuda, Nathan, et al. "Focal surface displays." ACM Transactions on Graphics (TOG), 2017, vol. 36, No. 4, pp. 1-14 (14 pages).

Commander, L. G., S. E. Day, and D. R. Selviah. "Variable focal length microlenses." Optics communications 177, Apr. 2000, pp. 157-170 (14 pages).

Lee, Vincent W., et al., "Micro-LED Technologies and Applications". Information Display, vol. 6, No. 16, (2016), pp. 16-23.

Sheng Liu, et al., "Time-multiplexed dual-focal plane head-mounted display with a liquid lens", Optics Letters vol. 34, No. 11, Jun. 1, 2009, published on May 21, 2009.

Lee, Vincent W., et al., "Micro-LED Technologies and Applications". Information Display, vol. 32, No. 6, (2016), pp. 16-23.

Templier, François, et. al. "A Novel Process for Fabricating High-Resolution and Very Small Pixel-pitch GaN LED Microdisplays". SID Symposium Digest of Technical Papers, vol. 48, No. 1, (2017), pp. 268-271.

Batbayar, Densmaa, et. al. "Point Light Source Display With a Large Viewing Angle Using Multiple Illumination Sources". Optical Engineering, vol. 56, No. 5, Article 053113, May 2017, pp. 1-5.

Jones, Andrew, et. al., "Rendering for an Interactive 360° Light Field Display". In SIGGRAPH papers, Article No. 40, (2007), 10 pages.

(56) References Cited

OTHER PUBLICATIONS

Hirsch Matthew, et al., "A Compressive Light Field Projection System". ACM Transactions on Graphics 33(4), (2014), pp. 1-12.
Wetzstein, Gordon, et. al., "Layered 3D: Tomographic Image Synthesis for Attenuation-Based Light Field and High Dynamic Range Displays". ACM Transactions on Graphics, vol. 30, No. 4, Article 95, Jul. 2011, pp. 1-11.
Traub, Alan C., "Stereoscopic Display Using Rapid Varifocal Mirror Oscillations". Applied Optics vol. 6, Issue 6, Jun. 1967, pp. 1085-1087.
Wallace, John, "Highly Flexible OLED Light Source Has 10 Micron Bend Radius". Laser Focus World, Web Article available at: http://www.laserfocusworld.com/articles/2013/07/highly-flexible-oled-light-source-has-10-micron-bend-radius.html, Jul. 31, 2013, 2 pages.
"Meet HOLOFLEX, World's First Holographic Flexible Smartphone". Gadgets Now, Web Article available at: http://www.gadgetsnow.com/mobiles/Meet-HoloFlex-worlds-first-holographic-flexible-smartphone/articleshow/52185503.cms, May 9, 2016, 2 pages.
Andrew Dalton, "The HoloFlex is a flexible, glasses-free 3D display", Gadgetry, May 5, 2016.
International Search Report and Written Opinion of the International Searching Authority for PCT/US2018/028949 dated Jul. 4, 2018.
International Preliminary Report on Patentability for PCT/US2018/028949 dated Oct. 29, 2019, 7 pages.
Sullivan, Alan, "A solid-state multi-planar volumetric display". SID Symposium Digest of Technical Papers vol. 34, Issue 1, (2003), pp. 1531-1533.
Smalley, D. E., et. al., "Anisotropic Leaky-Mode Modulator for Holographic Video Displays". Macmillan Publishers Limited, Nature, vol. 498, Jun. 20, 2013, pp. 313-317.
Akeley, Kurt, et. al. "A Stereo Display Prototype with Multiple Focal Distances". ACM transactions on graphics (TOG), 23(3), (2004) pp. 804-813.
Huang, Fu-Chung, "The Light Field Stereoscope: Immersive Computer Graphics via Factored Near-Eye Light Field Displays with Focus Cues". ACM SIGGRAPH, Transactions on Graphics, vol. 33, No. 5, (2015).

Takaki, Yasuhiro, et. al. "High-Density Directional Display for Generating Natural Three-Dimensional Images". Proceedings of the IEEE, vol. 94, No. 3, Mar. 2006, pp. 654-663.
Maimone, Andrew, et al., "Focus 3D: Compressive Accommodation Display". ACM Transactions on Graphics, vol. 32, No. 5, Article 153, Sep. 2013, pp. 1-13.
Jasper Display Corporation, "2014 NAB JDC Announced 4K2K LCoS with Associated Controller for Future Home Solutions". Jasper Display Corporation Press Release, Apr. 3, 2014, 3 pages.
Hoffman, David, M., et. al., "Vergence-Accommodation Conflicts Hinder Visual Performance and Cause Visual Fatigue". Journal of Vision, vol. 8, No. 33., (2008), pp. 1-30.
Reichelt, Stephan, et. al., "Holographic 3-D Displays—Electro-Holography Within the Grasp of Commercialization". Advances in Lasers and Electro Optics, book edited by Nelson Costa and Adolfo Cartaxo, Apr. 2010, pp. 683-710.
Fattal, David, et. al., "A Multi-Directional Backlight for a Wide-Angle, Glasses-Free Three-Dimensional Display". Nature, vol. 495, Mar. 21, 2013, pp. 348-351.
Bimber, Oliver, et. al., "The Visual Computing of Projector-Camera Systems". EUROGRAPHICS, STAR—State of the Art Report, (2007), 25 pages.
Texas Instruments, "DLP7000 DLP 0.7 XGA 2x LVDS Type A DMD". DLP7000 product description, DLPS026E, May 2017, 51 pages.
Geng, Jason, "Design of a Single Projector Multiview 3D Display System". Emerging Digital Micromirror Device Based Systems and Applications VI, vol. 8979, 89790K, Mar. 7, 2014, 15 pages.
Balogh, Tibor., et al., "The Holovizio System-New Opportunity Offered by 3D Displays". Proceedings of the TMCE, Apr. 2008, pp. 1-11.
Wikipedia, "Volumetric Display". Wikipedia web article, updated on Jul. 17, 2017, available at: https://en.wikipedia.org/w/index.php?title=Volumetric_display&oldid=790957389.
International Search Report and Written Opinion of the International Searching Authority for PCT/US2018/047313 dated Nov. 29, 2018.
Jones, Andrew, et al., "An Interactive 360° Light Field Display", USC Centers for Creative Technology, (2007), 4 pages.

\* cited by examiner

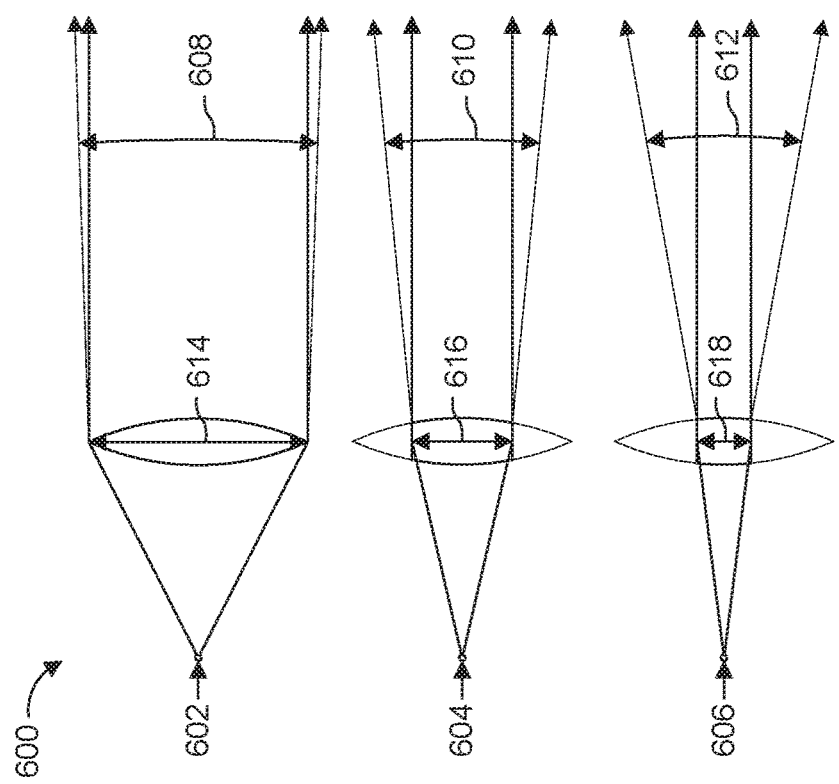
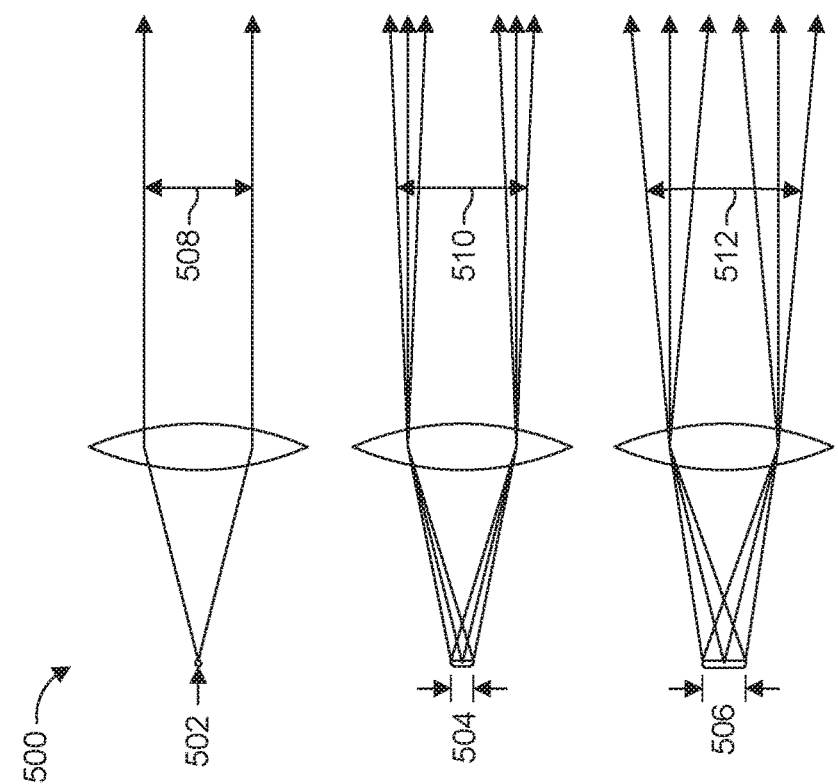
FIG. 4B
FIG. 4A

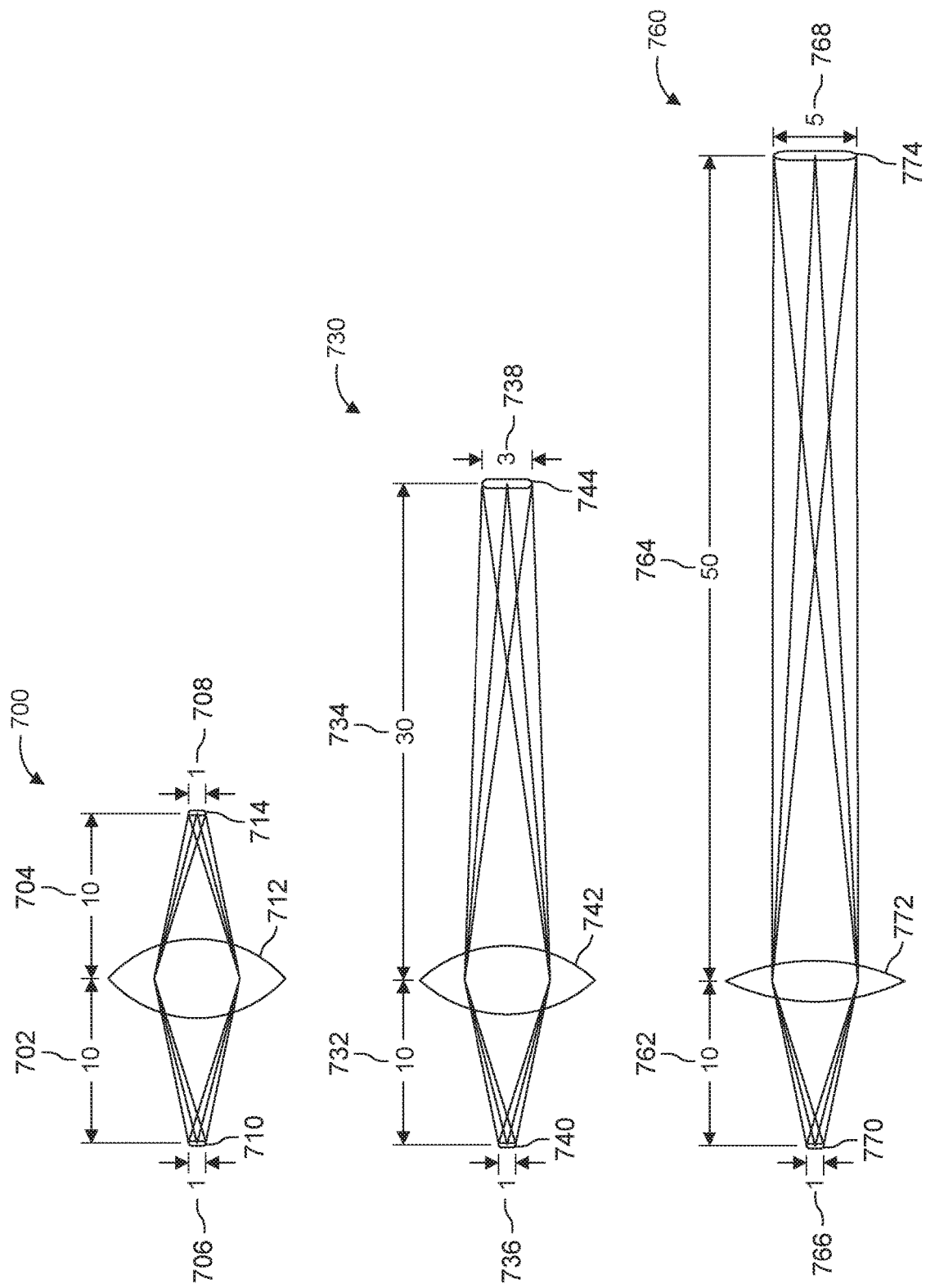

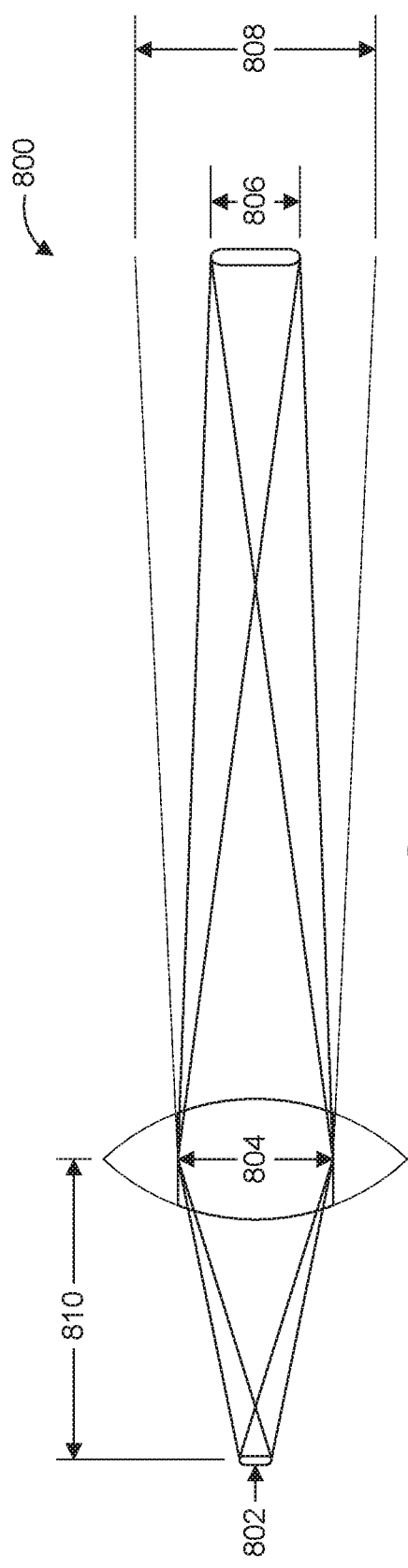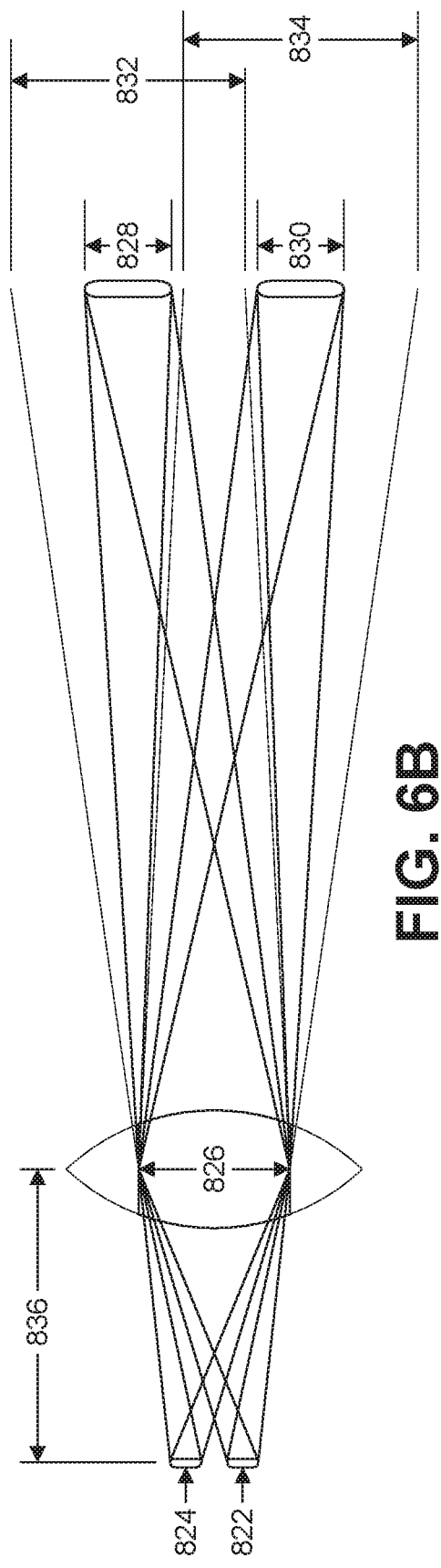

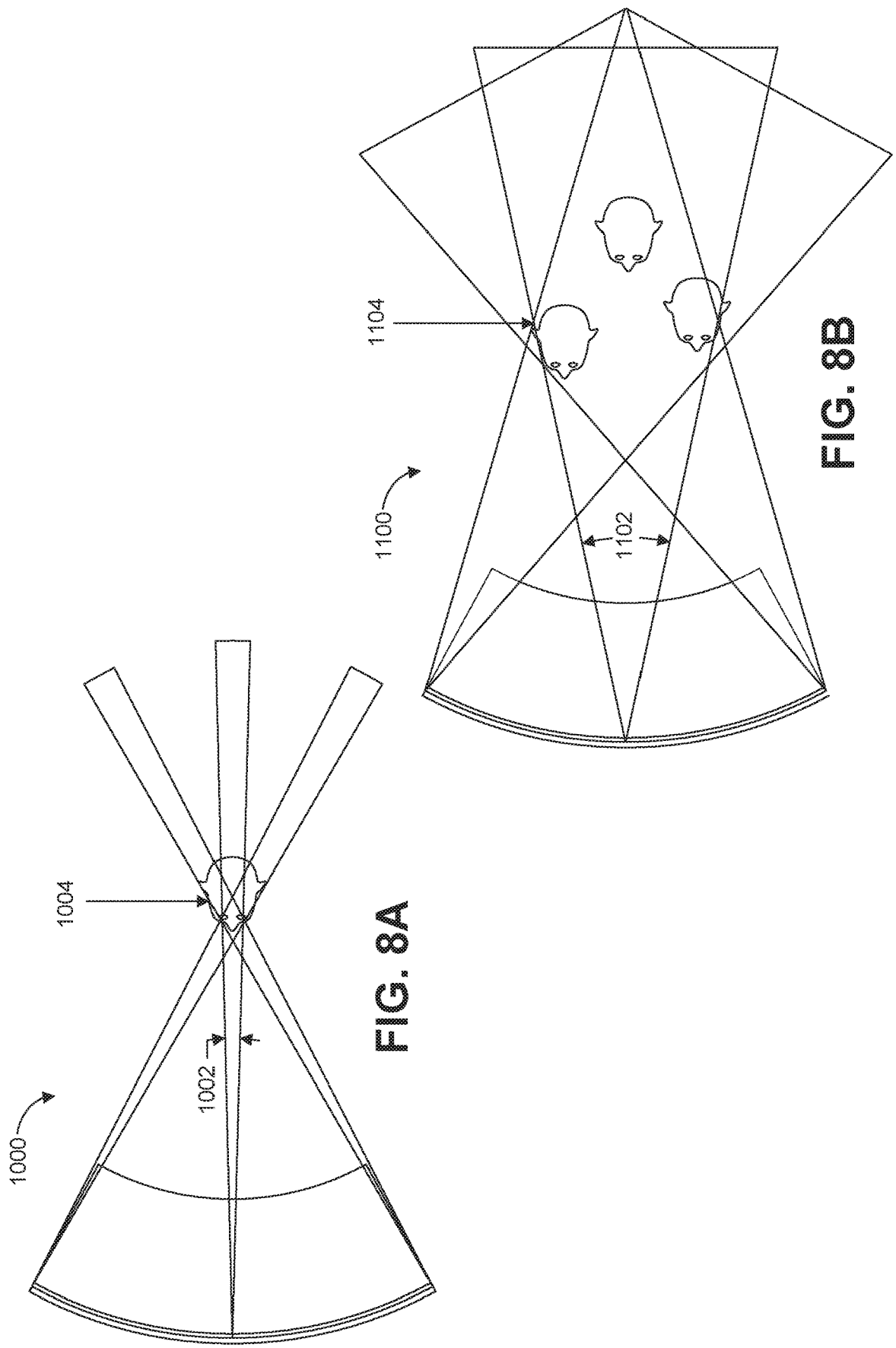

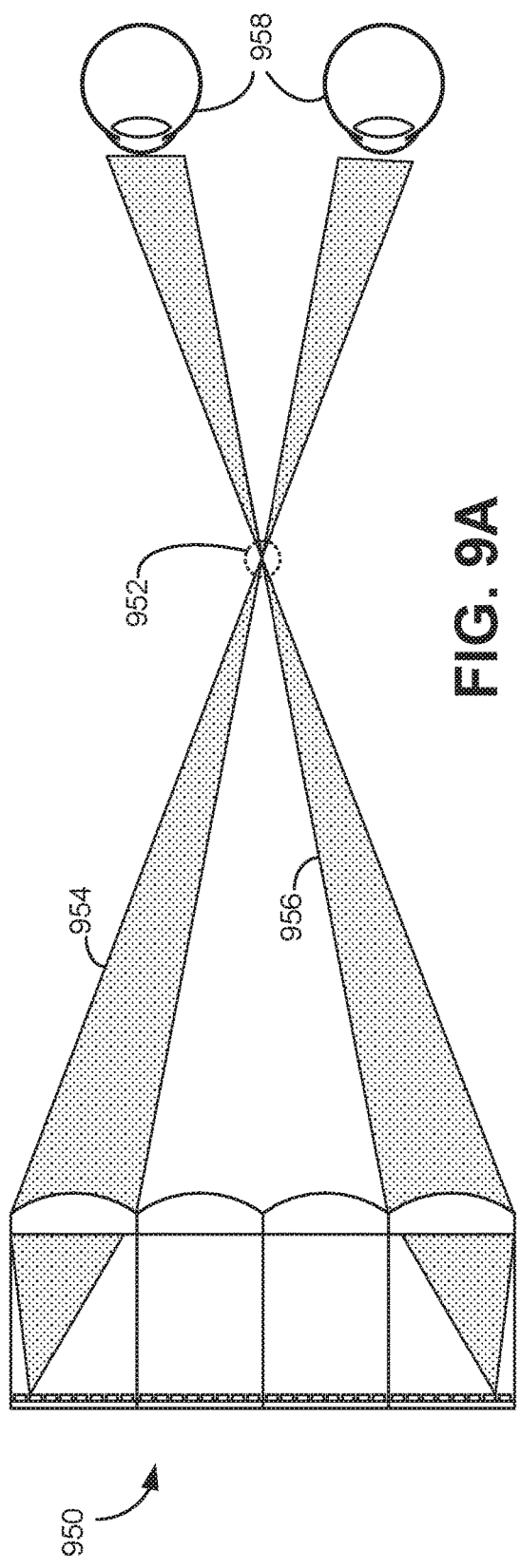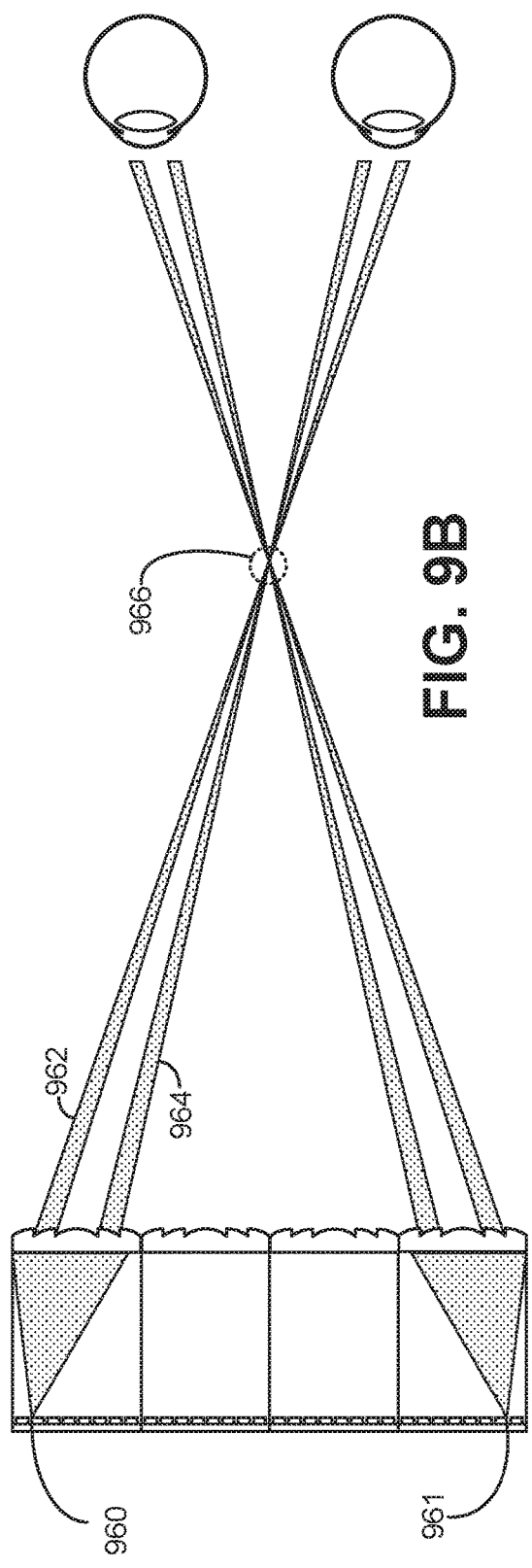

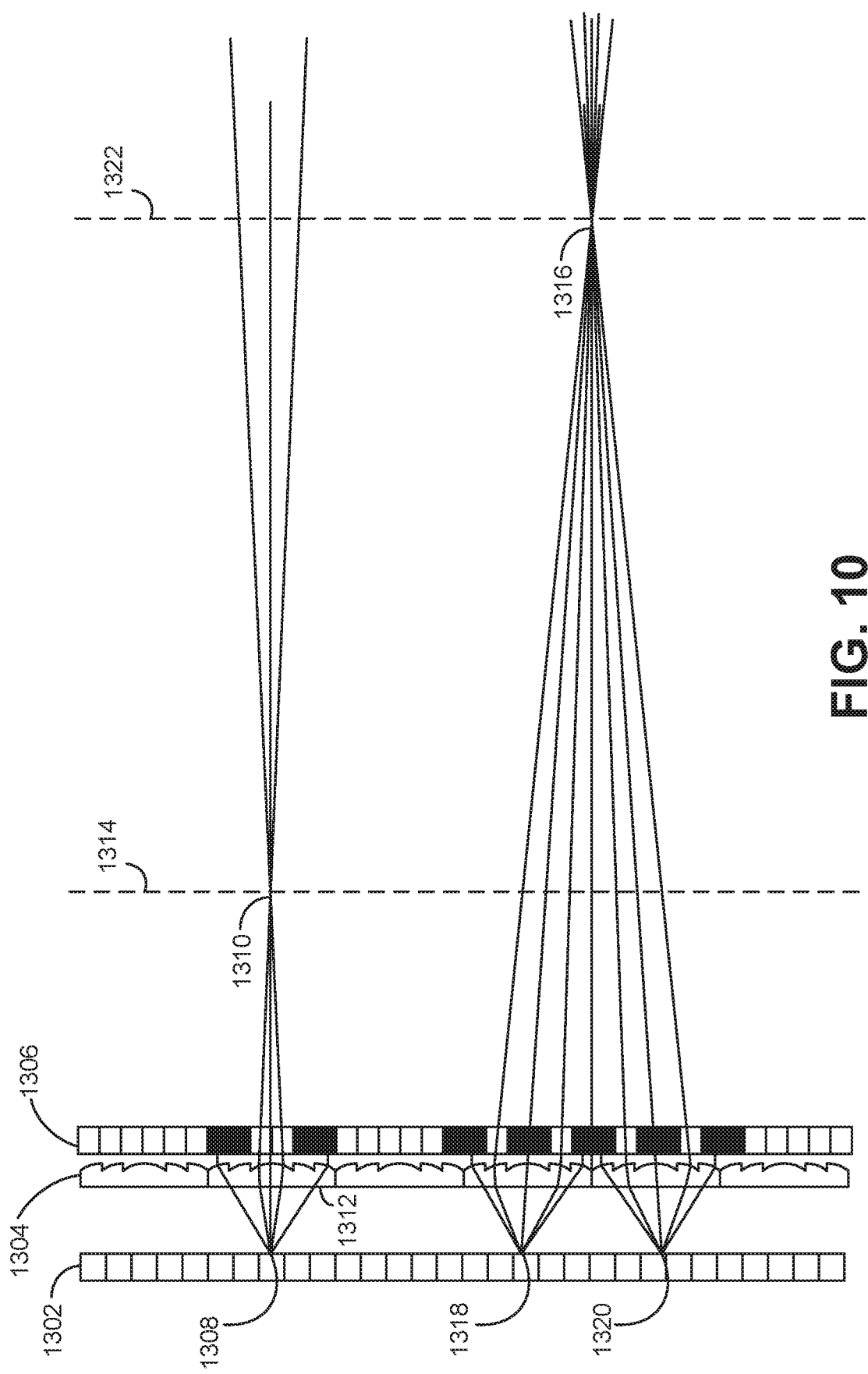

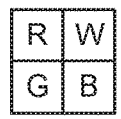
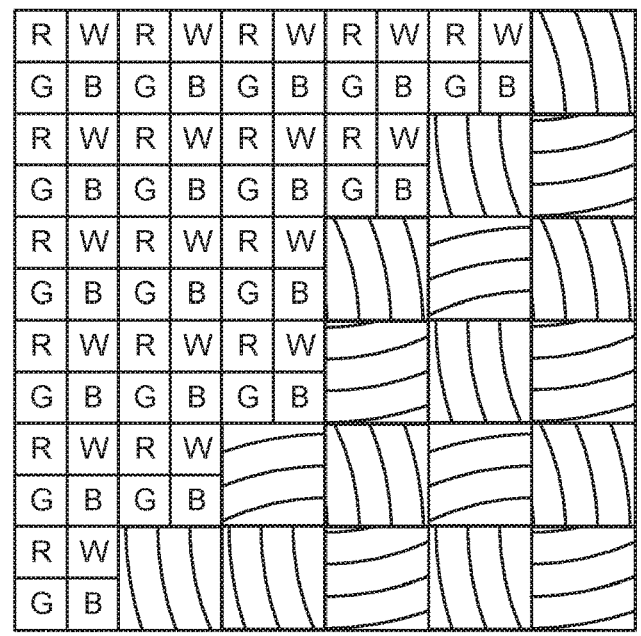
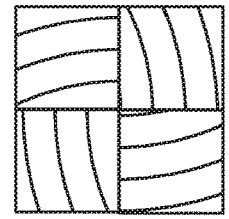
FIG. 29A
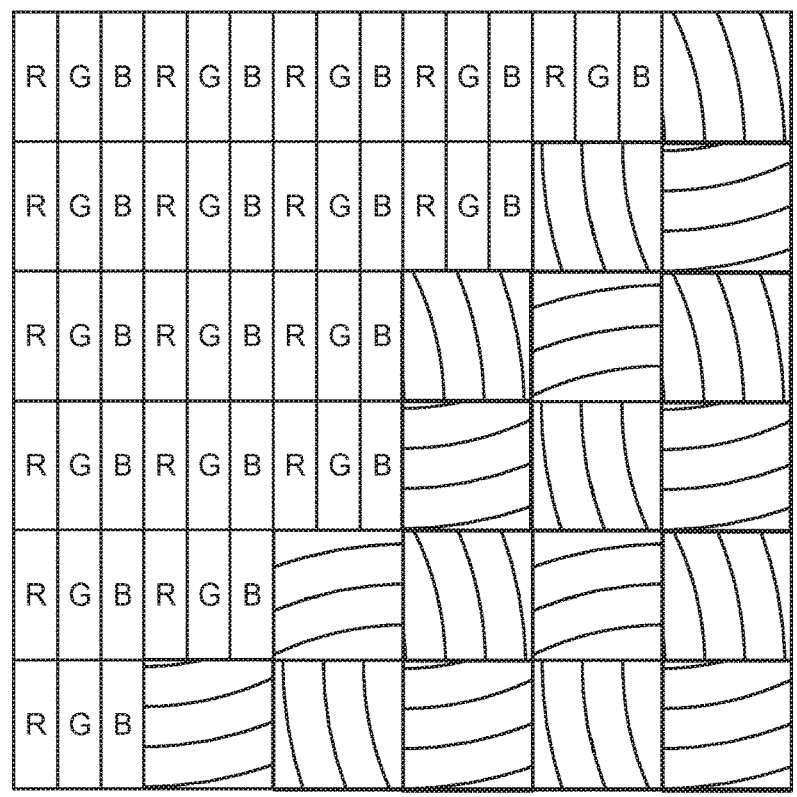
FIG. 29B

FIG. 37

OPTICAL METHOD AND SYSTEM FOR LIGHT FIELD DISPLAYS BASED ON DISTRIBUTED APERTURES

CROSS-REFERENCE TO RELATED APPLICATIONS

The present application is a national stage application under 35 U.S.C. § 371 of International Application No. PCT/US2020/036341, titled "OPTICAL METHOD AND SYSTEM FOR LIGHT FIELD DISPLAYS BASED ON DISTRIBUTED APERTURES" filed on Jun. 5, 2020, which is a non-provisional filing of, and claims benefit under 35 U.S.C. § 119(e) from, U.S. Provisional Patent Application Ser. No. 62/858,671, entitled "Optical Method and System for Light Field Displays Based on Distributed Apertures," filed Jun. 7, 2019, and U.S. Provisional Patent Application Ser. No. 62/870,858, entitled "Optical Method and System for Light Field Displays Based on Varifocal Mosaic Lenses," filed Jul. 5, 2019, both of which are hereby incorporated by reference in their entirety.

BACKGROUND

Different 3D displays can be classified on the basis of their form factors into different categories. Head-mounted devices (HMD) occupy less space than goggleless solutions, which also means that they can be made with smaller components and less materials making them relatively low cost. However, as head mounted VR goggles and smart glasses are single-user devices, they do not allow shared experiences as naturally as goggleless solutions. Volumetric 3D displays take space from all three spatial directions and generally call for a lot of physical material making these systems easily heavy, expensive to manufacture and difficult to transport. Due to the heavy use of materials, the volumetric displays also tend to have small "windows" and limited field-of view (FOV). Screen-based 3D displays typically have one large but flat component, which is the screen and a system that projects the image(s) over free space from a distance. These systems can be made more compact for transportation and they also cover much larger FOVs than e.g. volumetric displays. These systems can be complex and expensive as they call for projection sub-assemblies and e.g., accurate alignment between the different parts, making them best for professional use cases. Flat form-factor 3D displays may require a lot of space in two spatial directions, but as the third direction is only virtual, they are relatively easy to transport to and assemble in different environments. As the devices are flat, at least some optical components used in them are more likely to be manufactured in sheet or roll format making them relatively low cost in large volumes.

The human mind perceives and determines depths of observed objects in part by receiving signals from muscles used to orient each eye. The brain associates the relative angular orientations of the eyes with the determined depths of focus. Correct focus cues give rise to a natural blur on objects outside of an observed focal plane and a natural dynamic parallax effect. One type of 3D display capable of providing correct focus cues uses volumetric display techniques that can produce 3D images in true 3D space. Each "voxel" of a 3D image is located physically at the spatial position where it is supposed to be and reflects or emits light from that position toward the observers to form a real image in the eyes of viewers. The main problems with 3D volumetric displays are their low resolution, large physical size and expensive manufacturing costs. These issues make them too cumbersome to use outside of special cases e.g., product displays, museums, shows, etc. Another type of 3D display device capable of providing correct retinal focus cues is the holographic display. Holographic displays aim to reconstruct whole light wavefronts scattered from objects in natural settings. The main problem with this technology is a lack of suitable Spatial Light Modulator (SLM) component that could be used in the creation of the extremely detailed wavefronts.

A further type of 3D display technology capable of providing natural retinal focus cues is called the Light Field (LF) display. LF display systems are designed to create so-called light fields that represent light rays travelling in space to all directions. LF systems aim to control light emissions both in spatial and angular domains, unlike the conventional stereoscopic 3D displays that can basically only control the spatial domain with higher pixel densities. There are at least two fundamentally different ways to create light fields. In a first approach, parallax is created across each individual eye of the viewer producing the correct retinal blur corresponding to the 3D location of the object being viewed. This can be done by presenting multiple views per single eye. The second approach is a multi-focal-plane approach, in which an object's image is projected to an appropriate focal plane corresponding to its 3D location. Many light field displays use one of these two approaches.

The vergence-accommodation conflict (VAC) is one issue with current stereoscopic 3D displays. A flat form-factor LF 3D display may address this issue by producing both the correct eye convergence and correct focus angles simultaneously. In current consumer displays, an image point lies on a surface of a display, and only one illuminated pixel visible to both eyes is needed to represent the point correctly. Both eyes are focused and converged to the same point. In the case of parallax-barrier 3D displays, two clusters of pixels are illuminated to represent the single point correctly. In addition, the direction of the light rays from these two spatially separated pixel clusters are controlled in such a way that the emitted light is visible only to the correct eye, thus enabling the eyes to converge to the same single virtual point.

In current relatively low-density multi-view imaging displays, the views change in a coarse stepwise fashion as the viewer moves in front of the device. This lowers the quality of 3D experience and can even cause a complete breakdown of 3D perception. In order to mitigate this problem (together with the VAC), some Super Multi View (SMV) techniques have been tested with as many as 512 views. The idea is to generate an extremely large number of views so as to make any transition between two viewpoints very smooth. If the light from at least two images from slightly different viewpoints enters the eye pupil simultaneously, a much more realistic visual experience follows. In this case, motion parallax effects resemble the natural conditions better as the brain unconsciously predicts the image change due to motion. The SMV condition can be met by reducing the interval between two views at the correct viewing distance to a smaller value than the size of the eye pupil. The maximum angular density that can be achieved with SMV displays is limited by diffraction and there is an inverse relationship between spatial resolution (pixel size) and angular resolution. Diffraction increases the angular spread of a light beam passing through an aperture and this effect may be taken into account in the design of very high density SMV displays.

SUMMARY

A display device according to some embodiments incudes: a light-emitting layer comprising an addressable array of light-emitting elements; an optical layer overlaying the light-emitting layer, wherein the optical layer includes a plurality of distributed lenses, each distributed lens having an optical center, and wherein each of the distributed lenses is interlaced with at least one other distributed lens having a different optical center; and a spatial light modulator operative to provide control over which lens regions transmit light from the light-emitting layer outside the display device.

In some embodiments, each of the distributed lenses comprises a plurality of lens regions, and wherein at least one lens region of a first distributed lens is located between at least two lens regions of a second distributed lens, the first and second distributed lenses having different optical centers.

In some embodiments, each of the lens regions within a respective distributed lens has substantially the same principal focus point.

In some embodiments, each distributed lens includes at least two non-contiguous lens regions.

In some embodiments, the spatial light modulator comprises a plurality of light-modulating pixels, and wherein each pixel of the spatial light modulator corresponds to no more than one of the lens regions.

In some embodiments, for each of a plurality of the distributed lenses, the respective distributed lens is configured to focus light from at least one predetermined light-emitting element to at least one predetermined voxel position.

In some embodiments, for each of a plurality of the distributed lenses, the respective distributed lens is configured to collimate light from at least one predetermined light-emitting element toward at least one predetermined voxel position.

A method of operating a display device according to some embodiments includes: selectively emitting light from a light-emitting element in an addressable array of light-emitting elements, the emitted light being emitted toward an optical layer comprising a plurality of lens regions; and operating a spatial light modulator to allow the emitted light to travel outside the display device through a selected plurality of the lens regions, the selected plurality including at least two selected lens regions within a selected first distributed lens.

In some embodiments, the selected lens regions include at least two non-contiguous lens regions within the first distributed lens.

In some embodiments, the first distributed lens has a first optical center, and the first distributed lens is interlaced with a second distributed lens having a second optical center different from the first optical center.

In some embodiments, at least one lens region of the first distributed lens is located between at least two lens regions of the second distributed lens. In some embodiments, the selected non-contiguous lens regions have substantially the same principal focus point.

In some embodiments, the method further includes: determining a position of a voxel to be displayed; and selecting the light-emitting element and the first distributed lens based on the determined voxel position.

In some embodiments, the light-emitting element and the distributed lens are selected such that the light-emitting element and an optical center of the first distributed lens are substantially collinear.

In some embodiments, the light-emitting element and the distributed lens are selected such that light from the light-emitting element is substantially focused at the determined voxel position.

BRIEF DESCRIPTION OF THE DRAWINGS

FIG. 4A illustrates beam divergence caused by geometric factors of a lens.

FIG. 4B illustrates beam divergence caused by diffraction.

FIG. 5 illustrates the image magnification for three lenses of different optical powers.

FIG. 6A illustrates the combined effects of geometric factors and diffraction for one extended source and a small lens aperture.

FIG. 6B illustrates the combined effects of geometric factors and diffraction for two sources and a small lens aperture.

FIG. 8A depicts a first example viewing geometry of a display, in accordance with some embodiments.

FIG. 8B depicts a second example viewing geometry of a display, in accordance with some embodiments.

FIG. 9A illustrates creation of a voxel with two crossing beams.

FIG. 9B illustrates creation of a voxel with mosaic lens 3D display.

FIG. 10 illustrates the optical structure and functionality of a 3D display, in accordance with some embodiments.

FIG. 11A depicts an example mosaic pattern of a mosaic cell used as a periodic feature in some embodiments.

FIG. 11B depicts an example mosaic pattern of a mosaic cell used as a periodic feature in some embodiments.

FIG. 29A depicts a first example color filter arrangement of a spatial light modulator (SLM), in accordance with some embodiments.

FIG. 29B depicts a second example color filter arrangement of an SLM, in accordance with some embodiments.

FIG. 37 illustrates simulated irradiance distributions of two different distributed apertures.

EXAMPLE NETWORKS FOR IMPLEMENTATION OF THE EMBODIMENTS

Figure 1A:
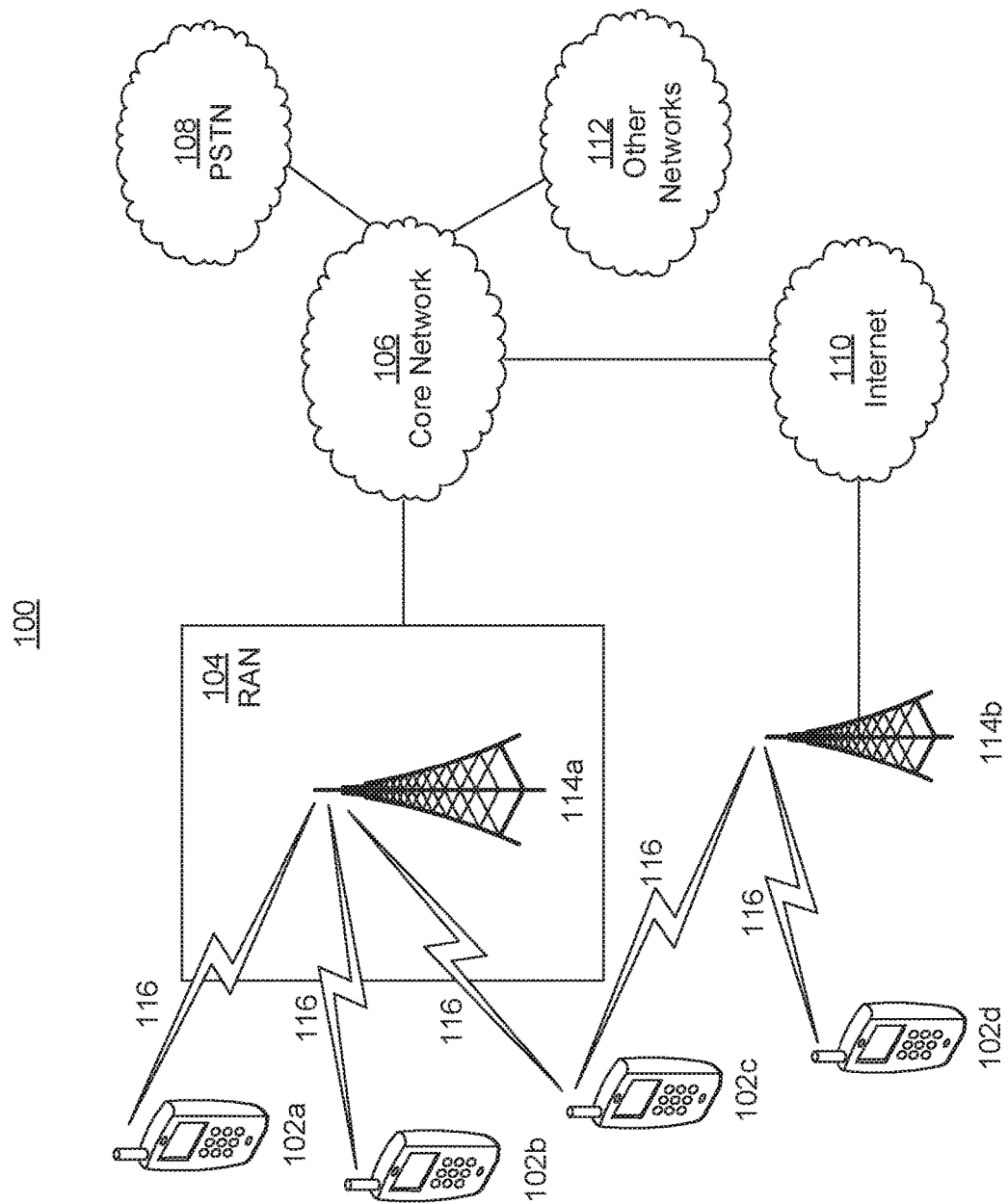
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104, a CN 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
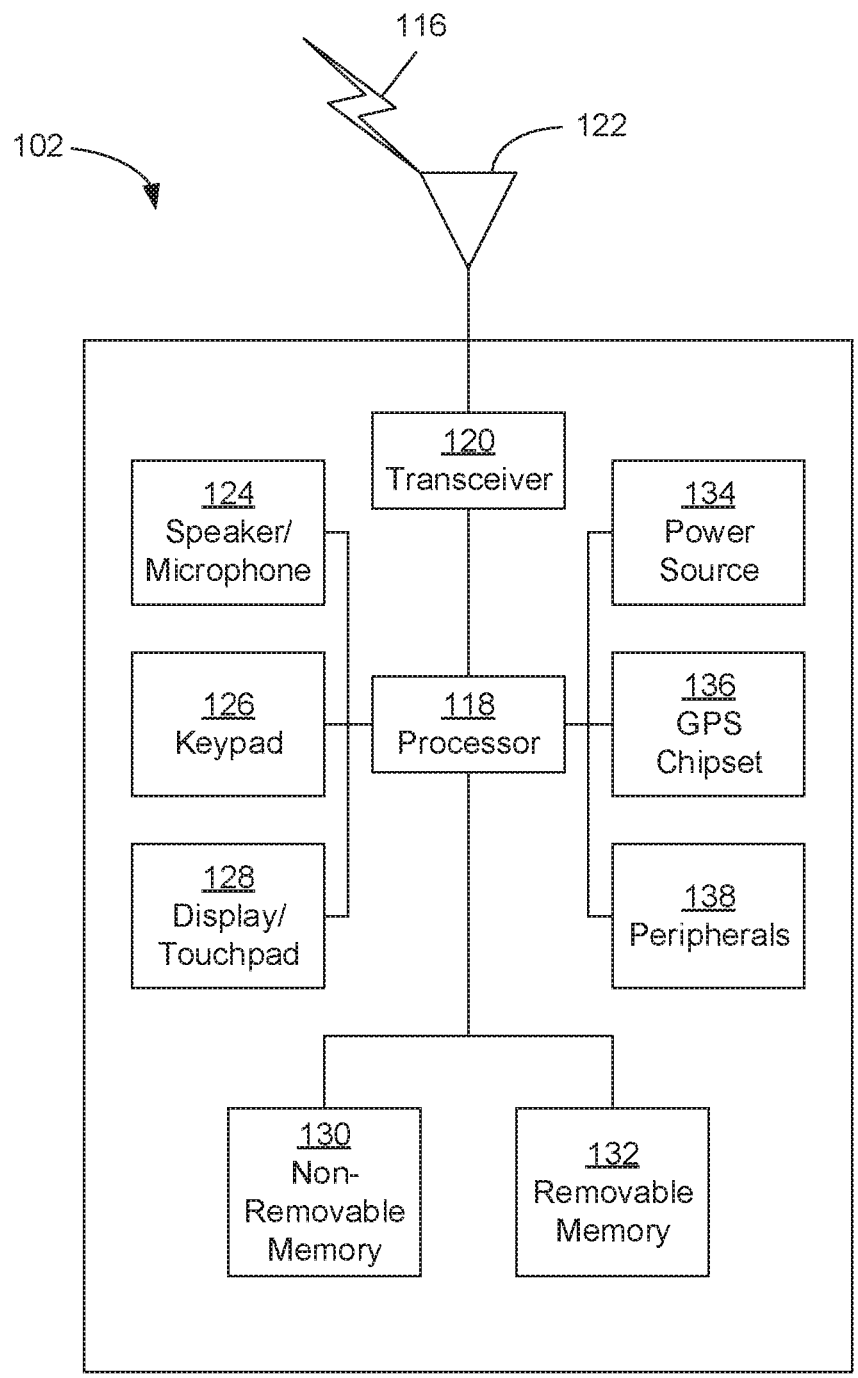
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Although the WTRU is described in FIGS. 1A-1B as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

One or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Figure 2:
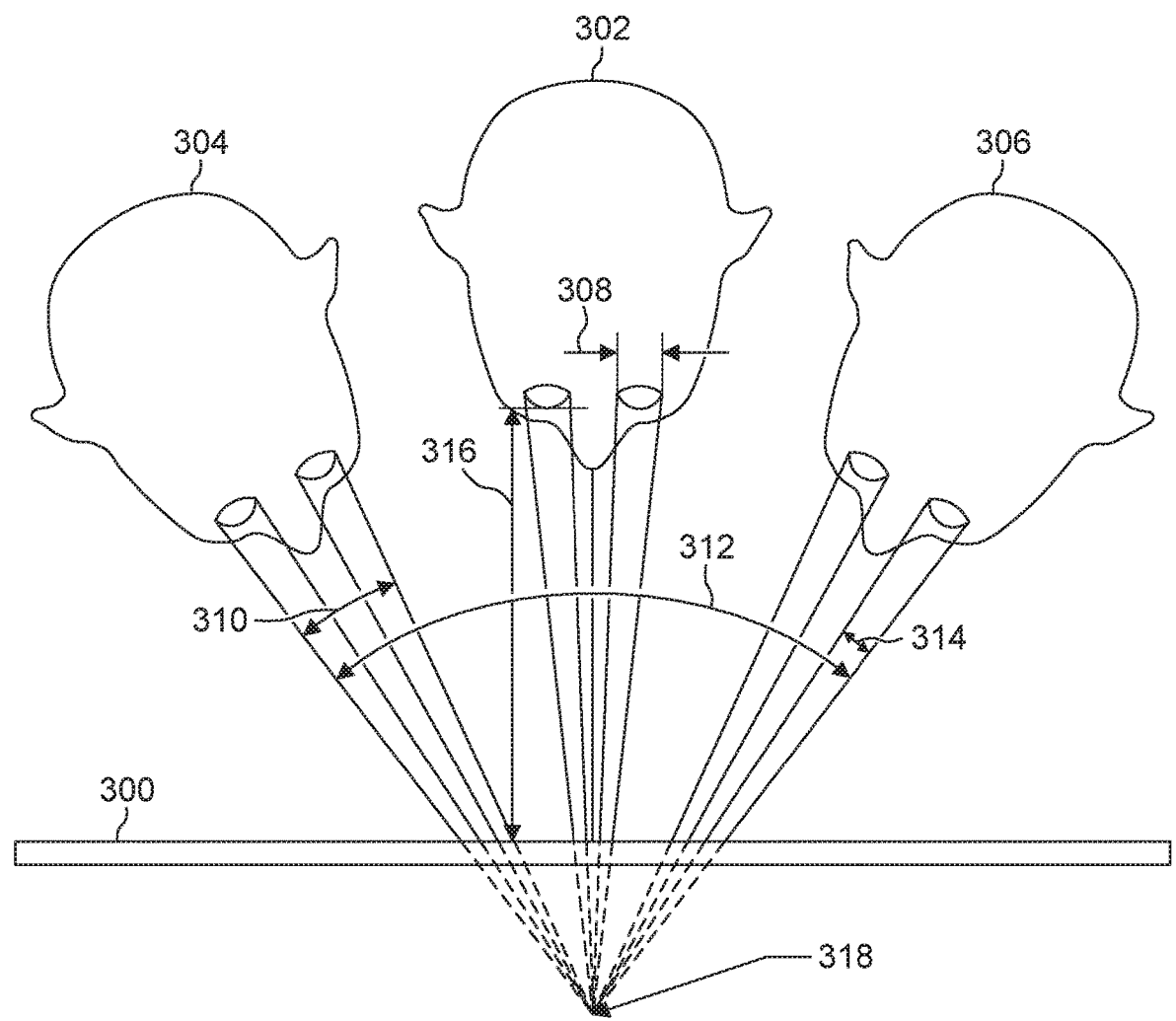
FIG. 2 depicts light emission angles of light from a display.

The present disclosure relates to display devices, particularly for the display of three-dimensional (3D) images. FIG. 2 is a schematic plan view illustrating example light emission angles directed towards different viewers of a display device. The display in FIG. 2 produces the desired retinal focus cues and multiple views of 3D content in a single flat form-factor panel. A single 3D display surface 300 projects at least two different views to the two eyes of each user in order to create a coarse 3D perception effect. The brain uses these two different eye images to determine 3D distance. Logically this is based on triangulation and interpupillary distance. To provide this effect, at least two views are projected from a light source 318 into a single-user viewing angle (SVA) 310, as shown in FIG. 2. Furthermore, in at least one embodiment, the display projects at least two different views inside a single eye pupil in order to provide the correct retinal focus cues. For optical design purposes, an "eye-box" 308 may be defined around the viewer eye pupil if determining the volume of space within which a viewable image is formed. In some embodiments of the display, at least two partially overlapping views are projected inside an Eye-Box Angle (EBA) 314 covered by the eye-box at a certain viewing distance 316. In some embodiments, the display is viewed by multiple viewers 302, 304, 306 looking at the display from different viewing angles. In such embodiments, several different views of the same 3D content are projected to respective viewers covering a whole intended multi-user viewing angle (MVA) 312.

FIG. 2 illustrates that it may be desirable for a display to cover three different angular ranges simultaneously: one range for covering the pupil of a single eye, one range for covering the two eyes of a single user, and one range for the multiuser case. Of these three angular ranges, the latter two may be resolved, for example, by using several light emitting pixels under a lenticular or parallax barrier structure or by using several projectors with a common screen. Such techniques may be suitable for the creation of relatively large light emission angles utilized in the creation of multiple views. However, it may be preferable to address the range covering the eye pupil in order to produce the correct retinal focus cues and overcome VAC.

It would be desirable for a flat form-factor high-quality 3D display to be able to produce both the eye convergence (CA) and retinal focus (FA) angles simultaneously.

Figure 3B:
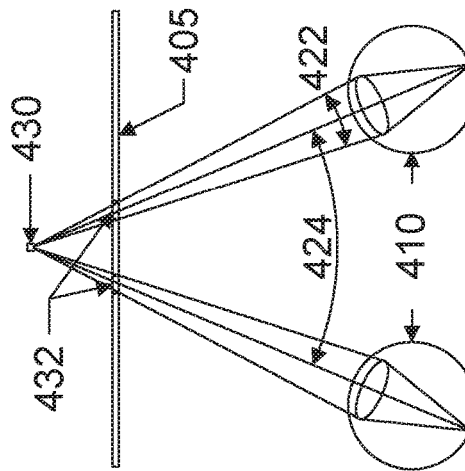
FIG. 3B depicts a pair of eyes and the focus angle and convergence angle produced by a display for a voxel formed behind the display surface.
Figure 3D:
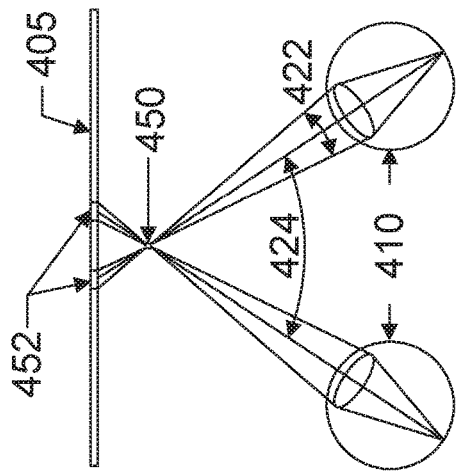
FIG. 3D depicts a pair of eyes and the focus angle and convergence angle produced by display for a voxel formed in front of the display surface.
Figure 3A:
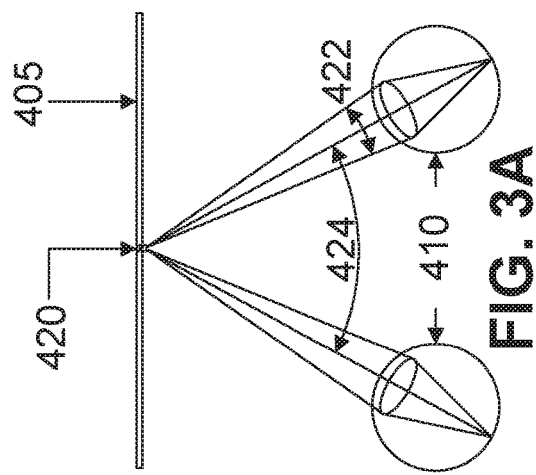
FIG. 3A depicts a pair of eyes and the focus angle and convergence angle produced by a display for a voxel formed at the display surface.

FIG. 3A depicts a schematic plan view illustrating a pair of eyes and the focus angle (FA) and convergence angle (CA) produced by a display for a voxel formed at a display surface according to some embodiments. It may be desirable for a flat form-factor high-quality 3D display to be able to produce both the eye convergence angles (CA) 424 and retinal focus angles (FA) 422 simultaneously. FIGS. 3A-D show these angles in four different 3D image content cases. In the first case illustrated in FIG. 3A, the image point 420 lies on the surface of the display 405 and only one illuminated display pixel visible to both eyes 410 is needed. Both eyes 410 are focused and converged to the same point 420.

FIG. 3B depicts a schematic plan view illustrating a pair of eyes and the FA and CA produced by a display for a voxel formed behind a display surface according to some embodiments. In the second case as illustrated in FIG. 3B, the virtual image point (voxel) 430 is behind the display 405, and two clusters of pixels 432 are illuminated. In addition, the direction of the light rays from these two display pixel clusters 432 are controlled in such a way that the emitted light is visible only to the correct eye, thus enabling the eyes 410 to converge to the same single virtual point 430.

Figure 3C:
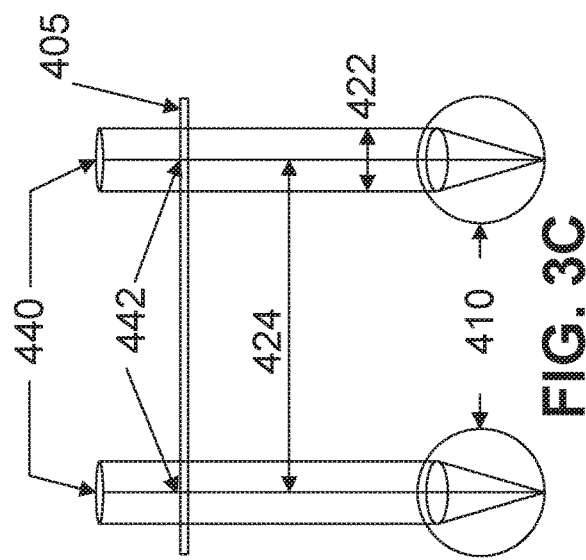
FIG. 3C depicts a pair of eyes and the focus angle and convergence angle produced by a display for a voxel formed at an infinite distance behind the display surface.

FIG. 3C depicts a schematic plan view illustrating a pair of eyes and the FA and CA produced by a display for a voxel formed at an infinite distance behind the display surface according to some embodiments. In the third case as illustrated in FIG. 3C, the virtual image 440 is at infinity behind the screen 405 and only parallel light rays are emitted from the display surface from two pixel clusters 442.

FIG. 3D depicts a schematic plan view illustrating a pair of eyes and the FA and CA produced by a display for a voxel formed in front of a display surface according to some embodiments. In the last case as illustrated in FIG. 3D, the image point or voxel 450 is in front of the display 405, two pixels clusters 452 are be activated, and the emitted beams crossed at the same point 450 where they focus. In the last three presented generalized cases (FIGS. 3B, 3C, and 3D), both spatial and angular control of emitted light is used by the display device in order to create both the convergence and focus angles for natural eye responses to the 3D image content.

A flat-panel-type multi-view display may be based on spatial multiplexing alone. A row or matrix of light emitting pixels (which may be referred to as sub-pixels) may be located behind a lenticular lens sheet or microlens array, and each pixel may be projected to a unique view direction or to a limited set of view directions in front of the display structure. The more pixels there are on the light emitting layer behind each light beam collimating feature, the more views can be generated. This leads to a direct trade-off situation between number of unique views generated and spatial resolution. If a smaller pixel size is desired from the 3D display, the size of individual sub-pixels may be reduced; or alternatively, a smaller number of viewing directions may be generated. Sub-pixel sizes may be limited to relatively large areas due to lack of suitable components. It would be desirable for a high-quality display to have both high spatial and angular resolutions. High angular resolution is desirable in fulfilling the SMV condition.

In order to produce 3D images at different focal planes with sufficient resolution using crossing beams, each beam is preferably well collimated with a narrow diameter. In some embodiments, the level of collimation is related to the position of the focal plane being displayed. For example, beams may be substantially collimated but slightly diverging for display of focal planes behind the display, and beams may be substantially collimated but slightly converging for display of focal planes in front of the display.

Furthermore, it may be preferable for the beam waist to be positioned at the same spot where the beams are crossing in order to avoid contradicting focus cues for the eye. If the beam diameter is large, the voxel formed in the beam crossing is imaged to the eye retina as a large spot. A large divergence value means that (for an intermediate image between the display and viewer) the beam becomes wider as the distance between the voxel and the eye gets smaller. With smaller distances, the eye resolves images in higher detail. However, the spatial resolution of the virtual focal plane becomes worse with smaller distances. Voxels positioned behind the display surface are formed with virtual extensions of the emitted beams, and wider beams may be acceptable because the eye's resolution also becomes worse at longer distances. In order to have high resolution both in front of and behind the display surface, it may be preferable for separate beams to have adjustable focuses. Without adjustable focus, the beams have a single fixed focus that sets the smallest achievable voxel size. However, because the eye resolution is lower at larger distances, the beam virtual extensions may be allowed to widen behind the display and the beam focus can be set to the closest specified viewing distance of the 3D image. In some embodiments, the focal surface resolutions can also be balanced throughout the volume where the image is formed by combining several neighboring beams in an attempt to make the voxel sizes uniform.

FIG. 4A depicts schematic views illustrating an example of increasing beam divergence caused by geometric factors. In the case of an ideal lens, the achievable light beam collimation is dependent on two geometrical factors: size of the light source and focal length of the lens. Perfect collimation without any beam divergence may only be achieved in the theoretical case in which a single color point source (PS) 502 is located exactly at focal length distance from an ideal positive lens. This case is pictured at the top of FIG. 4A. Unfortunately, all real-life light sources have some surface area from which the light is emitted making them extended sources (ES) 504, 506. As each point of the source is separately imaged by the lens, the total beam ends up consisting from a group of collimated sub-beams that propagate to somewhat different directions after the lens. And as presented in FIG. 4A with a series of lens configurations 500, as the source 502, 504, 506 grows larger, the total beam divergence 508, 510, 512 increases. This geometrical factor may not be avoided with any optical means, and it is the dominating feature causing beam divergence with relatively large light sources.

Another, non-geometrical, feature causing beam divergence is diffraction. The term refers to various phenomena that occur when a wave (of light) encounters an obstacle or a slit. It can be described as the bending of light around the corners of an aperture into the region of geometrical shadow. Diffraction effects can be found from all imaging systems, and they cannot be removed even with a perfect lens design that is able to balance out all optical aberrations. In fact, a lens that is able to reach the highest optical quality is often called "diffraction limited" as most of the blurring remaining in the image comes from diffraction. The angular resolution achievable with a diffraction limited lens can be calculated from the formula $\sin \theta = 1.22 * \lambda / D$, where $\lambda$ is the wavelength of light and D the diameter of the entrance pupil of the lens. It can be seen from the equation that the color of light and lens aperture size have an influence on the amount of diffraction. FIG. 4B shows a schematic presentation of how the beam divergence is increased when the lens aperture size is reduced. This effect can be formulated into a general principle in imaging optics design: if the design is diffraction limited, the way to improve resolution is to make the aperture larger. Diffraction is the dominating feature causing beam divergence with relatively small light sources.

FIG. 4B depicts schematic views illustrating an example of increasing beam divergence caused by diffraction according to some embodiments. FIG. 4B shows a schematic presentation 600 of point sources 602, 604, 606 of how the beam divergence 608, 610, 612 increases if the lens aperture size 614, 616, 618 is reduced. This effect may be formulated into a general principle in imaging optics design: if the design is diffraction limited, the way to improve resolution is to make the aperture larger. Diffraction is the dominating feature causing beam divergence with relatively small light sources.

As presented in FIG. 4A, the size of an extended source has a big effect on the achievable beam divergence. The source geometry or spatial distribution is mapped to the angular distribution of the beam and this can be seen in the resulting "far field pattern" of the source-lens system. In practice this means that if the collimating lens is positioned at the focal distance from the source, the source is imaged to a relatively large distance from the lens and the size of the image can be determined from the system "magnification ratio". In the case of a simple imaging lens, this ratio can be calculated by dividing the distance between lens and image with the distance between source and lens as illustrated in FIG. 5. If the distance between source and lens is fixed, different image distances can be achieved by changing the optical power of the lens with the lens curvature. But when the image distance becomes larger and larger in comparison to the lens focal length, the required changes in lens optical power become smaller and smaller, approaching the situation where the lens is effectively collimating the emitted light into a beam that has the spatial distribution of the source mapped into the angular distribution and source image is formed without focusing.

FIG. 5 illustrates three example lenses having various magnification ratios. In the case of a simple imaging lens, the magnification ratio may be calculated by dividing the distance 704, 734, 764 between lens 712, 742, 772 and image 714, 744, 774 with the distance 702, 732, 762 between source 710, 740, 770 and lens 712, 742, 772 as illustrated in FIG. 5. If the distance 702, 732, 762 between source 710, 740, 770 and lens 712, 742, 772 is fixed, different image distances 704, 734, 764 may be achieved by changing the optical power of the lens 704, 734, 764 with the lens curvature. But if the image distance 704, 734, 764 becomes larger and larger in comparison to the lens focal length 702, 732, 762, the required changes in lens optical power become smaller and smaller, approaching the situation where the lens is effectively collimating the emitted light into a beam that has the spatial distribution of the source mapped into the angular distribution and source image is formed without focusing. In the set of lens configurations 700, 730, 760, as the source 706, 736, 766 grows larger, the projected image height 708, 738, 768 increases.

In flat form factor goggleless displays, it may be helpful for the pixel projection lenses to have very small focal lengths in order to achieve the flat structure and in order to allow the beams from a single projection cell to be projected to a relatively large viewing distance. This means that the sources may be effectively imaged with high magnification when the beams of light propagate to the viewer. For example, if the source size is 50 μm×50 μm, projection lens focal length is 1 mm and viewing distance is 1 m, the resulting magnification ratio is 1000:1 and the source geometric image will be 50 mm×50 mm in size. This means that the single light emitter can be seen only with one eye inside this 50 mm diameter eye-box. If the source has a diameter of 100 μm, the resulting image would be 100 mm wide and the same pixel could be visible to both eyes simultaneously as the average distance between eye pupils is only 64 mm. In the latter case, the stereoscopic 3D image would not be formed as both eyes would see the same images. The example calculation shows how the geometrical parameters like light source size, lens focal length and viewing distance are tied to each other.

As the beams of light are projected from the display pixels, divergence causes the beams to expand. This applies not only to the actual beam emitted from the display towards the viewer but also to the virtual beam that appears to be emitted behind the display, converging to the single virtual focal point close to the display surface. In the case of a multi-view display this may be helpful because the divergence expands the size of the eye-box. However, it may be useful to provide a beam size that does not exceed the distance between the two eyes, since that may break the stereoscopic effect. If it is desired to create a voxel to a virtual focal plane with two or more crossing beams anywhere outside the display surface, the spatial resolution achievable with the beams gets worse as the divergence increases. It may also be noted that if the beam size at the viewing distance is larger than the size of the eye pupil, the pupil becomes the limiting aperture of the whole optical system.

Figure 6C:
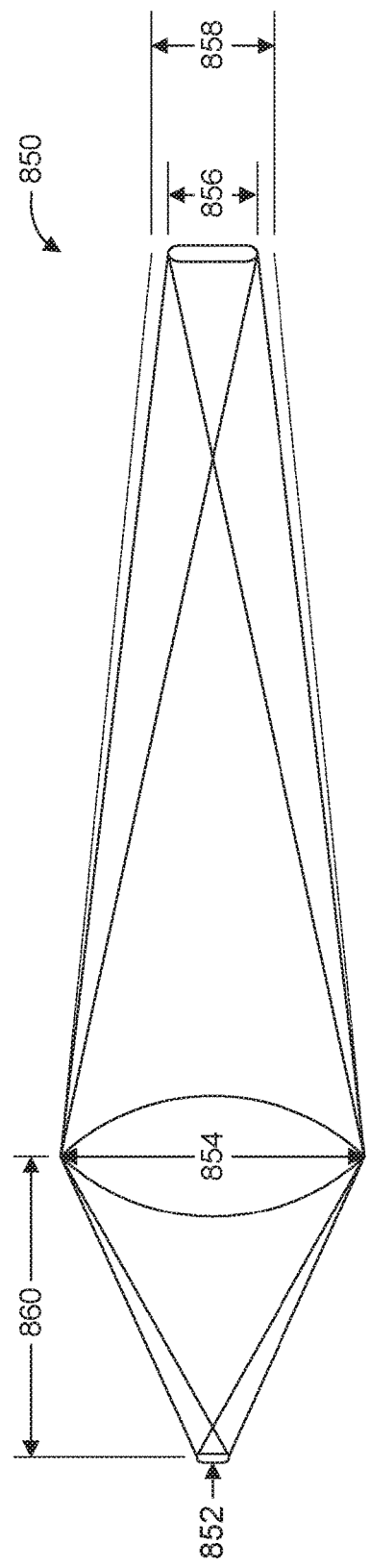
FIG. 6C illustrates the combined effects of geometric factors and diffraction for one source and a large lens aperture.

Geometric and diffraction effects are utilized in the display's design in order to achieve an optimal solution for voxel resolution. With very small light sources, optical system measurements become closer to the wavelength of light and diffraction effects become more significant. The schematic presentations of FIGS. 6A-D illustrate how the geometric and diffraction effects work together in cases 800, 820, 850, 870 such that one extended source 802, 852 or two extended sources 822, 824, 872, 874 are imaged to a fixed distance with a fixed magnification. FIG. 6A shows a case 800 where the lens aperture size 804 is relatively small, and the extended source 802 is located a focal distance 810 away from the lens. In FIG. 6A, the geometric image (GI) 806 is surrounded by blur that comes from diffraction making the diffracted image (DI) 808 much larger.

FIG. 6B shows a case 820 where two extended sources 822, 824 are placed side-by-side at a focal distance 836 from the lens and imaged with a lens that has the same small aperture size 826. Even though the GIs 828, 830 of both sources 822, 824 are clearly separated, the two source images cannot be resolved because the diffracted images 832, 834 overlap. In practice, this situation would mean that reduction of light source size would not improve the achievable voxel resolution as the resulting source image size would the same with two separate light sources as with one larger source that covers the area of both separate emitters. In order to resolve the two source images as separate pixels/voxels, the aperture size of the imaging lens should be increased.

FIG. 6C shows a case 850 where the lens has the same focal length 860 but a larger aperture 854 is used to image the extended source 852. Now the diffraction is reduced and the DI 858 is only slightly larger than the GI 856, which has remained the same as magnification is fixed.

Figure 6D:
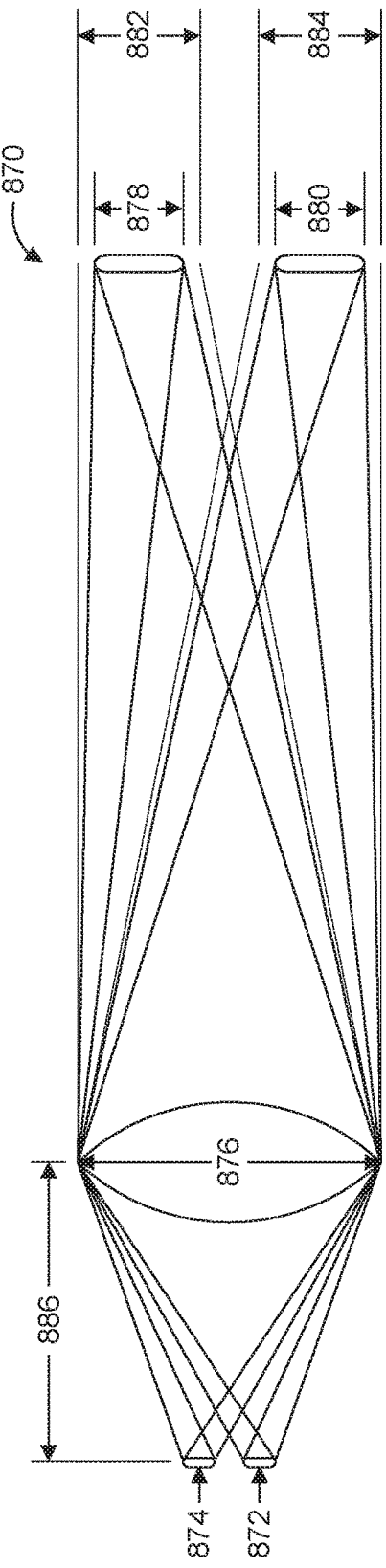
FIG. 6D illustrates the combined effects of geometric factors and diffraction for two sources and large lens aperture.

FIG. 6D shows a case 870 where two extended sources 872, 874 are located a focal distance 886 away from a lens with an aperture size 876 equal to the size of the lens. The DIs 882, 884 are only slightly larger than the GIs 878, 880. The two spots are now resolved because the DIs 882, 884 are no longer overlapping, enabling use of two different sources 872, 874 and improving the spatial resolution of the voxel grid.

Optical Design Features of Displays Based on Crossing Beams

Some embodiments provide the ability to create a display. In some embodiments, the display may be used as a 3D display, such as a light field display, that is capable of presenting multiple focal planes of a 3D image while addressing the vergence-accommodation conflict (VAC) problem.

In some embodiments, the display projects emitter images towards both eyes of the viewer without light scattering media between the 3D display and the viewer. In order to create a stereoscopic image by creating a voxel located outside the display surface, it may be useful for a display to be configured so that an emitter inside the display associated with that voxel is not visible to both eyes simultaneously. Accordingly, it may be useful for the field-of-view (FOV) of an emitted beam bundle to cover both eyes. It may also be useful for the single beams to have FOVs that make them narrower than the distance between two eye pupils (~64 mm on average) at the viewing distance. The FOV of one display section as well as the FOVs of the single emitters may be affected by the widths of the emitter row/emitter and magnification of the imaging optics. It can be noted that a voxel created with a focusing beam may be visible to the eye only if the beam continues its propagation after the focal point and enters the eye pupil at the designated viewing distance. It may be especially useful for the FOV of a voxel to cover both eyes simultaneously. If a voxel were visible to single eye only, the stereoscopic effect may not be formed and 3D image may not be seen. Because a single display emitter can be visible to only one eye at a time, it may be useful to increase the voxel FOV by directing multiple crossing beams from more than one display emitter to the same voxel within the human persistence-of-vision (POV) time frame. In some embodiments, the total voxel FOV is the sum of individual emitter beam FOVs.

In order to make local beam bundle FOVs overlap at their associated specified viewing distances, some embodiments may include a curved display with a certain radius. In some embodiments, the projected beam directions may be turned towards a specific point, e.g., using a flat Fresnel lens sheet. If the FOVs were not configured to overlap, some parts of the 3D image may not be formed. Due to the practical size limits of a display device and practical limits for possible focal distances, an image zone may be formed in front of and/or behind the display device corresponding to the special region wherein the 3D image is visible.

Figure 7:
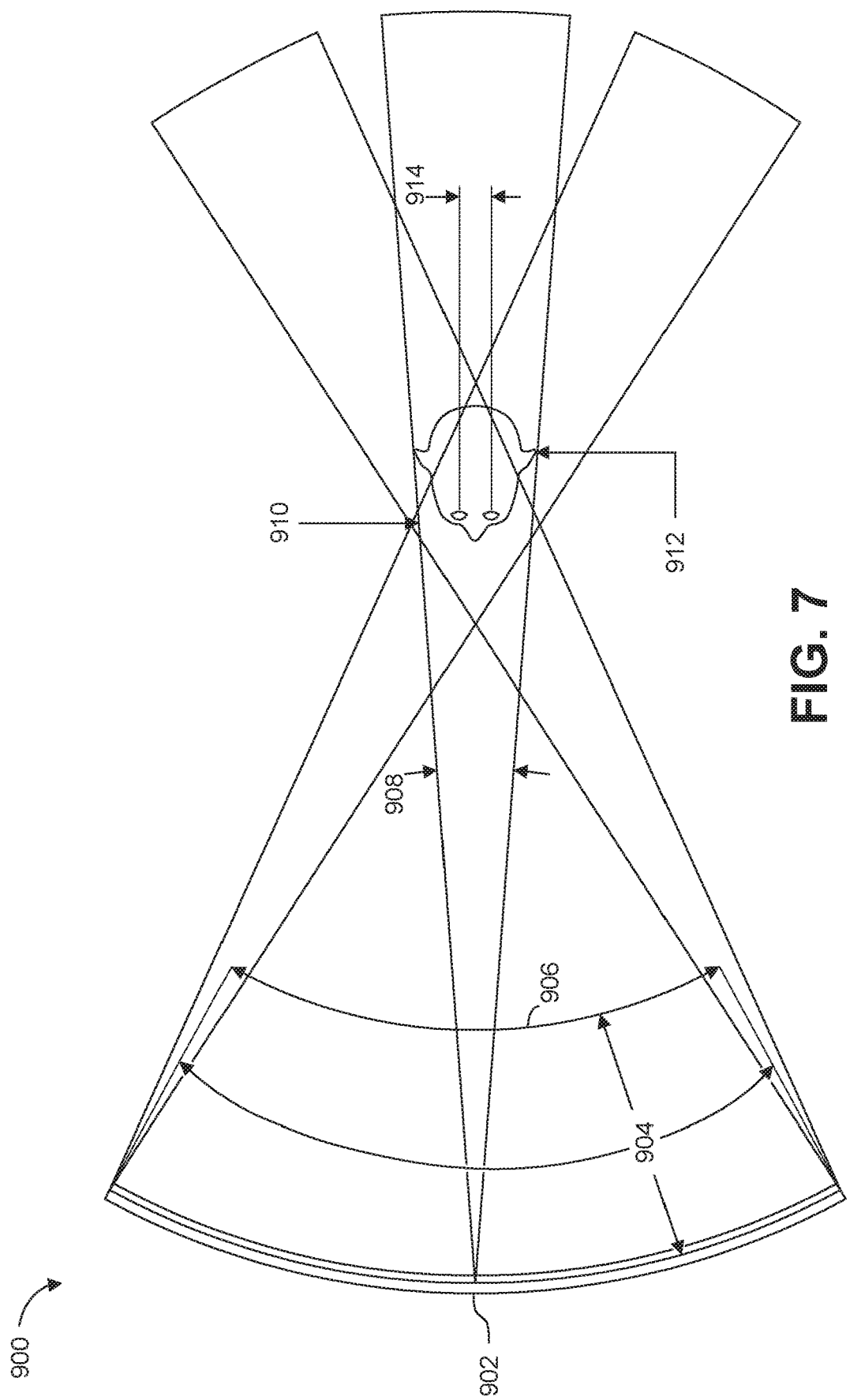
FIG. 7 illustrates an example viewing geometry of a display, in accordance with some embodiments.

FIG. 7 is a schematic plan view illustrating an exemplary viewing geometry available with a 3D display structure according to some embodiments. FIG. 7 shows a schematic presentation 900 of an example viewing geometry that may be achieved with a 3D display structure 902 based on the use of crossing beams. In front of the curved display 902, the limit of a 3D image zone 904 may be considered to be the furthest focal distance from the display with reasonable spatial resolution. The image zone 904 may also be considered to be limited by the FOV 906 of the whole display. In order to get the maximum resolution at the minimum image distance, the display optical features may be designed to focus the source images to the furthest edge of this zone. In some embodiments, there may also be another image zone behind the display formed by the virtual extensions of the emitted beams. In some embodiments, voxels behind the display 902 may have larger allowable sizes because the viewer is positioned further away and because eye resolution may be lower at greater distances. In some embodiments, a maximum image distance may be selected on the basis of a minimum acceptable resolution achievable with the expanding beam virtual extensions.

FIG. 7 illustrates an example viewing geometry of a display 902, in accordance with some embodiments. In particular, the display surface depicted in FIG. 7 is curved with a radius which is the same as the designated viewing distance. In the example, the overlapping beam bundle FOVs 910 form a viewing zone around the facial area of the viewer 912. The size of this viewing zone may affect the amount of movement allowed for the viewer head. It may be useful for both eye pupils (and the distance 914 between the pupils) to be positioned inside the zone simultaneously in order to make the stereoscopic image possible. The size of the viewing zone may be selected by altering the beam bundle FOVs 908. The particular design may be selected on the basis of the particular use case.

FIGS. 8A-8B are schematic plan views illustrating exemplary viewing geometry scenarios of 3D displays according to some embodiments. FIGS. 8A-8B show schematic representations of two different example viewing geometry cases 1000, 1100.

A first scenario 1000, as shown in FIG. 8A, depicts a scenario of a single viewer 1004 in front of a display and the corresponding viewing geometry in which a small viewing zone covers both eyes' pupils. This may be achieved using narrow beam bundle FOVs 1002. A minimum functional width of the zone may be affected by the eye pupil distance. For example, an average pupil distance may be around 64 mm. A small width may also imply a small tolerance for viewing distance changes as the narrow FOVs 1002 tend to quickly separate from each other at increasing distances both in front of and behind the optimal viewing location.

A second scenario 1100, as shown in FIG. 8B, depicts a viewing geometry with wider beam bundle FOVs 1102. This viewing geometry may make it possible to have multiple viewers 1104 inside the viewing zone and at different viewing distances. In this example, the positional tolerances may be large.

The viewing zone may be increased by increasing the FOV of each display beam bundle. This can be done, for example, by increasing the width of the light emitter row or by changing the focal length of the beam collimating optics. Smaller focal lengths may result in larger voxels, so it may be useful to increase the focal length to achieve better resolution. A trade-off may be found between the optical design parameters and the design needs. Accordingly, different use cases may balance between these factors differently.

Issues Addressed in Some Embodiments.

A 3D display 950 based on integral imaging can form a voxel 952 by crossing two light beams 954, 956 at a desired spatial location as shown in FIG. 9A. The viewer's eyes 958 see the voxel as a source image that is projected from the display through the voxel location to the eye pupils. A voxel can be formed also with virtual extensions of diverging beams behind the display. If the single projected beam is focused to the voxel location, the eye sees a blurred image of the source both in front of and behind the voxel location. This results in a 3D image that looks sharp only when the eye lens is focused to the correct distance. Two crossing beams are used for creating the voxel image to the two eyes, and the angle between them is used for creating correct eye convergence. Such a system is able to create both the retinal focus cues and eye convergence separately, and the 3D image can be seen without VAC.

Resolution of the displayed 3D image is dependent on how well the source is imaged to the voxel location. As discussed above, there are both geometric and diffraction based factors that determine the size and sharpness of the projected images. If the optical aperture of the beam projection lens in the display structure can be made large, geometric factors like projection lens focal length and size of light emitting area will determine the achievable source image size. However, if the optical aperture is small, diffraction effects will set a limit to the minimum voxel size as the image can be severely blurred. With small displays that are used e.g. in mobile phones, 2D display pixel sizes are usually in the range of 30 µm-75 µm. In order to reach a similar 2D spatial resolution on the display surface, a 3D integral imaging display should have optical apertures in the same size range, but diffraction can cause problems.

When the size of the display projection lens aperture is increased, spatial resolution of projected voxels is improved, but unfortunately at the same time the spatial resolution at the display surface is decreased with the larger apertures. This trade-off problem is apparent especially in 3D displays that aim to create several focal planes or in displays that are intended to be used in both 3D and 2D modes. For example, a 6-inch mobile phone display that has 50 µm pixels would have a 2660×1500 pixel matrix and ~500 ppi (pixels per inch) resolution, but the same sized display with 250 µm pixels would only have an array of 532×300 pixels and ~100 ppi resolution. The former would be considered as a high-end mobile phone display, whereas the latter does not even have a VGA level resolution and the pixels would be clearly visible with the naked eye. These two aperture size examples show that the combination of adequate 3D image spatial resolution and 2D display resolution is difficult to achieve in small displays with the optics currently used in integral imaging solutions.

Systems and methods for increasing the projection lens aperture size without losing spatial resolution on the display surface are described herein. In a mosaic lens solution, the projection lenses are created from a cluster of distributed smaller optical features that can be interlaced at the display surface. This makes it possible to create, with a single source 960, two or more beam sections 962, 964 that cross and focus at the voxel location 966 as shown in FIG. 9B. The large aperture size on the display surface is sampled with several smaller apertures that can be opened or closed with an adaptive spatial light modulator (not shown in FIG. 9B) making it possible to create wide interlaced beams with the display optical structure.

µLED Light Sources.

A display technology that may be used in some embodiments is µLEDs. These are LED chips that are manufactured with the same basic techniques and from the same materials as the standard LED chips in use today. However, the µLEDs are miniaturized versions and they can be made as small as 1 µm-10 µm in size. One dense matrix that has been manufactured had 2 µm×2 µm chips assembled with 3 µm pitch. When compared to OLEDs, µLEDs are more stable components and they can reach very high light intensities, which makes them useful for applications such as head mounted display systems. The µLEDs may be used in example embodiments to provide dense matrices of individually addressable light emitters that can be switched on and off very fast.

One bare µLED chip emits a specific color with spectral width of ~20-30 nm. A white source can be created by coating the chip with a layer of phosphor, which converts the light emitted by blue or UV LEDs into a wider white light emission spectra. A full-color source can also be created by placing separate red, green and blue LED chips side-by-side as the combination of these three primary colors creates the sensation of a full color pixel when the separate color emissions are combined by the human visual system. The previously mentioned very dense matrix would allow the manufacturing of self-emitting full-color pixels that have a total width below 10 µm (3×3 µm pitch).

Light extraction efficiency from the semiconductor chip is one of the parameters that determine electricity-to-light efficiency of LED structures. There are several methods that aim to enhance the extraction efficiency and thus make it possible to build LED-based light sources that use the available electric energy as efficiently as possible, which is especially important with mobile devices that have a limited power supply. One method uses a shaped plastic optical element that is integrated directly on top of a LED chip. Due to lower refractive index difference, integration of the plastic shape extracts more light from the chip material in comparison to a case where the chip is surrounded by air. The plastic shape also directs the light in a way that enhances light extraction from the plastic piece and makes the emission pattern more directional. Another method enhances light extraction from a µLED chip. This is done by shaping the chip itself to a form that favors light emission angles that are more perpendicular towards the front facet of the semiconductor chip and makes it easier for the light to escape the high refractive index material. These structures also direct the light emitted from the chip. In the latter case, the extraction efficiency in one example case was calculated to be twice as good when compared to regular µLEDs and considerably more light was emitted to an emission cone of 30° in comparison to the standard chip Lambertian distribution where light is distributed evenly to the surrounding hemisphere.

Overview of Some Example Display Structures.

The present disclosure describes optical methods and systems that can be used for creating high-resolution 3D images with crossing beams. Light is generated on a light-emitting layer (LEL) containing individually addressable pixels. The light-emitting layer may be, e.g., a µLED or laser diode (LD) matrix or an OLED display. A layer of repeating optical elements collimates and splits the emitted light into several beams and beam sections that focus to different distances from the structure. Several individual features in the periodic layer that can be, e.g., a polycarbonate foil with UV-cured refractive or diffractive structures work together as a cluster. The periodic layer has repeating small features arranged as a mosaic pattern where each feature has specific curvature, tilt angle and surface properties. A spatial light modulator (SLM), which can be e.g. an LCD panel, is used in front of the periodic layer for selective blocking or passing of the beam sections that are used for 3D image formation. The mosaic lens and SLM have synchronized distributed small aperture clusters that aim to lower the effects of diffraction blur and increase image resolution.

While some examples herein are described with reference to a periodic layer, it should be noted that the features of the optical layer are not necessarily periodic. For example, different distributed lenses may have different arrangements of the lens regions that make up the corresponding distributed lens.

The whole optical system may be used for forming voxels with crossing beams. The voxels can be located at different distances both in front of and behind the display as well as on the display surface. The different beam sections focus to different distances from the optical structure imaging the sources to different-sized spots depending on the distance. As the effective focal length for each mosaic feature can be selected individually, the geometric magnification ratio can also be affected resulting to smaller source image spots and better resolution. Aperture clusters are selected with the goal of reducing diffraction effects and increasing spatial resolution. A beam originating from a single source is split into several sections and is used in forming the voxel image to one eye, creating the correct retinal focus cues. Two beams crossing at the correct voxel distance are used for creating the full voxel to the two eyes, and they induce the correct eye-convergence angles. As both retinal focus cues and convergence angles can be created separately, the system can be designed to reduce VAC. Together, the source matrix, periodic layer features and SLM form a system that is capable of generating several virtual focal surfaces into the 3D space around the display.

Some embodiments of the systems and methods described herein can be used for creation of 3D displays with relatively simple and thin display optics without moving parts. Some methods address the VAC problem by providing a 3D display with multiple focal planes.

The use of a mosaic periodic layer and SLM allows separate control over the optical system effective focal length and geometric magnification ratio without reducing display field of view (FOV) and beam aperture size excessively. This makes it possible to image smaller voxels and improve image resolution on virtual focal planes outside the display surface.

In some embodiments, a continuous emitter matrix on the light-emitting layer allows very wide FOVs, which makes it possible to create wide viewing windows for multiple users. Such displays may be made without curvature or additional focusing optics that would overlap the FOVs from display edge areas, simplifying the system further. As the single voxel-forming beam is split to several sections and distributed apertures are used, diffraction effects can be reduced by expanding the overall beam aperture size.

Example display structures described herein may be suitable for mobile devices as the mosaic periodic layer or other distributed-lens optical layer allows high resolution voxels and relatively thin display structures. Mobile devices are also used at close range, making resolution a high priority.

The spatial light modulator functionality allows for the use of LCD panels in some embodiments. The SLM pixels may be used only with binary on-off functionality if the light emitting pixels (e.g. µLEDs) are modulated separately. However, an LCD panel may also be used for pixel intensity modulation in some embodiments, making it possible to keep light emitting layer controls simpler. Switching speed requirements for the spatial light modulator are achievable as it is desirable in some embodiments to reach flicker free images of ~60 Hz with the SLM. Main 3D image generation is done with the faster pixelated light emitter module behind the aperture controlling structure, and the spatial light modulator is only used for passing or blocking parts of the beams intended to reach the viewer eyes, making the human visual system as the determining factor for spatial light modulator update frequency.

3D Display Optical Structure and Function.

This disclosure presents an optical methods and systems that can be used for creating high-resolution 3D images with crossing beams. FIG. 10 shows schematically an example of a 3D display optical structure and its functionality. Light is generated on a layer containing individually addressable pixels. A layer of repeating optical elements collimate and split the emitted light into several beam sections that focus to different distances from the structure. Several individual features in the periodic optical layer work together as a cluster. The repeating small features may be arranged as a mosaic pattern where each feature has specific curvature, tilt angle and surface properties. A spatial light modulator (SLM) is used in front of the periodic layer for selectively blocking or passing of the beam sections that are used for 3D image formation on focal surfaces that can be located outside the display surface. The mosaic patterns follow distributed aperture shapes that can designed to reduce diffraction effects in the case of small apertures. Adjustable aperture patterns are created with the SLM.

FIG. 10 is a schematic cross-sectional side or top view illustrating a portion of a 3D display according to some embodiments. Some embodiments provide an optical method and basic construction of an optical system that may be used for creating high-resolution 3D images with crossing beams. As shown in the example in FIG. 10, light is generated on a layer 1302 containing a two-dimensional array of individually addressable pixels. A layer 1304 of repeating optical elements referred to here as a periodic layer collimates and splits the emitted light into several beam sections that focus to different distances from the structure. Several individual features in the periodic layer may work together as a cluster. The repeating small features may be arranged as a mosaic pattern where each feature has specific curvature, tilt angle, and surface properties. A spatial light modulator (SLM) 1306 may be used to selectively block or pass the beam sections that are used for 3D image formation. The SLM 1306 may be positioned in front of or behind the periodic layer. The blocking and passing of beam sections may be used to form images on a number of focal surfaces which may be determined by the periodic mosaic layer properties.

In the example of FIG. 10, to generate a voxel at position 1310 in front of the display surface, light is emitted from a position 1308 (e.g. from a pixel at position 1308). The emitted light passes through the optical layer 1304, and the SLM 1306 operates to control the light that exits the display surface. (Transparent portions of the SLM are illustrated as empty boxes and opaque portions of the SLM are illustrated as blackened boxes.) In this example, the SLM 1306 only allows light from the central portions of the mosaic cell 1312 to exit the display. Those rays converge at voxel 1310. Voxel 1310 lies on an image plane 1314. Voxel 1310 may be an image of the light emitting element at position 1308. Other voxels may be displayed on image plane 1314 using analogous techniques.

To generate a voxel at position 1316, light is emitted from pixels at positions 1318 and 1320 of the light-emitting layer, and the SLM 1306 operates to permit passage only of the light focused on the voxel position 1316 while blocking other light (e.g. blocking light that would otherwise be focused on image plane 1314 or elsewhere). Voxel 1316 may include the superimposed images of the light emitting elements at positions 1318 and 1320. Voxel 1316 lies on an image plane 1322. Other voxels may be displayed on image plane 1322 using analogous techniques. As is apparent from FIG. 10, a voxel may be generated using light from a single pixel or light from more than one pixel. Similarly, a voxel may be generated using light that passes through a single mosaic cell or light that passes through more than one mosaic cell. While FIG. 10 illustrates generation of voxels in front of the display surface, further examples are given below in which voxels are generated on or behind the display surface.

The light emitting layer (LEL) may be, e.g., a µLED matrix, OLED display or LCD display with backlight. An optical layer such as a periodic layer with mosaic optical features is placed in front of the LEL structure, and it can be e.g. a polycarbonate foil or sheet with refractive optical shapes manufactured by UV-curing in roll-to-roll process. As most sources (e.g. µLEDs) emit light into fairly large numerical apertures (NA), several individual optical features in the layer work together as a cluster that collimates and focuses the light from a single emitter into several beam sections that form light source images. The number of features utilized in the formation of a single light source image depends on the source NA, distance between the LEL and periodic layer and layer feature design. In some cases, at least two beam sections are used for one source image in order to provide focus cues for a single eye. At least two beams with at least two sections are used for the correct eye convergence cues. Optical structures may be one-dimensional (e.g. cylindrical refractive features tilted to one direction) if only horizontal views are desired, or they may be two-dimensional (e.g. biconic microlenses) if views are desired in both directions.

The optical layer may be a periodic layer containing repeating periodic features that are formed from smaller optical sub-features constructed in a mosaic pattern. Each smaller mosaic sub-feature or tile of the periodic layer repeating feature can have different optical properties depending on the refractive index, surface shape and/or surface property. Surface shapes used can be simple flat facets, continuous curved surfaces with different curvature in the two directions, or diffusing rectangles with optically rough surfaces among other alternatives. The tiles can populate different surface areas with different patterns on the repeating feature.

The tiles of a mosaic pattern may collimate and split the emitted light into different beam sections that travel to slightly different directions depending on the tile optical properties. The beam sections may be focused to different distances from the optical structure, and the focusing may be made in both vertical and horizontal directions. Spots imaged further away from the display are generally bigger than spots imaged to a shorter distance as discussed above. However, as the effective focal length for each mosaic feature tile can be selected individually, the geometric magnification ratio can also be affected in order to reach smaller source image spots and better resolution. The distributed apertures are used in reducing diffraction from small mosaic feature aperture sizes making it possible to use geometric imaging for retinal focus cue creation. Neighboring light emitters inside one source matrix are imaged into a matrix of spots. Together the source matrix, periodic layer mosaic features and SLM form a system that is capable of generating several virtual focal surfaces into the 3D space around the display.

Figures 11A, 11B:
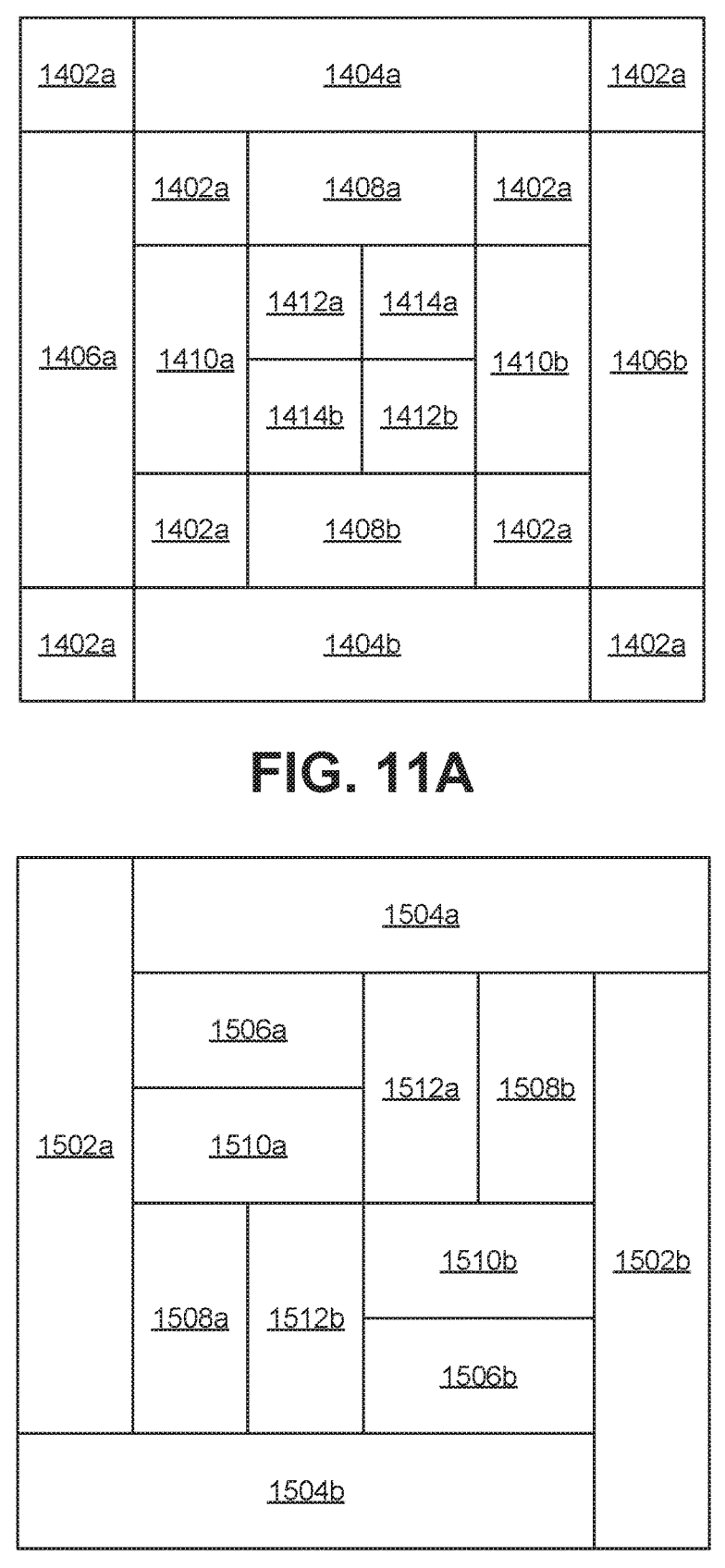

FIG. 11A is a schematic front view illustrating an arrangement of optical tiles with an example mosaic cell according to some embodiments. In this example, the optical tiles 1402a are translucent (e.g. optically rough) optical tiles that scatter light traveling through them. The optical tiles 1404a-b and 1406a-b are configured to focus light to a first focal distance. Two of these tiles, 1406a-b, are used for focusing the beam sections in the x-direction, and two of them, 1404a-b are used for focusing in the orthogonal y-direction. Similarly, four more tiles, 1408a-b and 1410a-b are used for focusing the beam sections to a second focal distance. The four tiles in the center of the mosaic cell, 1412a-b and 1414a-b, are used for focusing the beams in both directions to a third focal distance. In the arrangement presented in the first example pattern, the rectangular corners of each nested focus zone may be used for creating 2D display images with higher pixel resolution. In some embodiments, these tiles, or "2D pixels," may have rough surfaces or other translucent feature so as to scatter the light into all angles making the pixels visible from all viewing directions. In some embodiments, the 2D pixels may be used in the 3D image formation when the voxels are located at the display surface.

FIG. 11B is a schematic front view illustrating an example mosaic pattern of a mosaic cell of a periodic feature according to some embodiments. The example pattern depicted in FIG. 11B, shows a similar arrangement, but without translucent 2D pixel features. Optical tiles 1502a-b and 1504a-b are operative to focus light to a first focal distance. Optical tiles 1506a-b and 1508a-b are operative to focus light to a second focal distance, and optical tiles 1510a-b and 1512a-b are operative to focus light to a third focal distance. The tiles that focus to the second and third distances have the same total area, which may help balance out light intensity falling on these two focal layers. In this case, the first focal layer is created with larger surface area tiles, which makes it possible, e.g., to emphasize some focal surface with higher light intensity or to increase the amount of light on a larger sized voxel in order to balance the irradiance. These larger areas may also be used as 2D display pixels with higher intensity when the 3D image is not formed.

Figure 12A:
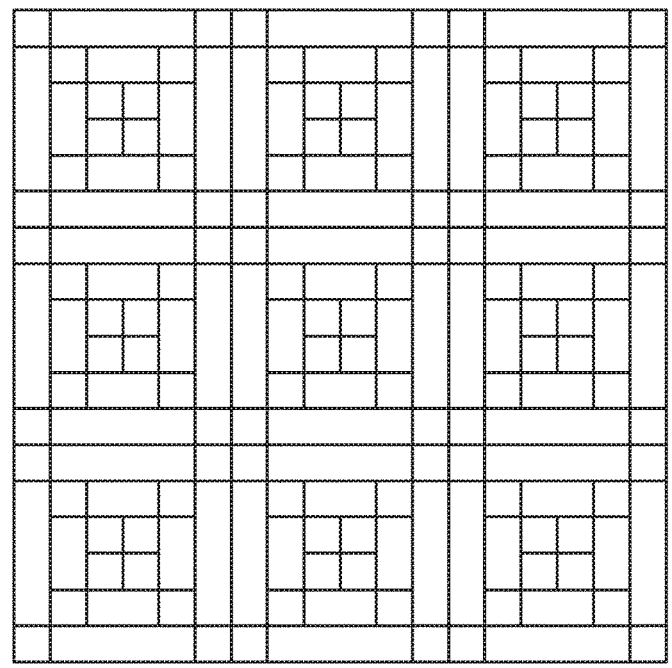
FIG. 12A depicts an example array of mosaic pattern periodic features, in accordance with some embodiments.
Figure 12B:
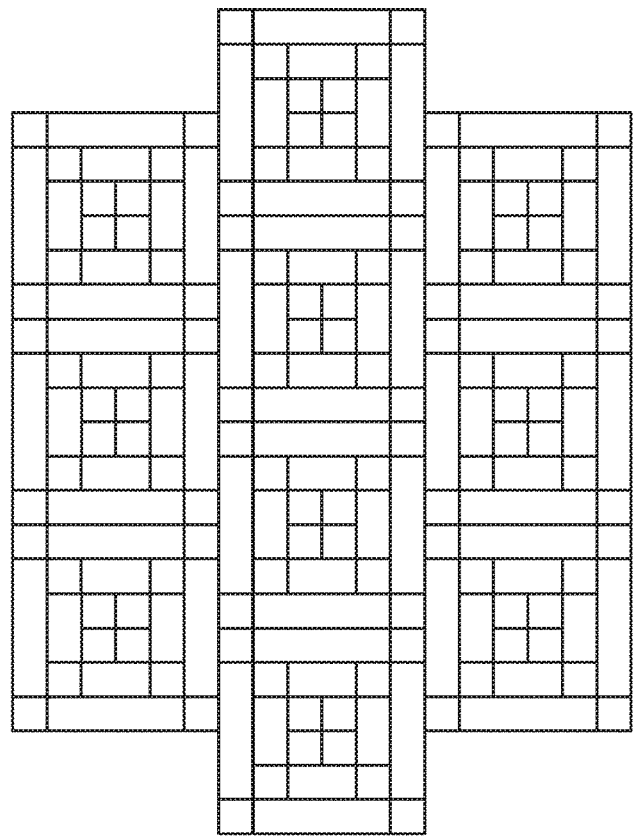
FIG. 12B depicts an example array of mosaic pattern periodic features, in accordance with some embodiments.

FIG. 12A is a schematic front view illustrating an example two-dimensional array of mosaic cells in an optical layer according to some embodiments. Mosaic cells may be arranged into different array patterns on the periodic layer. FIGS. 12A-12B depict two examples of array patterns, in accordance with some embodiments. In a first example, shown in FIG. 12A, the mosaic cells form a rectangular matrix where the rows and columns form straight horizontal and vertical lines. This pattern may allow easier rendering calculations as the generated voxels are also arranged into a rectangular matrix.

FIG. 12B is a schematic front view illustrating an example array of a mosaic pattern of a periodic feature according to some embodiments. A second example array pattern illustrated in FIG. 12B depicts an alternative arrangement wherein there is an offset (e.g. vertical or horizontal) between neighboring columns. This pattern may be useful for increasing the effective resolution, e.g., in the case where only horizontal crossing beams are generated.

The periodic layer can be manufactured e.g. as a polycarbonate sheet with optical shapes made from UV-curable material in roll-to-roll process, or it can be a foil with embossed diffractive structures, among other options. It can also be a sheet with graded index lens features or a holographic grating manufactured by exposing photoresist material to laser-generated interference pattern. Individual sub-feature sizes and pattern fill-factors have a direct effect on the achievable resolution and e.g. to the amount of image contrast reducing stray light introduced to the system. High quality optics manufacturing methods are desirable for producing the master, which is then replicated. As the single feature is very small, the first master with the appropriate shapes can also be very small in size making the manufacturing lower cost. And as this same pattern is repeated over the whole display surface, there is no need to accurately align the light emitting layer with the periodic layer in the horizontal or vertical directions. The depth direction is more sensitive to alignment as it determines the location of focal surfaces outside the display surface.

Figure 13A:
FIG. 13A depicts an example spatial light modulator (SLM) pixel color filter arrangements with a periodic feature, in accordance with some embodiments.
Figure 13B:
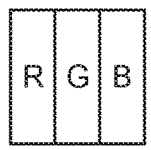
FIG. 13B depicts an example SLM pixel color filter arrangement with a periodic feature, in accordance with some embodiments.

In some embodiments, the SLM is placed in front of the periodic mosaic layer. In some embodiments, the SLM is an LCD panel and it is used for selectively blocking or passing parts of the projected beams. As the whole continuous optical structure may be used for creation of the multiple beam sections, there is not necessarily a clearly defined display pixel structure, and the LCD may be used as an adaptive mask in front of the light-beam-generating part of the system. Pixel sizes are preferably small and may be in the same size range or smaller than the periodic feature tile size. If the pixels are much smaller than the feature tiles, there is less need for accurate alignment of periodic layer to the SLM, but if the pixels are the same size, good alignment is desirable between these two layers. Pixels can be in a regular rectangular pattern or they can be custom made to the periodic mosaic layer optical features. The pixels may also contain color filters for color generation if the light emitted from the LEL is white as in the case of e.g. phosphor overcoated blue µLED matrix. Two example color filter arrangements are shown in FIGS. 13A-13B. If the LEL contains colored pixels (e.g. separate red (R), green (G) and blue (B) µLEDs) the SLM may be used for intensity adjustment of the beams.

In some embodiments, a display system uses a combination of spatial and temporal multiplexing. In this case, it is useful to have an SLM component fast enough to achieve an adequate refresh rate for a flicker-free image. The SLM and light emitting layer may work in unison when the image is rendered. It may be particularly useful for the LEL and SLM to be synchronized. The SLM may be used as an adaptive mask that has an aperture pattern that is, e.g., swept across the display surface when a single source or a group of sources are activated. Several of these patterns may be used simultaneously by masking source clusters simultaneously at different parts of the LEL. In some embodiments, it may be helpful to implement light emitting components (e.g., µLEDs) with faster refresh rates than the SLM. In this way, the sources may be activated several times within a refresh period of the SLM (e.g., an SLM having a 60 Hz refresh rate). Eye tracking may also be used for lowering the requirements for the update speed by rendering images to only some specified eyebox regions rather than rendering images to the display's entire FOV.

Figure 14:
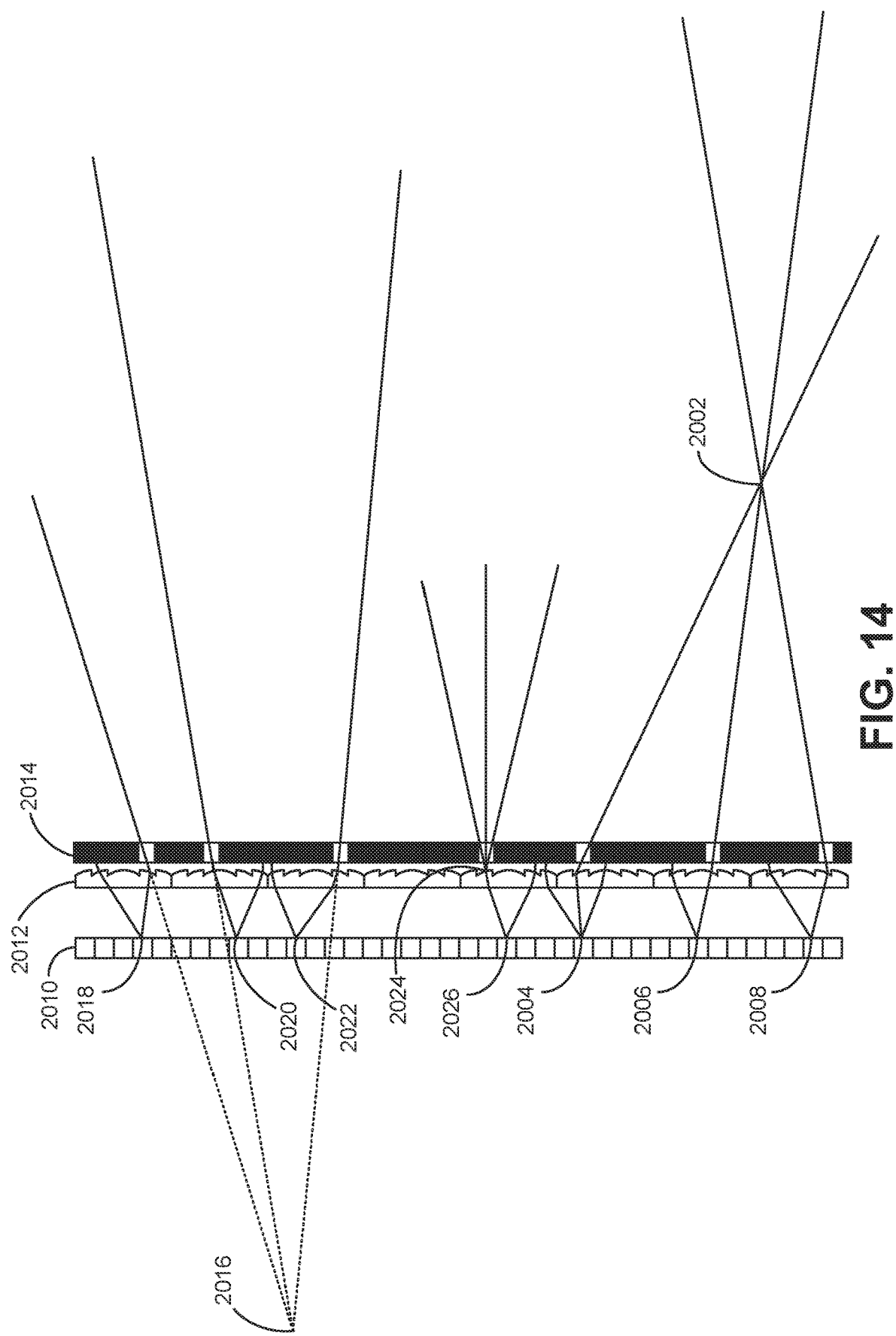
FIG. 14 illustrates the formation of voxels, in accordance with some embodiments.

FIG. 14 is a schematic cross-sectional side or top view illustrating an example configuration used for formation of voxels according to some embodiments. In some embodiments, the optical system may implement the use of crossing beams to form voxels. These voxels may be formed at different distances from the display surface (e.g., in front of the display, behind the display, and/or on the display surface). FIG. 14 is a schematic diagram illustrating an example voxel 2002, which is created in front of the display at a specific focal distance with beams originating from light sources at positions 2004, 2006, 2008 on the light-emitting layer 2010. The light from the sources at positions 2004, 2006, 2008 is refracted to different directions by the optical layer 2012, and spatial light modulator 2014 allows the transmission of light directed toward the voxel 2002 while blocking light that is not directed toward voxel 2002 and is not used to generate other voxels.

In the example of FIG. 14, a voxel 2016 is generated at a voxel position behind the display by crossing the virtual extensions of the beam sections emitted from light sources at positions 2018, 2020, and 2022 on the light-emitting layer 2010. The light from the sources at positions 2018, 2020, and 2022 is refracted to different directions by the optical layer 2012, and spatial light modulator 2014 allows the transmission of light directed from the position of voxel 2016 while blocking light that is not directed from the position of voxel 2016 and is not used to generate other voxels. In some embodiments, several sources may be used in order to compensate for the lower light intensity propagating to the eye direction due to wider angular spread of the beam sections.

In the example of FIG. 14, a voxel 2024 is generated at a position on the display. Light from a source at position 2026 is scattered by a translucent optical tile on the optical layer 2012 at the voxel position 2024. Spatial light modulator 2014 allows the transmission of the scattered light to the exterior of the display while blocking the transmission of light from other optical tiles.

FIG. 14 shows an example in which a voxel 2024 is generated on the display surface while other voxels (2002, 2016) are generated in front of and behind the display surface. However, in some embodiments, the display may operate to generate only voxels on the display surface. This may be done by operating the spatial light modulator such that only light passing through translucent optical tiles reaches the exterior of the display device. Such voxels may be used as 2D pixels for display of a 2D image on the display surface.

In some embodiments, voxels are created by combining two beams originating from two neighboring sources as well as from two beam sections that originate from a single source. The two beam sections may be used for creating a single beam focus for the correct eye retinal focus cue, whereas the two combined beams may be used for covering the larger FOV of the viewer eye pair. This configuration may help the visual system correct for eye convergence. In this way, the generation of small light emission angles for single eye retinal focus cues and the generation of larger emission angles for eye convergence required for the stereoscopic effect are separated from each other in the optical structure. The arrangement makes it possible to control the two angular domains separately with the display's optical design.

In some embodiments, focal surface distances may be coded into the optical hardware. For example, the optical powers of the periodic layer feature tiles may fix the voxel depth co-ordinates to discrete positions. Because single eye retinal focus cues may be created with single emitter beams, in some embodiments a voxel may be formed by utilizing only two beams from two emitters. This arrangement may be helpful in simplifying the task of rendering. Without the periodic features, the combination of adequate source numerical aperture and geometric magnification ratio may call for the voxel sizes to be very large and may make the resolution low. The periodic features may provide the ability to select focal length of the imaging system separately and may make smaller voxels for better resolution 3D images.

In some embodiments, created beams may propagate to different directions after the periodic layer. The distance between light emitting layer and periodic beam focusing layer may be used as an aperture expander. In order to reach a specific optical performance, it may be helpful to match the applicable distance values to the size/pitch of the periodic layer feature and the sizes of the individual tiles. It may be useful to expand the single beam aperture as much as possible in order to improve beam focus and to reduce the diffraction effects connected to small apertures. This may be especially useful for voxel layers created closer to the viewer as the eye resolution becomes higher and geometric magnification forces larger voxel sizes. Both beam sections may cross at the voxel position on the focal surfaces and reach the viewer's single eye pupil in order to create the right retinal focal cues without too much diffraction blur.

Distributed Aperture Design Features for Reduction of Diffraction Blur.

As discussed above, diffraction blurs projected source images and lowers 3D image voxel resolution considerably when small apertures are used with mosaic features. If the aperture sizes are small enough, geometric imaging is not feasible as diffraction effects dominate beam divergence. In these cases the beams will have the smallest visible spot located on the display surface where the apertures diffract light, and geometric imaging does not provide sufficient retinal focus cues. Diffraction effects can be mitigated by making the optical aperture larger. In some embodiments, distributed aperture designs are used in increasing the projection optics aperture size without substantially sacrificing spatial resolution on the display surface. The distributed designs allow aperture interlacing, which makes it possible to increase voxel resolution as the projected beams can also be interlaced and voxels can be formed at higher spatial resolution than with standard continuous apertures.

To provide distributed apertures that suppress diffraction blur, in some embodiments, a set of smaller apertures is used that sample the desired larger aperture area. In some embodiments, the smaller apertures may be in a continuous chain. In some embodiments, the set of smaller apertures have a center point of symmetry, and in some embodiments one of the smaller apertures is positioned at the center point of symmetry. Aperture cluster extreme dimensions may be selected so as to be adequately large in order to provide small beam divergence and good source imaging properties with limited diffraction blur.

The arrangement of smaller apertures may be selected such that the central intensity maximum in the source retinal image does not become too large, which could lead to low 3D image voxel spatial resolution. The arrangement of smaller apertures may also be selected to substantially minimize the intensity of diffracted secondary spots that lower image contrast. With the use of a set of distributed smaller apertures, the central retinal image spot can be made very small, close to the spot size determined by geometric imaging, and the diffraction blur surrounding projected source image can be greatly reduced.

Distributed Aperture Interlacing.

In order to be compatible with the mosaic lens 3D display approach, the aperture patterns may be interlaced. In some embodiments, the distributed aperture cluster has a design that can be overlaid with other aperture clusters without overlaps or unutilized surface areas. Different designs will also lead to somewhat different achievable spatial resolutions as the pitch between repeating patterns is dependent on the way the clusters can be ordered on the SLM.

Figure 15A:
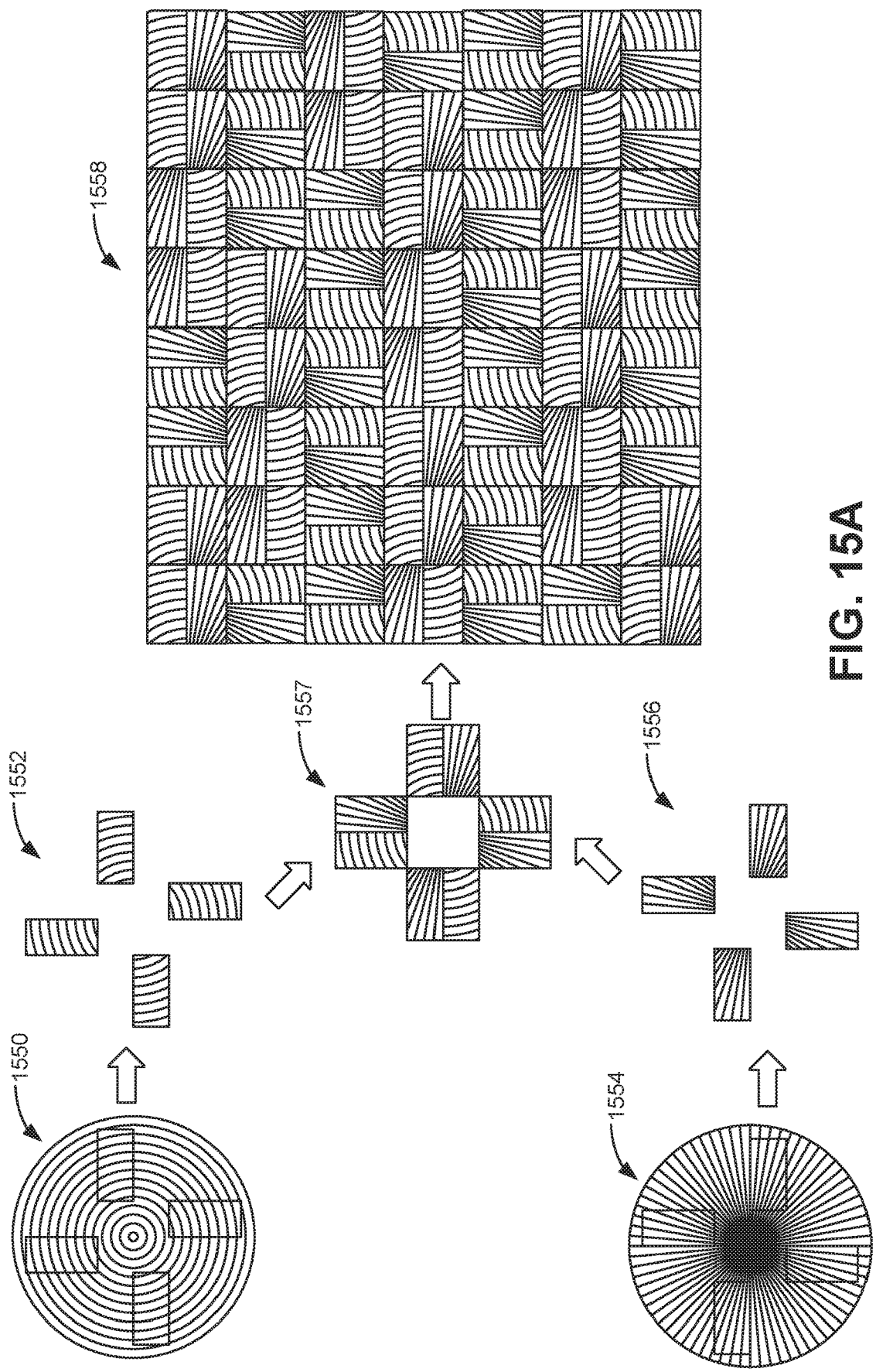
FIGS. 15A-15O illustrate example aperture cluster designs that can be interlaced.
Figure 15B:
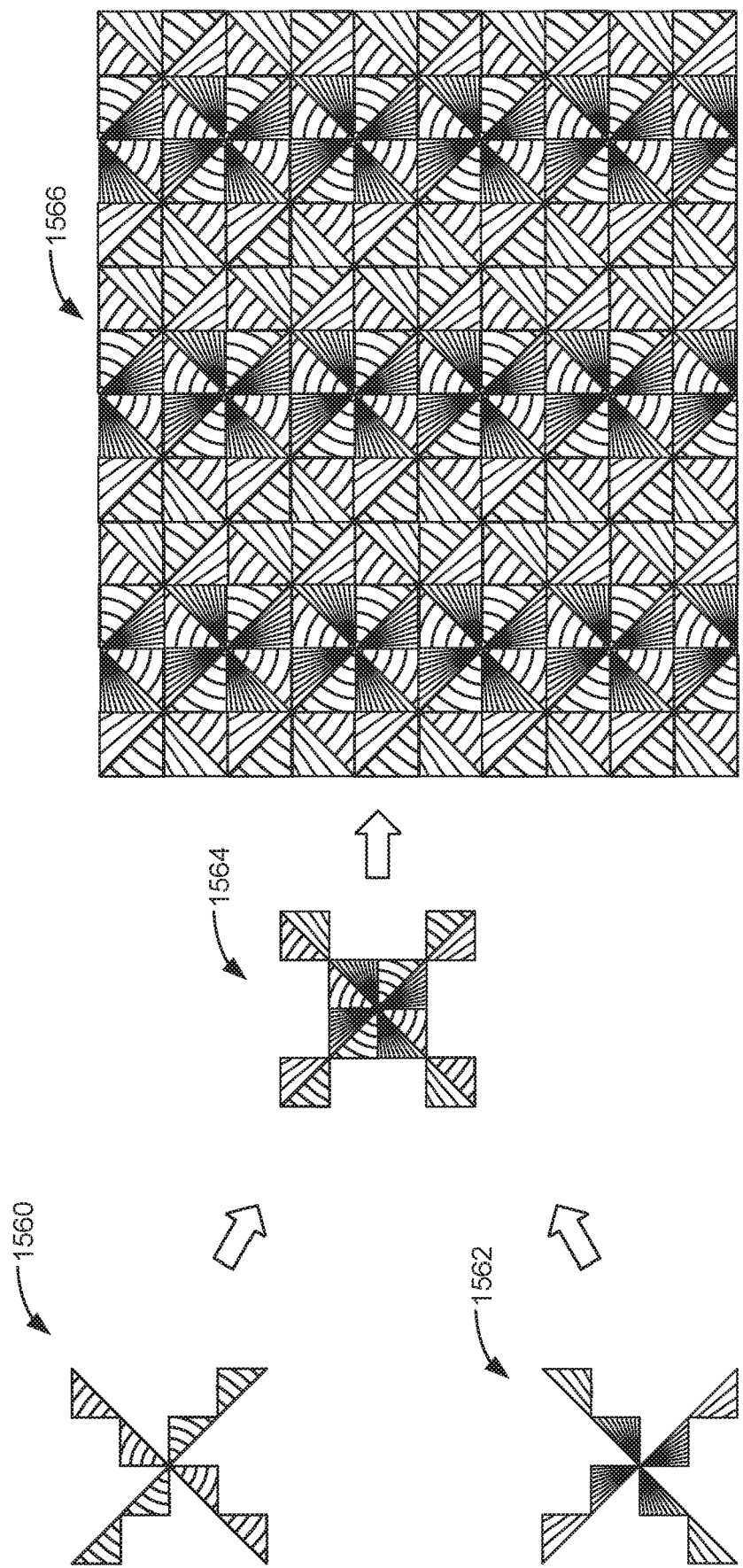
Figure 15C:
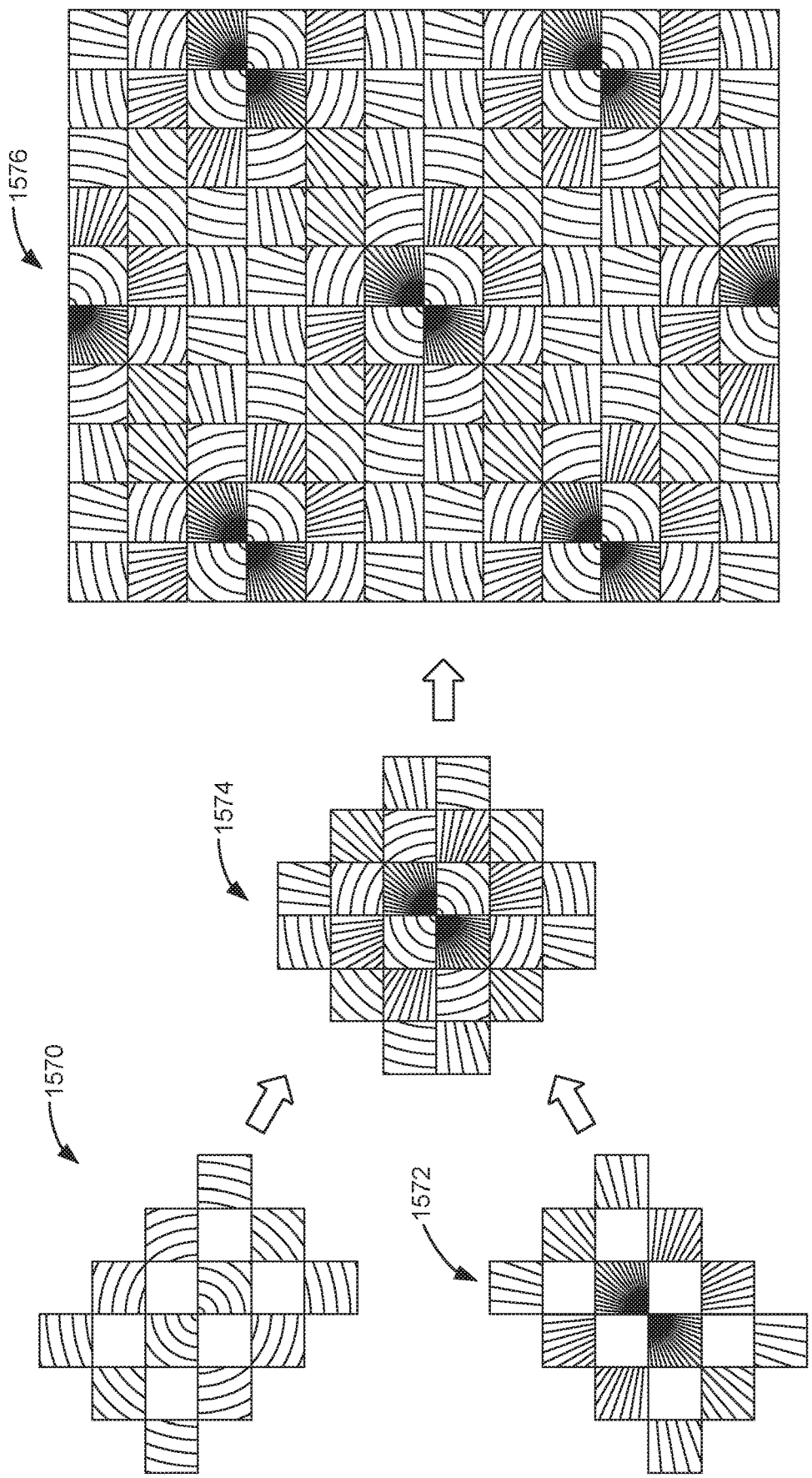

The checkerboard pattern of FIG. 15C with twelve square apertures may be advantageous for a small scale display as it combines adequate diffraction removal and the possibility of interlacing. Optical performances of the rectangular and triangular aperture cluster example cases fall somewhere between the four circular aperture case and the checkers board pattern case. These may be used also in a small scale display with slightly lowered optical performance, or they may be used when the display size is somewhere in the intermediate range between small mobile and large wall-sized screen. Another example of an aperture design case is presented in FIG. 15B, which may use a 750 µm wide aperture pattern with triangles to produce an adequate retinal focus cue. In the mosaic display approach, design of the aperture cluster and mosaic lens may be adapted for the particular use case, with mosaic feature aperture size influencing how much diffraction removal is desirable. Large screen sizes have more freedom for the interlaced aperture designs whereas small mobile screens with high resolution may be designed for greater diffraction suppression.

As examples of interlaced designs, different aperture clusters are illustrated in FIGS. 15A-15C. In all of these examples, two different lens shapes are covered with two aperture clusters that are mirror images of each other. These two distributed aperture geometries are combined by interlacing and together they form one aperture cluster tile. The tiles can be placed into a continuous mosaic pattern that repeats the shapes of the original apertures without overlapping or empty areas between the aperture clusters.

With reference to FIG. 15A, a first distributed lens 1552 is illustrated schematically as representing sampled portions of a conventional (e.g. circularly symmetric) lens 1550. Similarly, a second distributed lens 1556 is illustrated schematically as representing sampled portions of a conventional (e.g. circularly symmetric) lens 1554. Distributed lenses 1552 and 1554 are mirror images of one another. They may have the same optical power, or they may have different optical powers. The distributed lenses 1552 and 1554 may be combined without overlap, as shown at 1557, and a plurality of examples of those distributed lenses may be interlaced in a pattern on an optical layer as shown at 1558.

Similarly, with reference to FIG. 15B, a first distributed lens 1560 and a second distributed lens 1562 are mirror images of one another. They may have the same optical power, or they may have different optical powers. The distributed lenses 1560 and 1562 may be combined without overlap, as shown at 1564, and a plurality of examples of those distributed lenses may be interlaced in a pattern on an optical layer as shown at 1566.

With reference to FIG. 15C, a first distributed lens 1570 and a second distributed lens 1572 are mirror images of one another. They may have the same optical power, or they may have different optical powers. The distributed lenses 1570 and 1572 may be combined without overlap, as shown at 1574, and a plurality of examples of those distributed lenses may be interlaced in a pattern on an optical layer as shown at 1576.

The pitch between two full imaging beams emitted from the display is determined when the final distributed aperture interlaced mosaic pattern is created. The aperture clusters may be configured to have different pitch values for vertical, horizontal and diagonal directions, depending on the use case. For example, a static tabletop display may have better angular resolution in the horizontal direction, but a mobile phone display may have equal resolutions in both directions as it can be operated in portrait or landscape modes. The mosaic patterns shown in FIGS. 15A and 15B have different pitches in vertical and horizontal directions, but the example mosaic pattern shown in FIG. 15C has equal pitches in the two directions.

In some embodiments, the distributed interlaced mosaic pattern is formed from several different aperture cluster geometries. Some of these aperture clusters may be larger for better diffraction control and some may be smaller in order to create a large diffraction pattern for example in the case where the voxel is created on the display surface. The desired voxel size may be different for different 3D image focal depths. Some embodiments use bigger and more continuous apertures for the creation of voxels that are closer to the viewer and use higher resolution source images. Such embodiments may use smaller or less continuous distributed apertures for more distant voxels.

Example 3D Display Properties.

One factor to be considered in the design of a 3D display structure is the fact that optical materials refract light with different wavelengths to different angles (color dispersion). As a result, if three colored pixels (e.g., red, green and blue) are used, the different colored beams are tilted and focused to somewhat different directions and distances from the refractive features. In some embodiments, color dispersion may be compensated in the structure itself by using a hybrid layer where, e.g., diffractive features are used for the color correction. As the colored sub-pixels may be spatially separated on the LEL, there may also be some small angular differences to the colored beam projection angles. If the projected images of the source components are kept small enough on the focal surface layers, the three colored pixels will be imaged next to each other and combined into full-color voxels by the eye in a manner analogous to what is seen with the current regular 2D screens where the colored sub-pixels are spatially separated. The colored sub pixel images of the 3D display structure are highly directional and it may be useful to ensure that all three differently colored beams enter the eye through the pupil.

Physical size of the light emitting elements and total magnification of the display optics may affect the achievable spatial resolution on each 3D image virtual focal surface. In the case that the light emitting pixels are focused to a surface that is located further away from the display device, the geometric magnification may make the pixel images larger than in the case where the focal surface is located closer to the display. In some embodiments, the use of the periodic layer makes it possible to increase the focal length without making the aperture size of the optics or the source images at the display surface too large. This is a performance benefit of the presented method as it makes it possible to achieve relatively high resolution 3D image layers both at the display surface and at the focal surfaces outside the display.

As explained previously, diffraction may also affect achievable resolution, e.g., in the case that the light emitter and microlens aperture sizes are very small. The depth range achievable with the display and rendering scheme may be affected by the quality of beam collimation coming from each sub-pixel. The sizes of the light-emitting pixels, the size of the periodic layer tile aperture, and tile's effective focal length are three parameters that may affect collimation quality. Small SLM apertures in front of the periodic layer may also cause diffraction if the pixel size is small (e.g., in the case of mobile devices). However, the selection of aperture size may be made in such a way that larger aperture clusters are used when the voxel distance is larger. In this way, diffraction effects may be minimized in order to achieve better resolution. In particular, some embodiments operate to render the voxels for single eye focus with a single source that generates two or more beam sections with the help of the optical structure. This allows beam interference and reduced diffraction blur. The use of distributed aperture clusters as described herein contribute to diffraction blur removal.

In some embodiments, a continuous emitter matrix on the LEL allows for wide FOVs. Due to the fact that the focal length used in geometric imaging can be effected separately with the periodic mosaic layer, example embodiments make it possible to achieve both good resolution and large viewing zone simultaneously. However, this may come with the cost of lowered light efficiency as only a smaller portion of the emitted light is used in voxel formation when the effective focal length of the focusing tiles is increased for better resolution. A large portion of the optical power is absorbed to the SLM layer as only some parts of the beams are passed for the image formation.

The periodic layer in front of the light sources makes it possible to utilize better wide light emission patterns typical to components like OLEDs and μLEDs. For embodiments in which the lens cluster layer is continuous, there is no need to align the mosaic tiles to specific sources if the source layer has a substantially continuous matrix of emitters. However, as the typical Lambertian emission pattern makes light intensity drop towards larger angles in comparison to the surface normal direction, it may be desirable to calibrate the beam intensities with respect to beam angle. This calibration or intensity adjustment can be made, e.g., by selecting the spatial light modulator transmissions accordingly or by adjusting the light emission of the source with current or pulse width modulation.

In some embodiments, a spatial light modulator positioned in front of the periodic layer may also be used for blocking stray light coming from the previous optical layers. The optical layers may be treated with antireflection coatings in order to avoid multiple reflections from the refractive surfaces. These reflections can cause stray light that lowers image contrast. As the SLM is used for blocking parts of the emitted beams, it can also be used effectively to block the stray reflections from optical elements. The SLM functions as an adaptive mask that has small adjustable apertures in front of selected source clusters, and this mask may be swept across the display surface. During these sweeps, it can block or pass the appropriate beams and suppress the localized stray light emissions simultaneously.

While the SLM is described in many of the examples here as being positioned between the light-emitting layer and an optical layer, in some embodiments, the optical layer is between the light-emitting layer and the SLM, such that the SLM modulates light that has already passed through the optical layer.

Example 3D Display Rendering Schemes.

Several different kinds of rendering schemes can be used together with the presented display structures and optical methods. Depending on the selected rendering scheme, the realized display device may be operated as a 3D display with multiple views and focal surfaces or as a regular 2D display. This latter functionality can be supported also by optical hardware design.

In a 3D rendering scheme according to some embodiments, one goal is to create several focal points or focal surfaces in front of the viewer(s) in front of or behind the physical display surface in addition to the multiple viewing directions. In general, this calls for the generation of at least two projected beams for each 3D object point or voxel. A single sub-pixel inside the display may have a FOV that makes it visible to one eye only at any given time, but the created voxel in general should have a FOV that covers both eyes simultaneously in order to create the stereoscopic view. The voxel FOV is created as a sum of individual beam FOVs when more than one beam is used at the same time. For all voxels that are between the display and observer, the convergence beams may cross in front of the display at the correct voxel distance. In a similar way the voxels positioned at a further distance from the observer than the display may have a beam pair virtually crossing behind the display. Crossing of the (at least) two beams is able to generate a focal point (or surface) that is not at the display surface. It is desirable for the separate beams to focus to the same spot where they cross. The use of mosaic periodic layer features makes it possible to create single beam focuses with this method, and more natural retinal focus cues can be created. In some cases, the distributed apertures may also create extended depth of field imaging beams. Extended beam waists allow continuous crossing depth range without resolution reduction and more natural retinal focus cues can be created with simple rendering methods that use only emitter positioning for the correct beam angle selection and initiation of eye convergence.

As 3D rendering can call for heavy calculations, it may be desirable to reduce the 3D data to certain discrete depth layers that are just close enough to each other for the observer visual system to have continuous 3D depth experience. Covering the visual range from 50 cm to infinity would take about ~27 different depth layers, based on the estimated human visual system average depth resolution. Example methods and optical hardware allow creation of multiple focal surfaces that can be displayed at the same time due to the fact that the spatially separated mosaic tiles and SLM are used for the depth layer selection. In some embodiments, observer positions are actively detected in the device, and voxels are rendered to only those directions where the observer is located. Active observer eye tracking may be performed using near infrared light with cameras around or in the display structure.

One trade-off situation associated to the rendering scheme can be found between spatial/angular and depth resolutions. With limited number of pixels and component switching speeds one may choose whether to emphasize high spatial/angular resolution with the cost of lower number of focal planes or to have more focal planes for better depth effect with the cost of more pixelated image. The same applies to the data processing at the system level as more focal planes generally use more calculations and higher data transfer speeds. The human visual system allows reduction of depth information when the objects are farther away as the depth resolution decreases logarithmically. At the same time, the eyes can resolve only larger details as the image plane goes farther away. This makes it possible to use rendering schemes that produce e.g. different voxel resolutions at different distances from the viewer lowering the processing speed requirement for image rendering. All of these tradeoffs connected to the rendering scheme can also be adapted on the basis of the presented image content, enabling e.g. higher resolution or image brightness.

In some embodiments, in order to create a full-color picture, three differently colored pixels may be used on the LEL or on the SLM. The color rendering scheme may adapt to the fact that different colors are refracted to somewhat different angular directions at the periodic layer. In addition to a color rendering scheme, some of this dispersion may be removed with hardware, e.g. by integrating diffractive structures to the periodic layer features making them color corrected. This may be useful in compensating for the different focus distances of the refractive tiles. One color rendering scheme is to use white illumination and a SLM that has color filters. White beams can be generated with a combination of e.g. blue µLEDs and thin layer of phosphor. In this case, the beam colors are selected in the SLM (e.g. LCD panel) layer for each focal layer voxel separately, and the three colors are combined in the eye.

EXAMPLE IMPLEMENTATION

Figure 16:
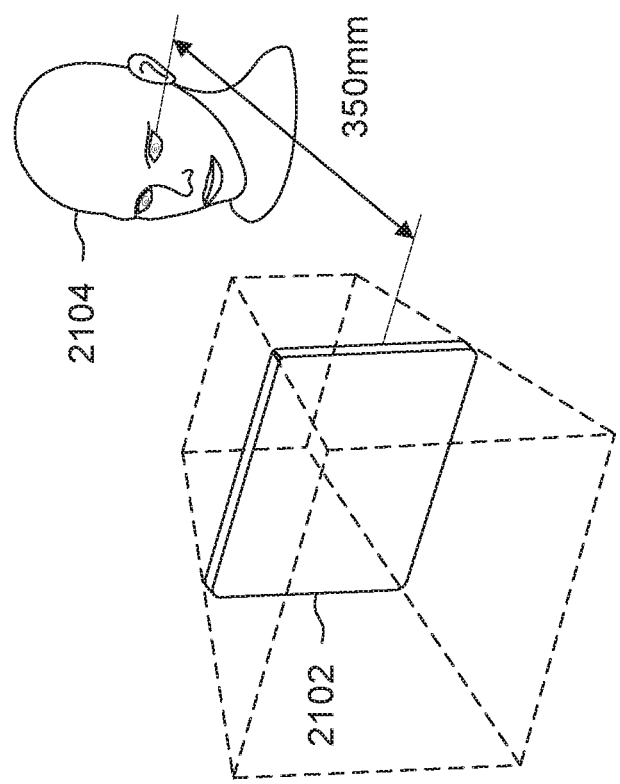
FIG. 16 schematically illustrates an example display system where a mobile 7" 3D display device is viewed from a distance of 350 mm.

One example display according to embodiments described herein is presented below. FIG. 16 illustrates a use case in which a mobile device 2102 with 7" 3D display is placed at 350 mm distance from a single viewer 2104. The display forms an image to a virtual image zone, which is located both in front of and behind the mobile device. In some embodiments, the image zone may cover distances from 281 mm to 463 mm as measured from the viewer eye position. The display is able to generate multiple voxel-forming beams both in the horizontal and vertical directions with presented optical structure. Mosaic lenses are arranged in such a way that the beams are geometrically focused to 69 mm distance from the display. However, the distributed aperture geometry and diffraction extend the beam focus depth and there is no specific visible focus point. A 3D image is rendered to three distinct image planes and voxels created with crossing beams and eye convergence only. Distances between these three discreet voxel planes are set to correspond to eye lens optical power change of 0.7 diopters from each other, making the 3D image look continuous.

Figure 17C:
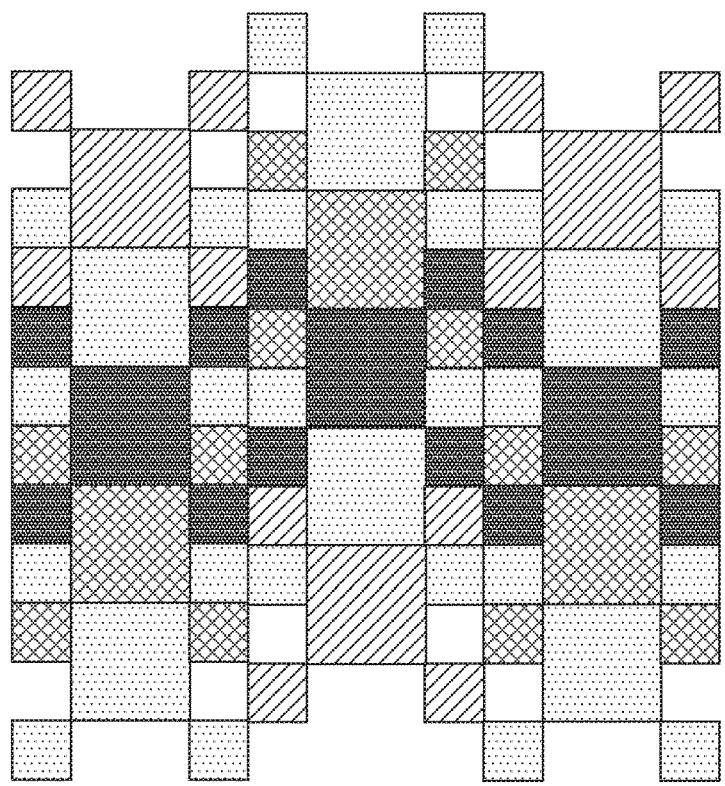
FIGS. 17A-17C schematically illustrate an example optical display design.
Figure 17B:
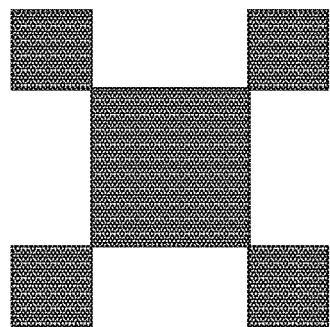
Figure 17A:
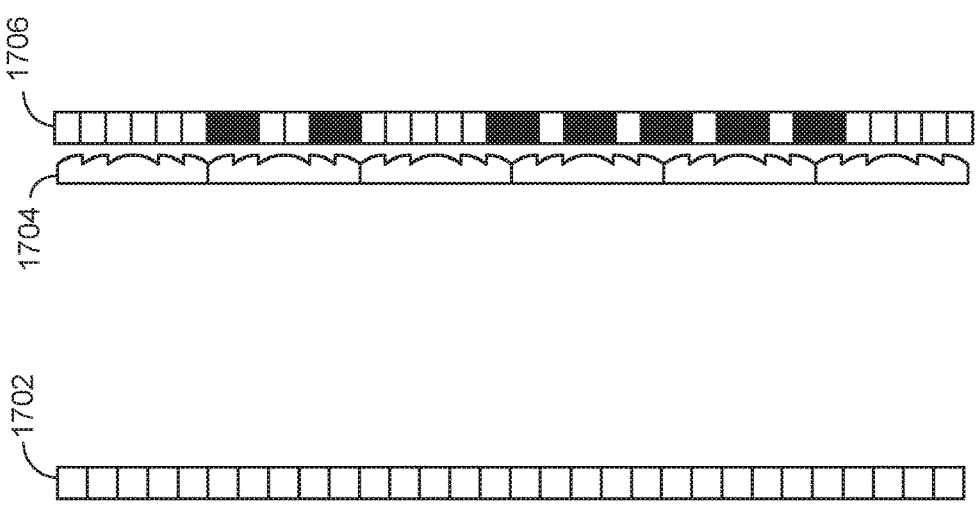

FIG. 17A is a schematic cross sectional view of an example display optical design. Light is emitted from a continuous µLED matrix 1702 where component size is 2 µm×2 µm with a pitch of 3 µm. Red, green and blue components bonded into an interlaced matrix are used for full-color beam generation. A periodic optical beam focusing layer 1704 is placed at ~1.9 mm distance from the emitters and it is made as ~0.08 mm thick foil, which has a polycarbonate substrate layer and micro-optic features made by UV-curing. In one example, the periodic features may have a width of 176 µm. An LCD panel 1706 without color filters is placed right next to (e.g. overlaying or underlaying) the periodic layer and functions as the SLM. Individual LCD pixels may have a width of 44 µm. The whole optical structure may have a thickness below 2.5 mm.

In some embodiments, the periodic features follow a distributed aperture geometry shown in FIG. 17B, with a central square, which may have width and height of 88 µm, and four corner squares, which may have width and height of 44 µm, giving total dimensions of 176 µm×176 µm. This shape may be repeated through the whole periodic layer as an interlaced pattern shown in FIG. 17C. The pattern has different pitch values in the horizontal (88 µm) and vertical (176 µm) directions. As a result, the voxels may have two times better resolution in the horizontal direction, which is the direction of the eye pair in display "landscape" mode.

In some embodiments, a single aspheric optical shape with ~2.0 mm focal length may be used for the light collection and beam generation. In some embodiments, the small aperture cluster used makes the optics into an extended depth of focus system, in which there is no need to have optics of more than one focal depth in the mosaic layer.

In some embodiments, a 0.5 mm thick LCD panel stack with polarizers and patterned liquid crystal layer is placed in front of the light generating part of the system as close to the periodic layer component as practicable. The LCD has 44 µm×44 µm pixels without any color filters. Pixel size of the panel is the same as the smallest periodic layer feature size making it possible to selectively block beams originating from the different aperture shape locations. Accurate alignment is performed between the periodic features and LCD. Such a pixel arrangement makes it possible to use four smaller square parts from four neighboring periodic features corners at the same time as the voxels are created on the display surface or when the display is used in a 2D mode. In the latter, case several emitters may be used simultaneously for one display pixel in order to make the pixel FOV larger. This approach allows higher spatial resolution on the display surface also in the vertical direction, which is a useful feature in a mobile device display that can be switched between landscape and portrait modes. Final 2D image pixel size is 88 µm×88 µm and the 7" display can be operated at Full HD resolution without the 3D image.

The presented methods and optical structures may be suitable for mobile devices with small screen sizes and for head-mounted or other near-eye displays.

Examples of Distributed Lenses.

In some embodiments, the optical layer includes a plurality of distributed lenses. Each distributed lens may correspond to a distributed aperture as described herein. A distributed lens may have two or more lens regions. Within a distributed lens, two or more of the lens regions may be non-contiguous. Lens regions that meet only at a corner may be considered non-contiguous regions.

In some embodiments, lens regions may be considered to be part of the same distributed lens when those lens regions have substantially the same principal focus point. The principal focus point of a lens region in an optical layer is a point at which incident light rays perpendicular to the optical layer would be focused. Principal focus points of distributed lens regions are illustrated schematically in FIG. 18. An optical layer 1802 with a plurality of distributed lenses (lenses A, B, C, D, and E) is illustrated in cross section. Collimated light rays perpendicular to the optical layer are illustrated as entering the optical layer 1802 from the left. It should be noted that, in operation, the optical layer does not necessarily operate on such collimated light; rather, FIG. 18 is provided only to elucidate optical properties of an example optical layer.

Figure 18:
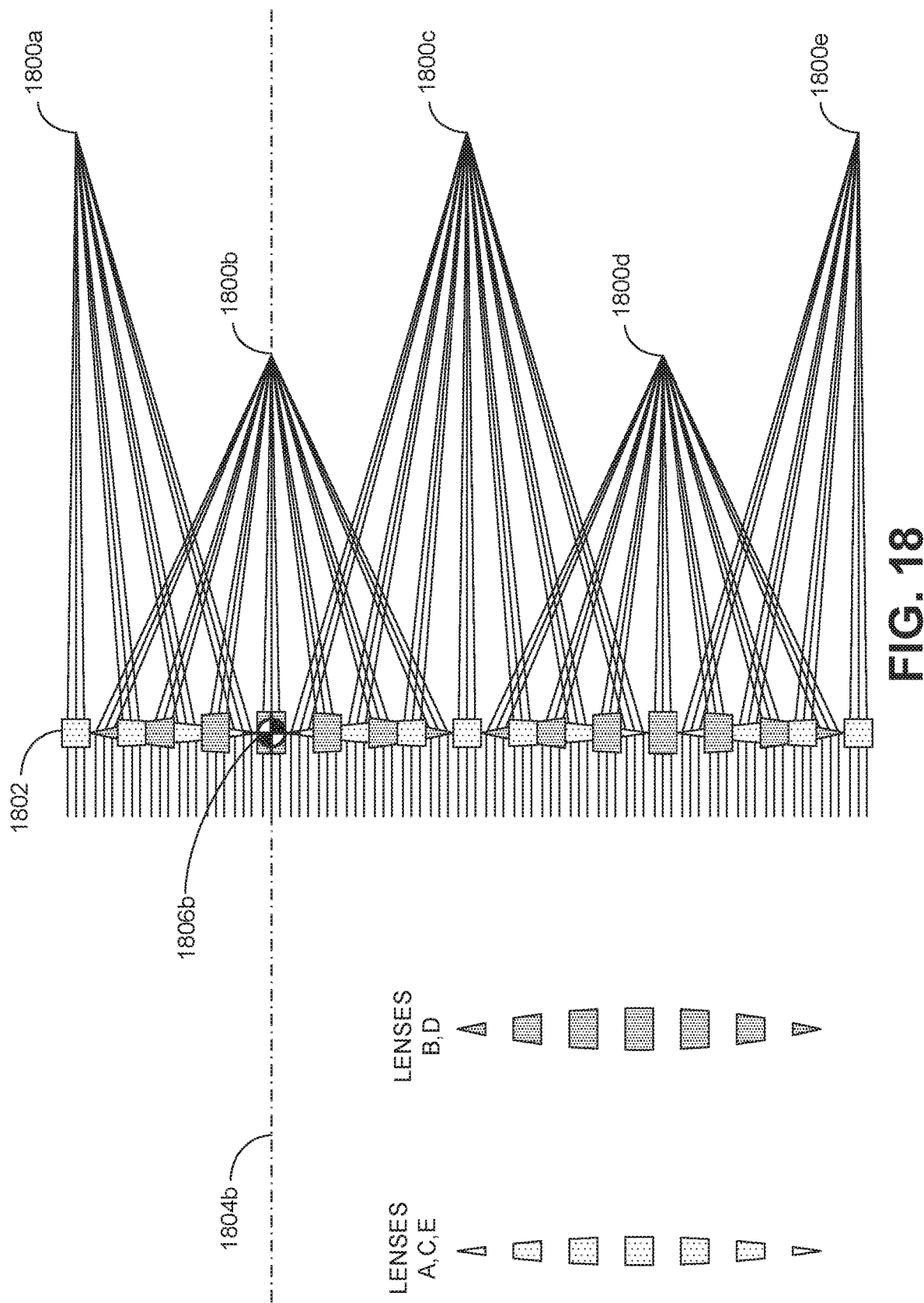
FIG. 18 illustrates optical properties of distributed lenses in an optical layer of a display device.

As seen in FIG. 18, although distributed lens A includes four non-contiguous lens regions, those regions all focus the incident light to a single principal focus point 1800*a*, and they can thus be considered part of a single distributed lens. Similarly, although distributed lens B includes seven non-contiguous lens regions, those regions all focus the incident light to a single principal focus point 1800*b*, and they can thus be considered part of a single distributed lens. It should also be noted that lenses with different principal focal points at different spatial locations may nevertheless have the same focal length. For example, distributed lenses B and D are illustrated as having the same focal length, but they have different principal focal points (1800*b* and 1800*d*, respectively) at different vertical locations. And distributed lenses A, C, and E are illustrated as having the same focal length, but they have different principal focal points (1800*a*, 1800*c*, and 1800*e*, respectively). In general, an optical layer may include, interlaced on the same surface, a first two-dimensional array of distributed lenses with a first focal length, a second two-dimensional array of distributed lenses with a second focal length, and so on.

In the case of a curved optical layer, there may be no single "perpendicular" direction. In this case, the principal focus point of a lens region may be considered to be a point at which incident light rays perpendicular to the optical layer in the vicinity of that lens region would be focused. Nevertheless, to the extent the goal is to determine whether two lens regions have the same principal focus point rather than to determine the exact location of the principal focus point, that goal is relatively insensitive to small changes in the choice of incident light direction.

Different lens regions may also be considered part of the same distributed lens if, for each of a plurality of light-emitting elements in the light-emitting layer, the different lens regions each generate a (real or virtual) image of the respective light-emitting element at substantially the same position in space. Note that the foregoing criteria for distributed lenses may be applied to diverging lenses as well as the converging lenses illustrated in FIG. 18, except that the principal focus point or image would be a virtual focus point or image.

Each distributed lens may further have an optical axis, where the optical axis of the distributed lens passes through the principal focus point of the distributed lens and is perpendicular to the optical layer. For example, the optical axis of distributed lens B is illustrated at 1804*b*. A point at which the optical axis of a distributed lens passes through the optical layer may be referred to as the optical center of the distributed lens. For example, the optical center of distributed lens B is illustrated at 1806*b*. The optical center of a distributed lens is not necessarily included within any lens region within that distributed lens. An optical center can be defined for each individual lens region within a distributed lens, with the lens regions within a distributed lens having substantially the same optical center.

In addition to the distributed lens forms illustrated in FIGS. 15A-15O, further examples of distributed lenses are provided in FIGS. 19-22. FIG. 19A illustrates a distributed lens form made up of nine 1×1 square lens regions (in arbitrary units). Each square lens region may (but does not necessarily) correspond to a single square pixel of spatial light modulator. Even though the lens form has a size of 5×5 at its greatest extent, distributed lenses having the same form can be tessellated at 3×3 intervals. An arrangement of nine such distributed lenses is illustrated in FIG. 19B. Lens regions illustrated with the same type of hatching are part of the same distributed lens. The optical center of each distributed lens is also illustrated using the conventional "center of gravity" symbol.

Figure 19B:
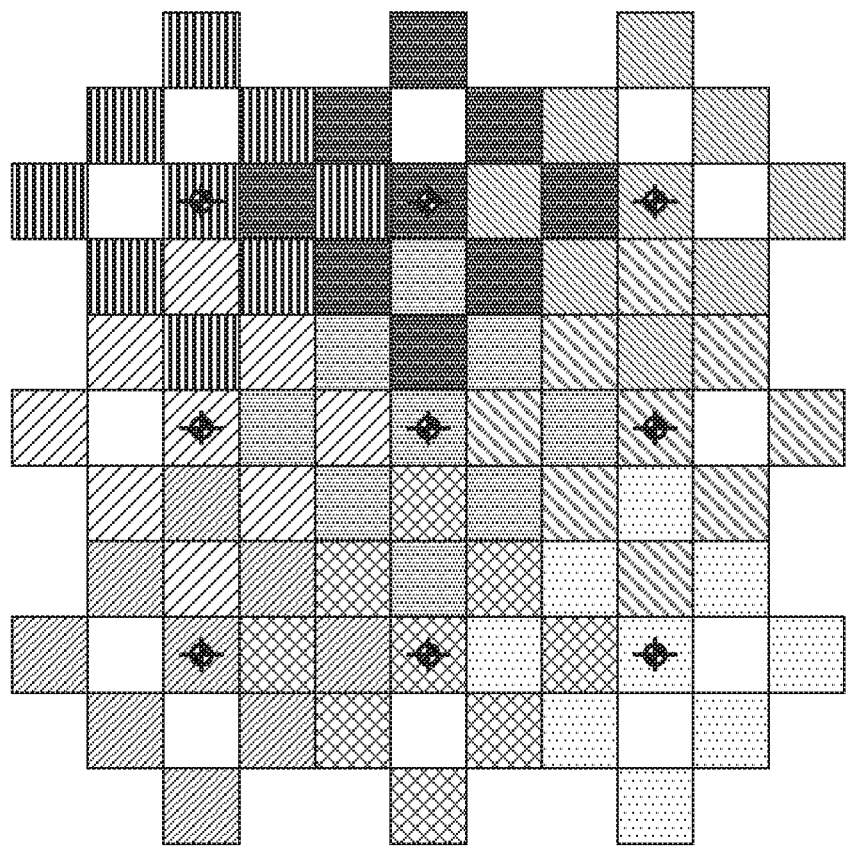
FIG. 19B illustrates a plurality of distributed lenses that have the form of FIG. 19A and that are interlaced in an optical layer.
Figure 19A:
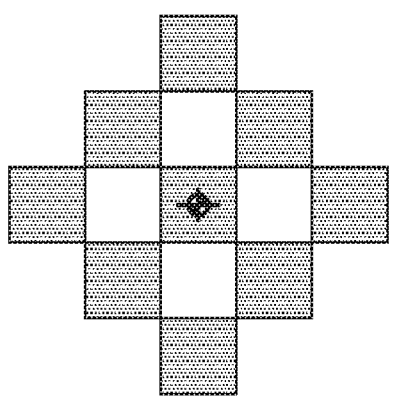
FIG. 19A illustrates an example form of a distributed lens that includes nine non-contiguous lens regions.

Note that, while the distributed lenses of FIGS. 19A-19B may be expected to exhibit, roughly, the diffraction performance of a 5×5 lens, those distributed lenses can be arranged at 3×3 intervals. In contrast, non-distributed 5×5 square lenses could only be arranged at 5×5 intervals. The use of distributed lenses can thus contribute to greater display resolution while reducing problems due to diffraction. It may also be noted that distributed lenses do not necessarily have the same vertical and horizontal dimensions, and the horizontal intervals and vertical intervals at which distributed lenses are arranged need not be the same.

Figure 21:
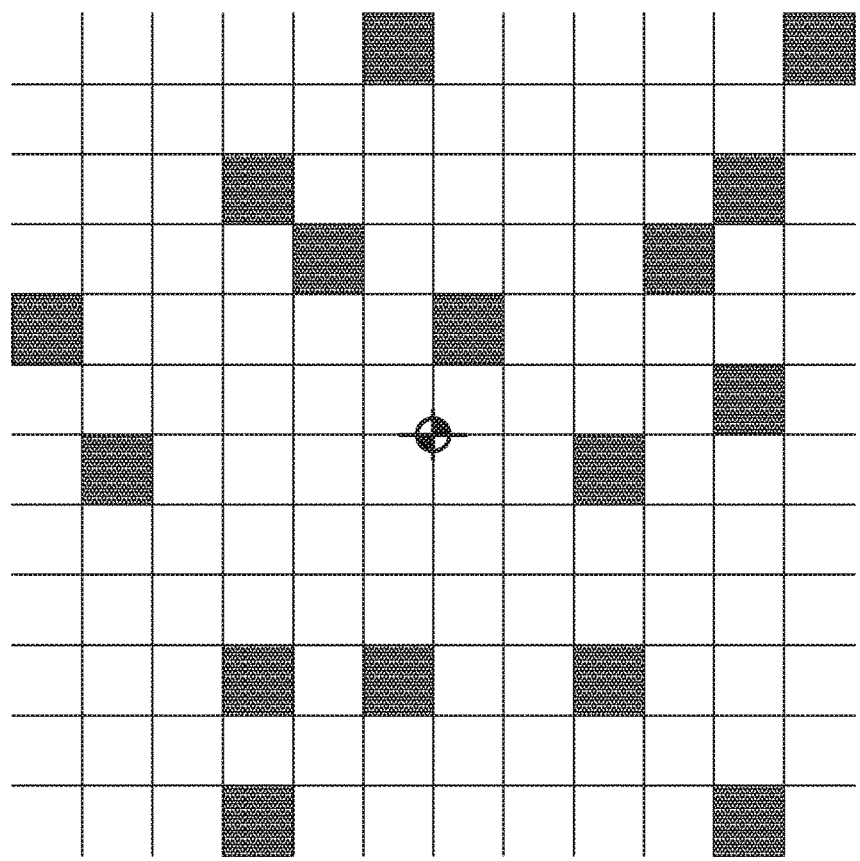
FIG. 21 illustrates another example form of a distributed lens that includes sixteen non-contiguous lens regions and that is capable of being interlaced at 4×4 intervals in an optical layer.
Figure 20:
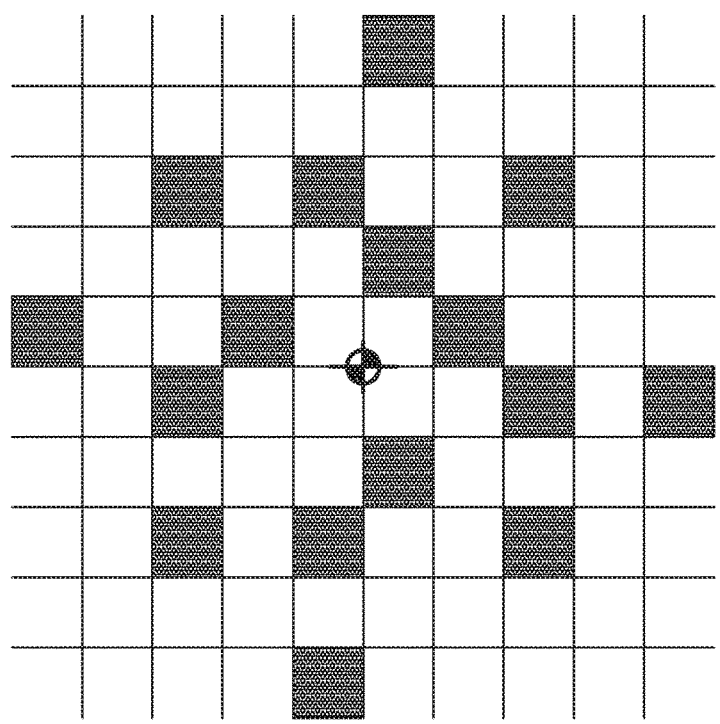
FIG. 20 illustrates an example form of a distributed lens that includes sixteen non-contiguous lens regions and that is capable of being interlaced at 4×4 intervals in an optical layer.

Various distributed lens forms may be employed as alternatives to those described above. For example, the distributed lens form of FIG. 20 has a size of 10×10 at its greatest extent but can be arranged at 4×4 square intervals. In some embodiments, the distributed lens form may be selected so as to have pseudorandom characteristics while still being capable of being interlaced with other distributed lenses. A lack of regular features in a distributed lens may diminish the likelihood of strong diffraction peaks off the desired central peak in a diffraction pattern. FIG. 21 illustrates an example 12×12 distributed lens form with no clear patterns or symmetries that is nevertheless capable of being interlaced in a square array at 4×4 intervals with other distributed lenses having the same form.

While example optical centers are illustrated for the respective distributed lens forms of FIGS. 19-22, it should be noted that the position of such optical centers is determined by the optical properties of the distributed lenses. The optical centers are not necessarily positioned at an axis of symmetry or geometric centroid of the distributed lenses.

One feature of some embodiments is that distributed lenses with different optical centers are interlaced with one another in the optical layer. Two distributed lenses may be considered to be interlaced when a lens region of one distributed lens with one optical center is located between two lens regions of a different distributed lens that has a different optical center.

Figure 22:
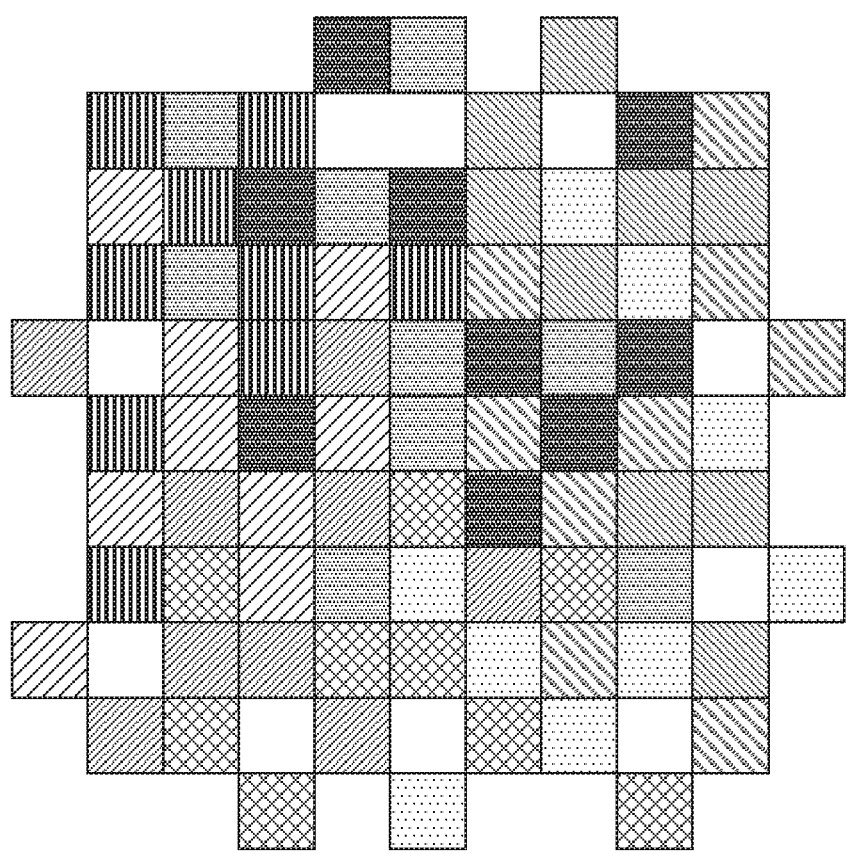
FIG. 22 illustrates a portion of an optical layer that includes non-periodic interlaced distributed lenses.

As illustrated in FIG. 22, distributed lenses in some embodiments are not necessarily periodic. FIG. 22 illustrates a portion of an optical layer that includes nine interlaced distributed lenses. Each distributed lens includes nine square lens regions, and the regions of a single distributed lens are illustrated with the same type of hatching. Regions with no hatching may be associated with distributed lenses other than the nine illustrated lenses. Each of the nine illustrated distributed lenses has a form different from that of the other distributed lenses in the optical layer. While the use of periodic features may in some cases simplify manufacturing of a display and/or calculations used in operating the display, the use of periodic features is not necessary for all embodiments, and non-periodic features may be used to reduce diffraction in some embodiments.

Example Display Method.

Display devices as described herein may be operated using a variety of techniques. One such technique is the following. To display a voxel at a particular voxel position, at least one light-emitting element and a corresponding distributed lens are selected such that the light-emitting element, the optical center of the distributed lens, and the voxel position are substantially colinear. The light-emitting element is activated, and the SLM is operated such that light from the light-emitting element passes through the corresponding distributed lens toward the voxel position (in the case of a voxel in front of the display) or directly away from the voxel position (in the case of a voxel behind the display). In some embodiments, a plurality of such pairs of light-emitting element and corresponding distributed lens are selected and are active either simultaneously or in a time-multiplexed manner to generate beams that cross (or virtually cross) at the voxel position.

In some embodiments, a further selection criterion is applied for the selection of pairs of light-emitting elements and corresponding distributed lenses. Such pairs may be selected such that the selected distributed lens used with a light-emitting element generates a real or virtual image of the light-emitting element at the voxel position. In other embodiments, e.g. where the distributed lenses are used to substantially collimate the light from the light-emitting elements, no such criterion may be applied.

To display multiple voxels, each voxel may be displayed using a method such as the methods described above. In some cases, beams for different voxels may be generated at different times (e.g. in a time-multiplexed manner). In other cases, e.g. where different light-emitting-element/distributed-lens pairs are sufficiently far apart on the display surface to avoid undesirable light leakage, beams different voxels may be displayed simultaneously.

Non-Mechanical Beam Adjusting Components in 3D Display Applications.

In some embodiments, electrowetting cells may be implemented for non-mechanical beam steering. Electrowetting cells may be configured to form tunable microprisms that can be used to provide continuous scanning of beams through a relative large angular range (e.g. ±7°) with high switching speeds (~ms), for example, by using the techniques discussed in Neil R. Smith, Don C. Abeysinghe, Joseph W. Haus, and Jason Heikenfeld, "Agile wide-angle beam steering with electrowetting microprisms," *Optics Express* Vol. 14, Issue 14, pp. 6557-6563, (2006). Polarization independence provided by the electrowetting cell approach may be helpful for achieving higher optical efficiencies for the components. Electrowetting cells may be implemented in some embodiments using techniques including, e.g., the techniques found in CA2905147 for switching between 2D and 3D display modes, and the techniques found in WO2008142156 for beam steering in a directional backlight system. In some embodiments, electrowetting may be implemented for forming lenticular structures of a multi-view display system, for example, by using the techniques described in J. Kim, D. Shin, J. Lee, G. Koo, C. Kim, J-H. Sim, G. Jung, Y-H. Won, "Electro-wetting lenticular lens with improved diopter for 2D and 3D conversion using lens-shaped ETPTA chamber," Opt. Express 26, No. 15, 19614-19626 (2018).

In some embodiments, components and systems based on utilization of liquid crystal (LC) materials are implemented for non-mechanical beam steering. As highly birefringent material, the LC layers have different refractive indices in two orthogonal directions. This property may be useful when implemented along with polymer microprisms, for example, by using the techniques as described in H. Wang, O. Yaroshchuk, X. Zhang, Z. Zhuang, P. Surman, X. Wei Sun, Y. Zheng, "Large-aperture transparent beam steering screen based on LCMPA," *Applied Optics* Vol. 55, Issue 28, (2016). As described in H. Wang, et all (2016), the polymer microprisms are used for switching between two beam steering states with a structure that contains two LC layers. The first, active LC layer, is sandwiched between e.g. two glass sheets containing electrodes. The second, passive layer, is formed between glass or polymer substrate and a polymer microprism sheet. Switching is initiated with the active LC layer that twists incident beam linear polarization by 90° in the perpendicular direction to light propagation when voltage is applied. This twisting selects which of the refractive indices of the birefringent passive LC layer is used in the second part of the system. In the first state of the steering system, refractive index difference between passive LC layer and microprism polymer material is so small that no light bending occurs, whereas in the second state the index difference causes light rays to bend to a predetermined angle at the interface. This angle is usually fairly small (~1°), but it can be increased, in some embodiments, by employing various techniques. For example, rays of light may be bent to larger angles by e.g. adding holographic gratings after the LC layers using the techniques described in P. McManamon, P. Bos, M. Escuti, J. Heikenfeld, S. Serati, H. Xie, E. Watson, "A Review of Phased Array Steering for Narrow-Band Electrooptical Systems," *Proceedings of the IEEE*, Vol 97, Issue 6, (2009). Another way the angle may be increased, in some embodiments, is by stacking several polarization-based beam steering components, making it possible to reach angles as large as e.g. ±15°, as described in WO2011014743.

One advantage of the LC-based beam steering methods is that the components can be produced fairly easily with currently available manufacturing technology and equipment, making it possible to reach low cost in large quantities. The fact that no mechanical movement is needed for initiating beam steering is also a factor in favor of using such technologies in 3D displays. One disadvantage of the technology is the use of linearly polarized light, which lowers optical efficiency of the system and increases power consumption. However, as current LCD displays are already polarization-dependent systems, the new steering components can be possibly integrated more easily without high cost in efficiency. In addition, some embodiments may make use of cholesteric LCs (instead of the more common nematic phase crystals), which can be used for beam steering without polarization dependence. The use of cholesteric LCs may be implemented, for example, by using techniques such as the techniques discussed in Shang X, Meeus L, Cuypers D, De Smet H, "Fast switching cholesteric liquid crystal optical beam deflector with polarization independence," *Scientific Reports*, July 26, 7(1):6492, (2017). Such embodiments may help increase the component transmittance for display panels based on e.g. OLEDs or μLEDs.

Liquid crystal components may be implemented in some embodiments as electrically switchable parallax barriers, for example, by using the techniques discussed in U.S. Pat. No. 9,664,914, wherein a black grating structure is implemented to block some display pixel view directions when the liquid crystal layer is activated. This configuration can produce different images that can be shown to the two eyes of the viewer. Without the activated grating, the display may function as a normal 2D display. The liquid crystal layer can also be used in forming a lenticular lens structure on top of a dense pixel matrix by reorienting some of the liquid crystal material molecules with electric current by using, for example, the techniques discussed in U.S. Pat. No. 9,709, 851. Such a configuration may call for special electrode designs, but it can also be used for switching between 2D and 3D modes because the liquid crystal lenses project the pixel images to different view directions. In the 3D mode, multiple views may be obtained with the cost of lower spatial resolution since only spatial multiplexing is used in creation of the multi-view image. Some embodiments may employ scanning the electrically formed lenticular liquid crystal lenses through the display surface, using techniques such as those discussed in Y-P. Huang, C-W. Chen, T-C. Shen, J-F. Huang, "Autostereoscopic 3D Display with Scanning Multi-Electrode Driven Liquid Crystal (MeD-LC) Lens," 3D Research, Vol. 1, Issue 1, pp 39-42, (2010). Such embodiments may assist in allowing for time multiplexing. For example, the pixels synchronized to the scanning action can be activated several times inside a single scan timeframe, creating several additional views. Some embodiments may employ hybrid systems, where beam steering liquid crystal element is used before or after a rigid polymer lenticular sheet structure. Examples of such hybrid systems include those discussed in WO2012025786 and Xiangyu Zhang, Hongjuan Wang, Phil Surman, Yuanjin Zheng, "A Novel Spatio-temporal Multiplexing Multi-view 3D Display," *IEEE Conference on Lasers and Electro-Optics Pacific Rim (CLEO-PR)*, (2017). Such hybrid systems may allow for the creation of additional angular view directions between the directions determined by pixel positions and lenticular optics. In some such embodiments, temporal multiplexing may be used along with spatial multiplexing in 3D multi-view displays. In some embodiments, liquid-crystal-based beam steering screen components can be used in a similar manner with multiple projectors, for example by using the techniques discussed in X. Xia, X. Zhang, L. Zhang, P. Surman, and Y. Zheng, "Time-multiplexed Multi-view Three-dimensional Display with Projector Array and Steering Screen," *Optics Express* Vol. 26, Issue 12, pp. 15528-15538, (2018).

In addition to beam angular steering, both the electrowetting cells and LC-based components with hybrid structures can be used for adjusting beam focus without mechanical movement. Examples of electrowetting cells that may be implemented in some embodiments include those discussed in U.S. Pat. No. 6,369,954 and in K. Mishra, H. van den Ende, F. Mugele, "Recent Developments in Optofluidic Lens Technology," *Micromachines* 7(6):102, (2016). Examples of hybrid structures that may be implemented in some embodiments include those discussed in U.S. Pat. Nos. 7,408,601, 9,709,829, and WO2016135434.

In some embodiments, electronic focus adjustment can be utilized in head mounted devices, e.g., wherein a stereoscopic 3D display virtual image can be moved to different focal distances from the eye, for example, by using the techniques discussed in G. Love, D. Hoffman, P. Hands, J. Gao, A. Kirby, and M. Banks, "High-speed switchable lens enables the development of a volumetric stereoscopic display," *Opt. Express,* 17(18): 15716-15725, (2009). In this manner, images may be made to look more natural. In some embodiments, beam focus adjustment may be utilized in goggle-less 3D displays, for example, by adjusting the position or shape of the projected image focal surface as described in N. Matsuda, A. Fix, D. Lanman, "Focal Surface Displays," *ACM Transactions on Graphics* 36(4):1-14, (2017). In embodiments described herein, focus adjustment may provide the ability to alter a whole projected image or to adjust the focus of multiple beams individually.

Figure 23:
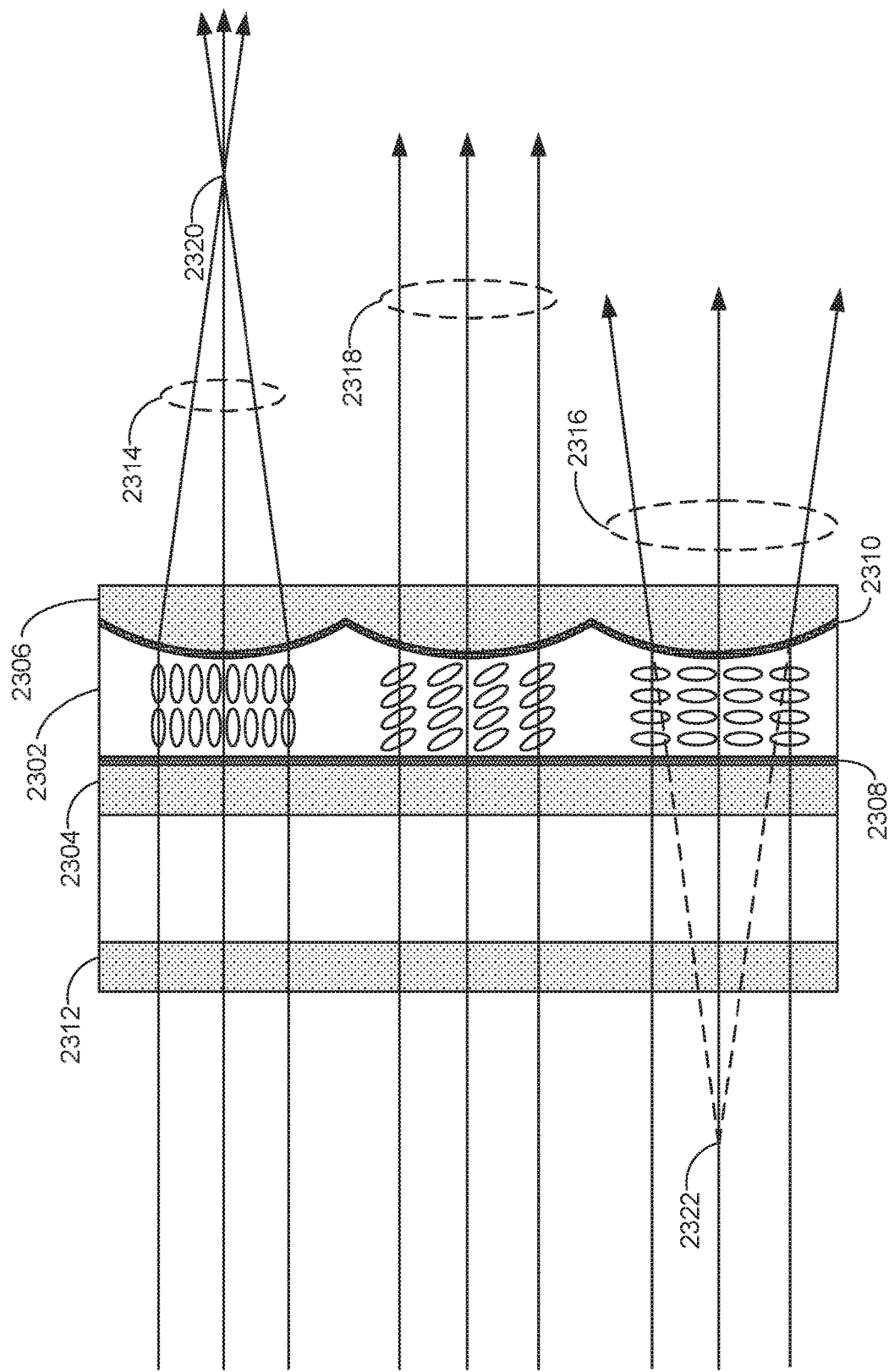
FIG. 23 depicts a variable focal length microlens array and its functionality.

Some embodiments implement an array of focus adjustable microlenses using, for example, techniques such as those described in L. G. Commander, S. E. Day, and D. R. Selviah, "Variable focal length microlenses," Optics Communications. 177(1-6), 157-170 (2000). FIG. 23 depicts a variable focal length microlens array and its functionality, in accordance with some embodiments. In the example, a liquid crystal (LC) layer 2302 is sandwiched between a glass substrate 2304 and a microlens array (MLA) 2306. In some embodiments, bounding material interfaces have transparent conductive ITO (indium tin oxide) patterns 2308, 2310, which can act as anode and cathode for active adjustment of the liquid crystal layer. For example, when voltage is applied, electric field turns liquid crystal molecules and material refractive index can be changed in one linear polarization direction. The amount of index change can be, e.g., in the order of ~0.2 with nematic liquid crystal materials using low voltages in the range of e.g. 0-12 V. In some embodiments, refractive index of the liquid crystal material (e.g., ~1.5) is configured to be close to the refractive index of the microlens array material. FIG. 23 shows three example beams of collimated light that first hit a polarizer component 2312, which transmits only linearly polarized light. By adjusting the LC layer refractive index with voltage, beams can be made to e.g. focus (beam 2314), diverge (beam 2316), or be left unchanged (beam 2318). For example, if the liquid crystal index is adjusted to match the microlens array index, the interface disappears, and beam collimation may be unaffected. If the index is adjusted to below or above the microlens array index value, the beam will refract, and a real focus (2320) or virtual focus (2322) can be created in front of or behind the structure.

Example Structure and Function Using Non-Mechanical Beam Adjustment.

Some embodiments provide an optical method and construction of an optical system that can be used for creating high-resolution 3D images with crossing beams. In some such embodiments, light is generated on a layer containing individually addressable pixels (e.g. a µLED matrix or an OLED display). A varifocal mosaic lens (VFML) may be used for collimating and splitting the emitted light into several beams and beam sections. In some embodiments, the VFML comprises a sandwich structure including e.g. a glass substrate, LC material, and polymer foil with UV-cured refractive or diffractive structures. The structures may be arranged into a mosaic pattern where each feature has specific curvature, tilt angle, and surface properties. Several individual features in the mosaic pattern may be configured to work together as a cluster. Individual beams and beam sections can be focused to different distances from the structure, for example, by applying drive voltage to the transparent anode and cathode patterned to both sides of the LC layer. A Spatial Light Modulator (SLM), (e.g. an LCD panel), may be positioned in front of the VFML in order to create mosaic aperture masks that selectively block stray light.

In some embodiments, the optical system may use crossing beams to form voxels. In some embodiments, voxels can be formed at different distances from the surface of the display. For example, voxels may be formed in front of, behind, and/or on the display surface. The created image zone can be made continuous by electronically adjusting the focus distance of the VFML with a drive voltage. Beam sections may be focused to different distances from the optical structure and image the sources to different sized spots depending on the distance. Because this configuration may be useful for selecting the effective focal length of each mosaic feature individually, the geometric magnification ratio can also be affected in order to achieve smaller source image spots and better resolution. The formation of a voxel image in the eye and the generation of the correct retinal focus cues may be achieved by splitting one beam originating from a single source into several sections. Multiple (e.g. two or more) beams crossing at the correct voxel distance can be used for creating a full voxel to the two eyes and for inducing the correct eye convergence angles. Retinal focus cues and convergence angles are created separately. This configuration may help overcome the vergence-accommodation conflict Varifocal Mosaic Lens (VFML).

Some embodiments implement a varifocal mosaic lens (VFML), as described below. The VFML may have a somewhat similar structure and functionality to the variable focus microlens array illustrated in FIG. 23. However, rather than having an ordered array of full optical surfaces as in FIG. 23, the VFML may have a mosaic pattern with varying optical features.

Figure 24:
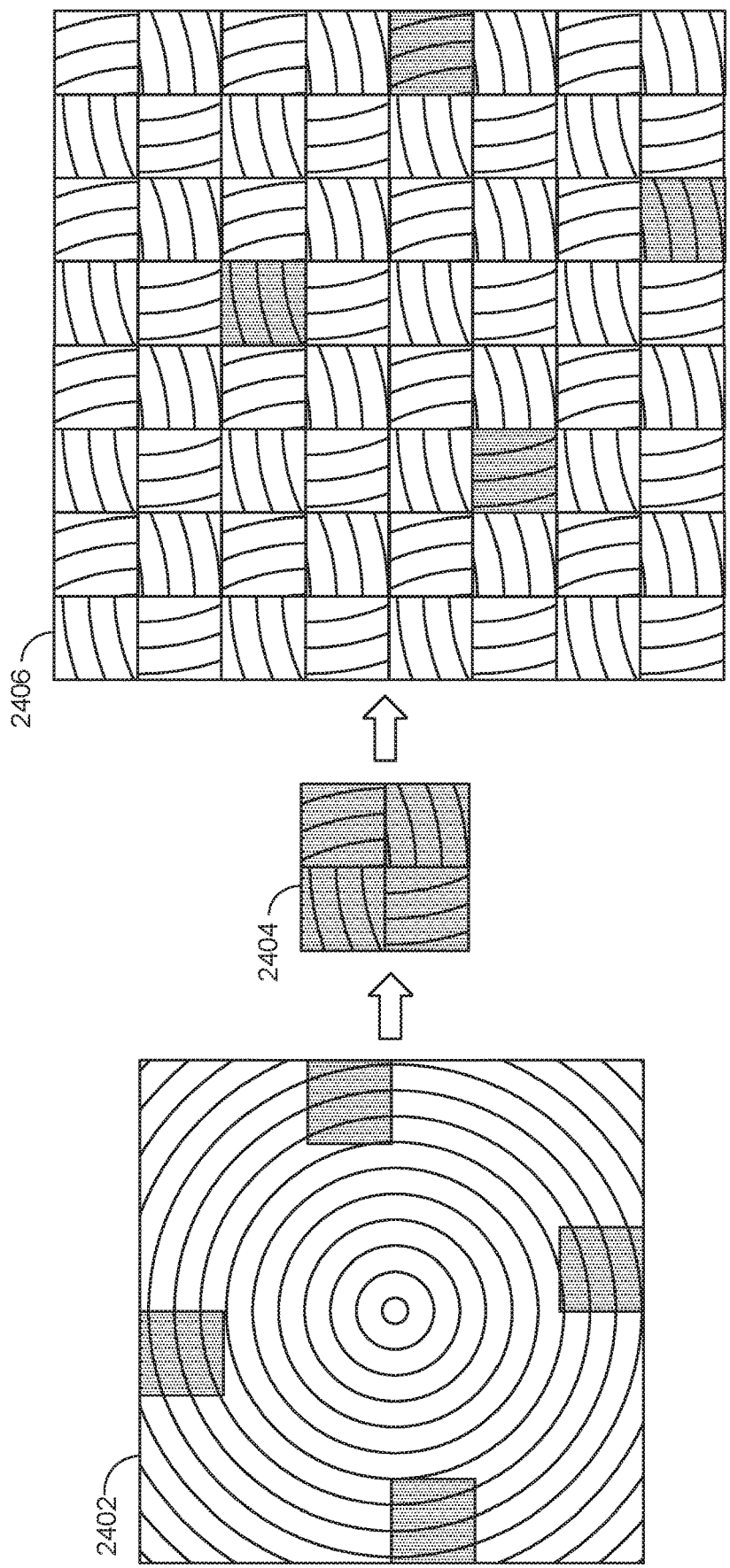
FIG. 24 depicts first example of a mosaic lens design, where the mosaic lens is formed from a continuous circularly symmetric lens, in accordance with some embodiments.

The optical power of the VFML comes from an optical layer. In some embodiments, the optical layer is a polymer foil with UV-cured refractive structures arranged into a mosaic pattern. Each of these features may be configured to have a specific curvature and tilt angle. FIG. 24 depicts a first example of a mosaic lens, where the lens may be conceptualized as having been formed from a continuous circularly symmetric lens 2402 with a rectangular aperture. In the example, four square sections from larger lens 2402 are combined into one mosaic tile 2404. In the example, the sections are selected from the edges of the full lens aperture in both vertical and horizontal directions. In this manner, the parameters (e.g. curvature and tilt angles) of the lens sections are selected in order to make a mosaic lens capable of imaging in both directions. The mosaic lens can be compiled from separate mosaic tiles. As depicted in the example of FIG. 24, the resulting mosaic lens structure 2406 can be configured so that lens sections are positioned in the same arrangement (e.g. same distances from each other) as in the original continuous lens 2402. In some embodiments, a mosaic tile may be compiled from more than four features. For instance, in the example depicted in FIG. 24, additional lens sections may be selected, e.g. from areas between the aperture locations depicted in FIG. 24. In such cases, more than four image beam sections can be created from one source. This configuration may be beneficial e.g. in a case where it is preferable to minimize small aperture diffraction effects. Moreover, any of the other distributed lens arrangements described herein may be employed as optical features in a varifocal mosaic lens arrangement.

In an example embodiment, a distributed lens arrangement as shown in FIG. 15A may be used in a varifocal mosaic lens system, where the mosaic lens is formed from two different lens shapes, and where the mosaic tiles are interlaced. In the example, two different lens shapes are used in forming a mosaic tile that is not a square in shape, but rather takes the form of a shape having a hollow plus-symbol outline. These tiles may be arranged in an interlaced mosaic lens pattern that combines the optical power of two different lens shapes. In some embodiments, the arrangement is also interlaced with two different distributed aperture patterns. This configuration may be useful, for example, in a display design case where different aperture patterns are used for displaying voxels at different depths, for example where the first lens shape is used for forming voxels behind the display and the second lens shape is used for forming voxels surface at the front of the display. Such embodiments may allow more depth range for the 3D image or alternatively the LC material refractive index tuning could be set to a lower dynamic range.

Figure 25:
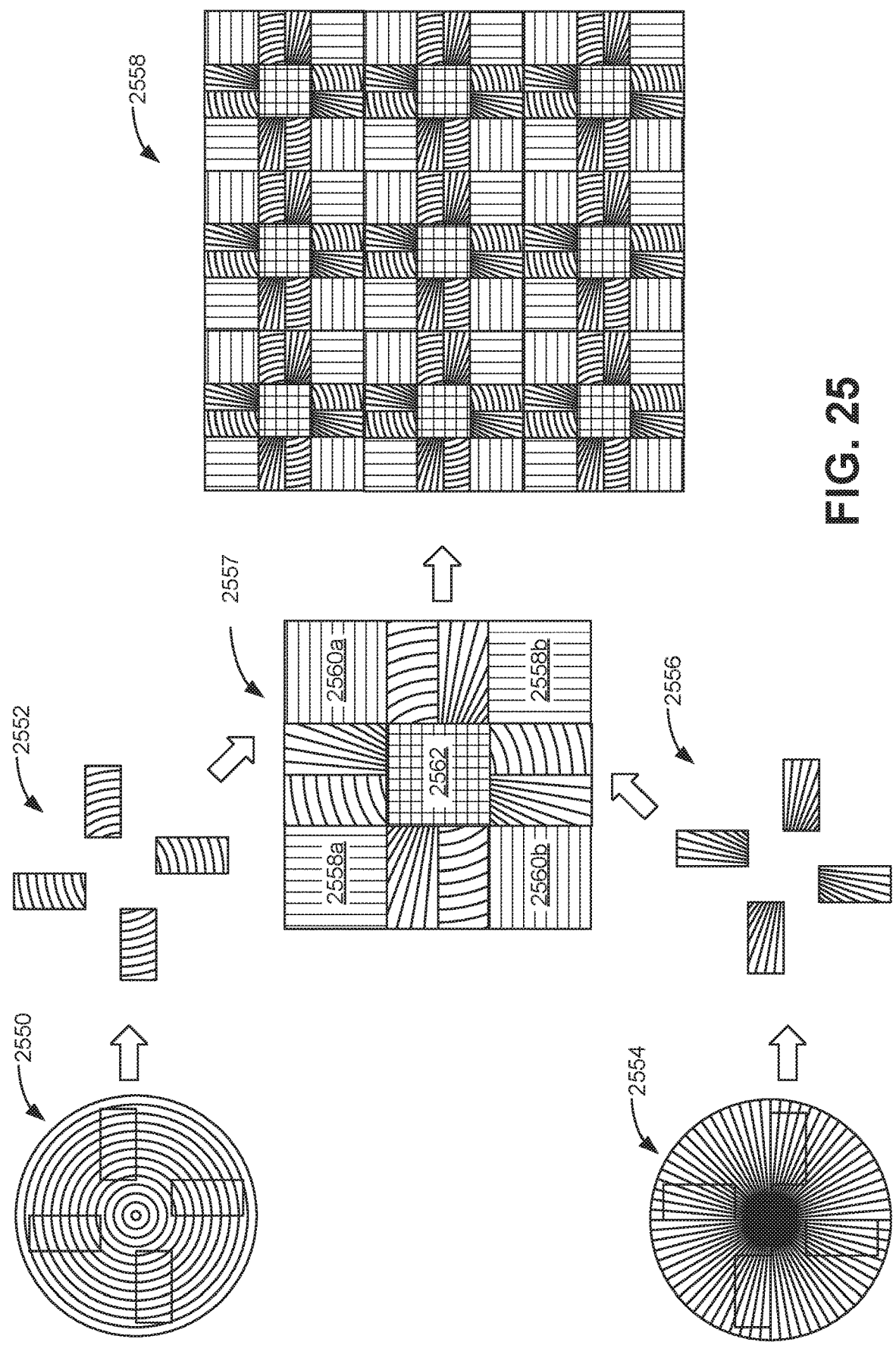
FIG. 25 depicts a mosaic lens design, where the mosaic lens is formed from two different lens shapes, and where the mosaic tiles include additional microlens surfaces, in accordance with some embodiments.

FIG. 25 depicts another example of a mosaic lens design, where the mosaic lens is formed from two different lens shapes, and where the mosaic tiles include additional microlens surfaces, in accordance with some embodiments. In the example of FIG. 25, mosaic tile 2557 includes distributed lens portions 2552 that may be conceptualized as samples from a contiguous lens 2550 and distributed lens portions 2556 that may be conceptualized as samples from a contiguous lens 2554.

In addition to the distributed lenses, mosaic tile 2557 includes regions 2558a,b that operate to diffuse light in the horizontal direction, for example using a vertical lenticular structure. Regions 2558a,b may be used for changing the angular resolution with a certain magnification factor for the horizontally projected images by e.g. increasing the FOV or altering the beam divergence. Mosaic tile 2557 also includes regions 2560a,b that operate to diffuse light in the vertical direction, for example using a horizontal lenticular structure. These diffusive regions may be implemented together for switching the display functionality. This may be especially useful, for example, in scenarios where a mobile display is rotated and the picture mode is changed between landscape and portrait mode. A region 2562 in mosaic tile 2557 may be operative to diffuse light in both the vertical and horizontal directions. Region 2562 may be e.g. a small curvature microlens array that effectively diffuses the light in both vertical and horizontal directions. Such a surface shape may be implemented for forming the voxels located on the display surface and may provide a large FOV to be visible to both eyes at the same time. Populating these features more densely in a mosaic lens design may help achieve higher image pixel resolution at the display surface, e.g. for displaying 2D images.

Mosaic tiles 2557 may be arranged in a periodic array, such as that shown at 2558.

Figure 26:
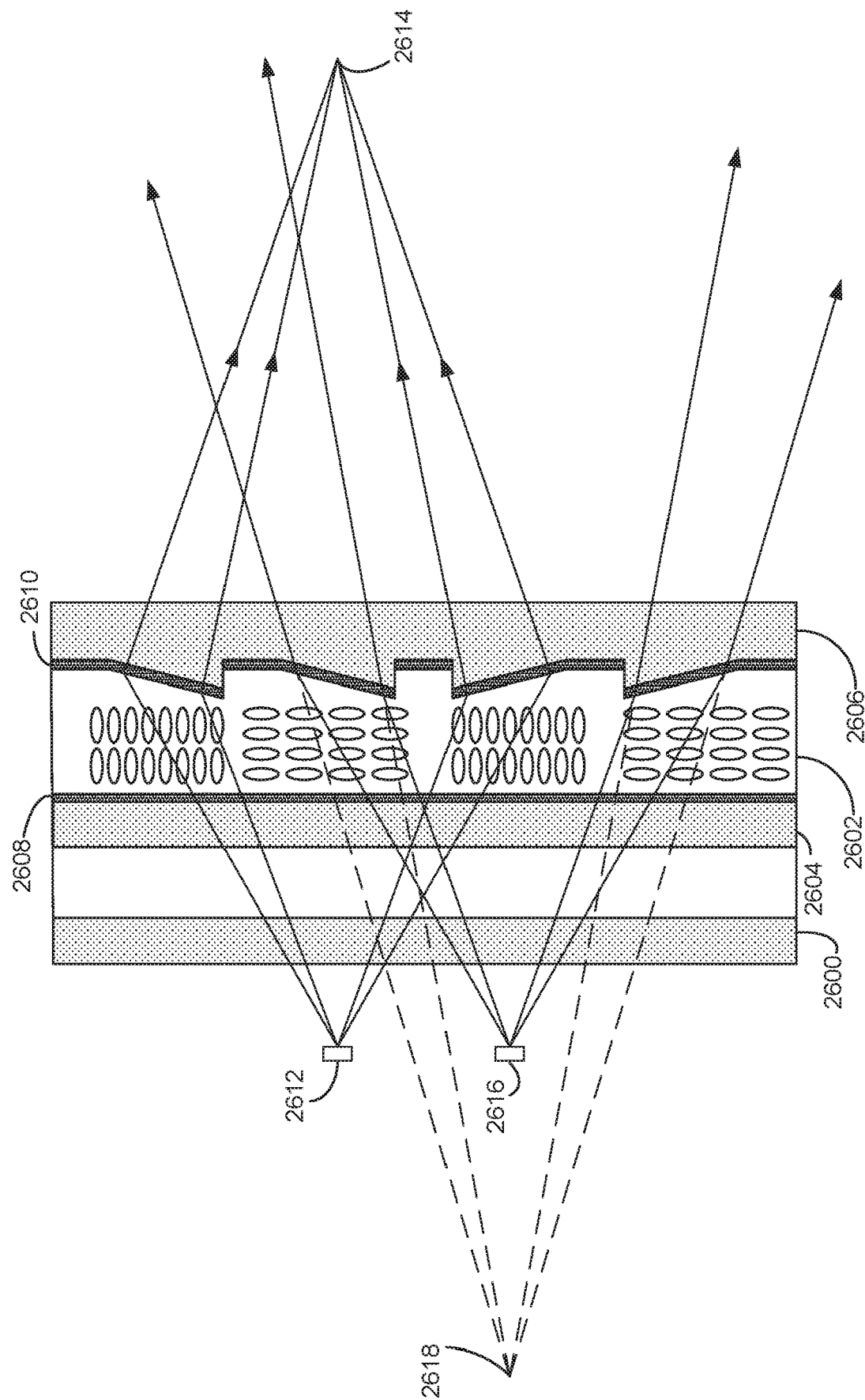
FIG. 26 depicts the optical structure and function of an example varifocal mosaic lens (VFML) in accordance with some embodiments.

FIG. 26 depicts the optical structure and function of an example Varifocal Mosaic Lens (VFML), in accordance with some embodiments. In the example, a polarizer 2600 is provided, and a layer of liquid crystal (LC) material 2602 is sandwiched between a thin glass substrate 2604 and a mosaic lens sheet 2606. The LC material's refractive index may be fitted to the index of the mosaic lens material. For example, in some embodiments, nematic liquid crystals having a refractive index of ~1.5 may be used, so as to be close to e.g. the refractive index of a polymethyl methacrylate (PMMA) optical polymer material (1.49). In some embodiments, the refractive index can be locally modulated. For example, some embodiments implement transparent ITO electrodes 2608, 2610 coated on the layers on both sides of the LC material in a fine pattern in order to support local modulation of the material refractive index over individual optical mosaic features. These patterns may be e.g. asymmetric hole-patterned electrodes that create non-uniform electric fields that modify the material refractive index in a suitable manner over the non-uniform LC material thickness. Electrodes may be patterned, for example, on top of the optical shapes or applied separately on the flat side of the thin substrate layer (e.g. polymer foil) used in optical shape manufacturing. The electrodes and optical shapes may be manufactured, for example, using roll-to-roll processing, which may be helpful for reaching large surface areas and low cost in high volumes.

In some embodiments, a VFML component and a polarizer are used together for imaging sources to variable focal distances. In the example shown in FIG. 26, a light source 2612 is imaged into a focus point 2614 positioned in front of the lens structure, whereas light source 2616 has a virtual image 2618 behind the VFML. This can be performed, for example, by applying different drive voltages to the electrodes on top of the mosaic feature pairs responsible for imaging those specific points. If the LC refractive index is tuned to be lower than index of the mosaic lens, the feature refracts beam sections to a focusing beam. On the other hand, if the LC refractive index is tuned to be higher than the index of lens material, the beam sections start to diverge, and their virtual extensions form a virtual focal point behind the VFML. The example presented in FIG. 26 also shows that the two apertures used in imaging can be configured to overlap in some embodiments. This configuration may be especially useful for providing smaller focal point sizes without using large aperture lens components by mitigating diffraction effects.

In some embodiments, the optical mosaic features may be manufactured e.g. as a polycarbonate sheet with optical shapes made from UV-curable material in a roll-to-roll process or as a foil with embossed diffractive structures. Because the varifocal property of the VFML may involve the implementation of an adjustable refractive index difference between the LC layer and mosaic lens, it may be useful for the optical features to have geometric shapes. Individual sub-feature sizes and pattern fill-factors may affect the achievable resolution and e.g. the amount of image contrast by reducing stray light introduced to the system.

Each VFML mosaic lens feature may have different optical properties depending on parameters such as its refractive index, surface shape, and/or surface property. The mosaic tiles may be configured to populate different surface areas with different patterns on the repeating feature. Example surface shapes implemented in some embodiments include simple flat tilted facets (prisms), continuous curved surfaces with different curvatures along different axes, and/or diffusing rectangles with optically rough surfaces. In the case of diffusing surfaces, the diffuse surface may be configured to disappear optically by tuning the refractive index of the LC layer to the same value as the index of the mosaic lens material. Such a feature may be used e.g. for switching on and off pixels or voxels located on a 3D display surface. Furthermore, as the LC material may be highly birefringent, it can be used for adjusting the diffusing properties of the layer in two orthogonal directions. This may be a useful feature for example in scenarios where a 3D display is rotated and there is a desire to diffuse a projected light field in one direction that can be tuned. Source images further away from the display may be bigger than source images at shorter distances, as discussed previously. However, because the effective focal length for each mosaic feature can be selected individually, the geometric magnification ratio may also be affected in order to achieve smaller source image spots and improve the resolution.

Mosaic lens features may be arranged according to a variety of array patterns. For example, in some embodiments, the features form a simple rectangular matrix where rows and columns are in straight horizontal and vertical lines (e.g. as presented in FIG. 24). This matrix pattern, for example, may allow for easier rendering calculations with a 3D display since the generated source images may also be arranged into a rectangular matrix. Another example array pattern implemented in some embodiments includes an arrangement where there is a vertical offset between neighboring columns. This pattern may be useful for increasing the effective resolution e.g. in a scenario where only horizontal crossing beams are generated. In such cases, the repeating mosaic tile may be constructed in a manner to account for the offset.

In some embodiments, a VFML may employ a number of different features. However, it may be helpful to consider that the number of features used to create a single source image may affect image brightness since the optical power emitted from the source is spread over the multiple features. For example, a greater number of unique features may result in less room for features that work together as an imaging cluster. In such scenarios, a greater proportion of source light may be wasted to stray light. Thus, it may be desirable to limit the number of unique features used in a VFML. A smaller number of unique features may also be desirable for reducing complexity of the manufacturing process of the mosaic lens sheet and potentially lowering cost.

3D Display Optical Structure and Functioning.

Figure 27:
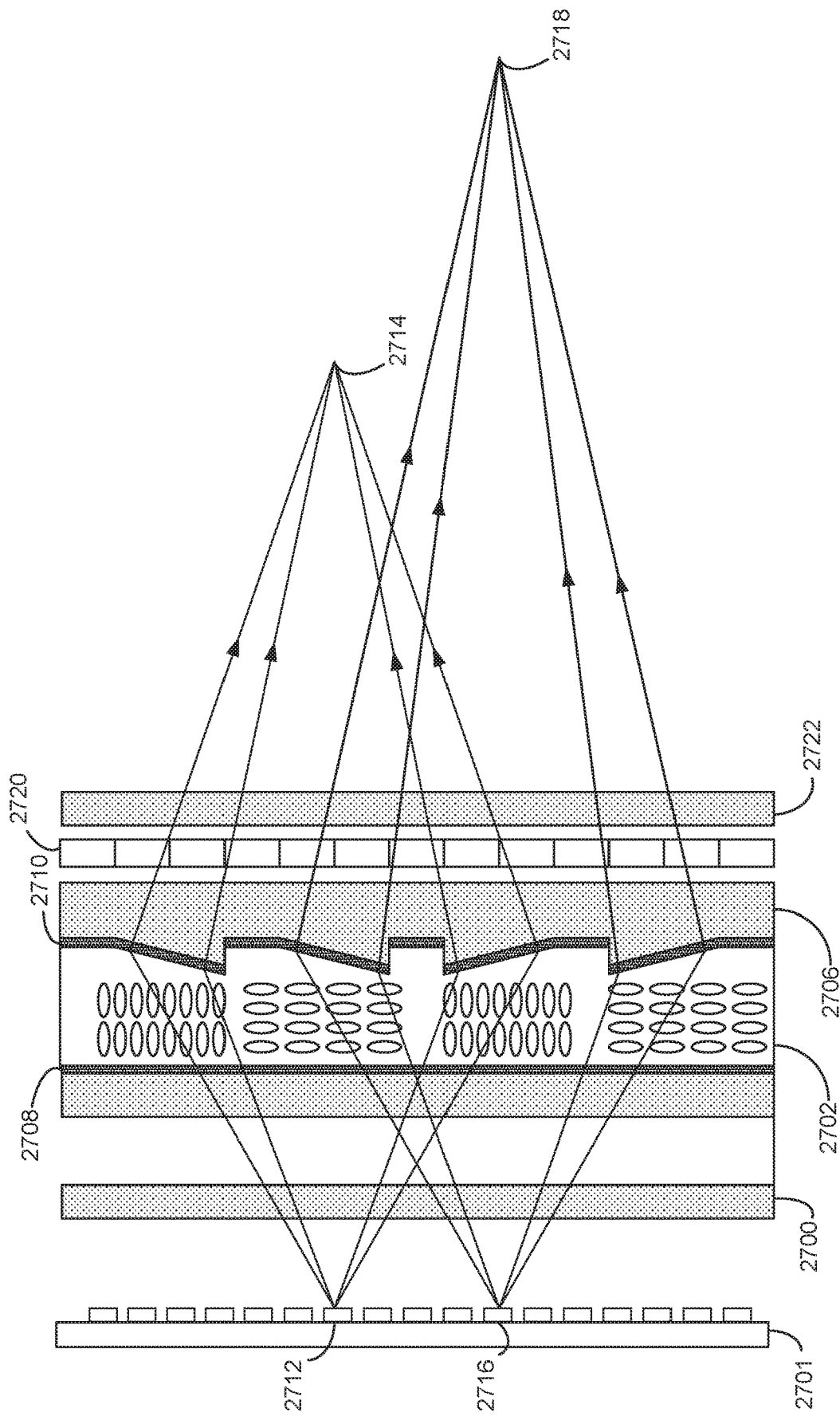
FIG. 27 depicts the optical structure and functionality of a 3D display in accordance with some embodiments.

In some embodiments, a high-resolution 3D display based on crossing beams is created by covering the display area with VFML structures. FIG. 27 depicts the optical structure and functionality of a 3D display in accordance with some embodiments. In the example, light is generated on a layer 2701 containing individually addressable pixels, such as pixels 2712 and 2716. A polarizing component 2700 makes the light linearly polarized. A varifocal mosaic lens 2706 collimates and splits the emitted light into beam sections that focus to positions (e.g. 2714, 2718) at different distances from the display depending on voltage applied to a liquid crystal layer 2702 using electrode layers 2710, 2708. A plurality of individual features in the mosaic layer work together as a cluster. A Spatial Light Modulator (SLM) 2720 and a second polarizer sheet 2722 may be positioned in front of the mosaic layer and used for selectively blocking or passing corresponding beam sections used for 3D image formation.

Some embodiments include a light emitting layer (LEL). Examples of light emitting layers implemented in some embodiments include μLED matrices, OLED displays, and backlit LCD displays. A polarizer sheet may be placed in front of the emitters to make the light linearly polarized. In some embodiments, the polarizer is laminated as a foil to the glass substrate of the VFML e.g. to make the structure more compact and/or robust. Because most sources (e.g. μLEDs) emit light into fairly large numerical apertures (NA), several individual optical features in the mosaic lens may be configured to work together as a cluster that collimates and focuses the light from a single emitter into several beam sections that form light source images. The number of features to be utilized in the formation of a single light source image may be selected based at least in part on parameters such as the source NA, the distance between the LEL and the VFML, and/or the mosaic feature design. Some embodiments implement one-dimensional optical structures such as cylindrical refractive features tilted to one direction. One-dimensional optical structures may be preferable, for example, if only horizontal views are needed. In some embodiments, two-dimensional optical structures such as biconic microlenses are implemented. Two-dimensional optical structures may be preferable, for example, if it is desired to produce views in two (e.g. horizontal and vertical) directions.

As shown in the example of FIG. 27, the VFML images single sources to a particular distance from the display. This distance can be adjusted e.g. by using the drive voltage of the variable focus lens. In the example, source 2712 is imaged to position 2714, which is closer to the display than position 2718 that has the image of source 2716. Because the apertures overlap, the pitch between the voxel forming images can be smaller than the imaging aperture size. The design of the mosaic lens features may affect the general image zone position where the voxels can be created. Image zones can be in front of, behind, or on both sides of the display device. The tuning range of the LC material refractive index may affect how much focus range and image zone depth can be achieved with the structure. The image zone itself can be made continuous as the beam focal distances can be adjusted freely inside the focus range.

Figure 28:
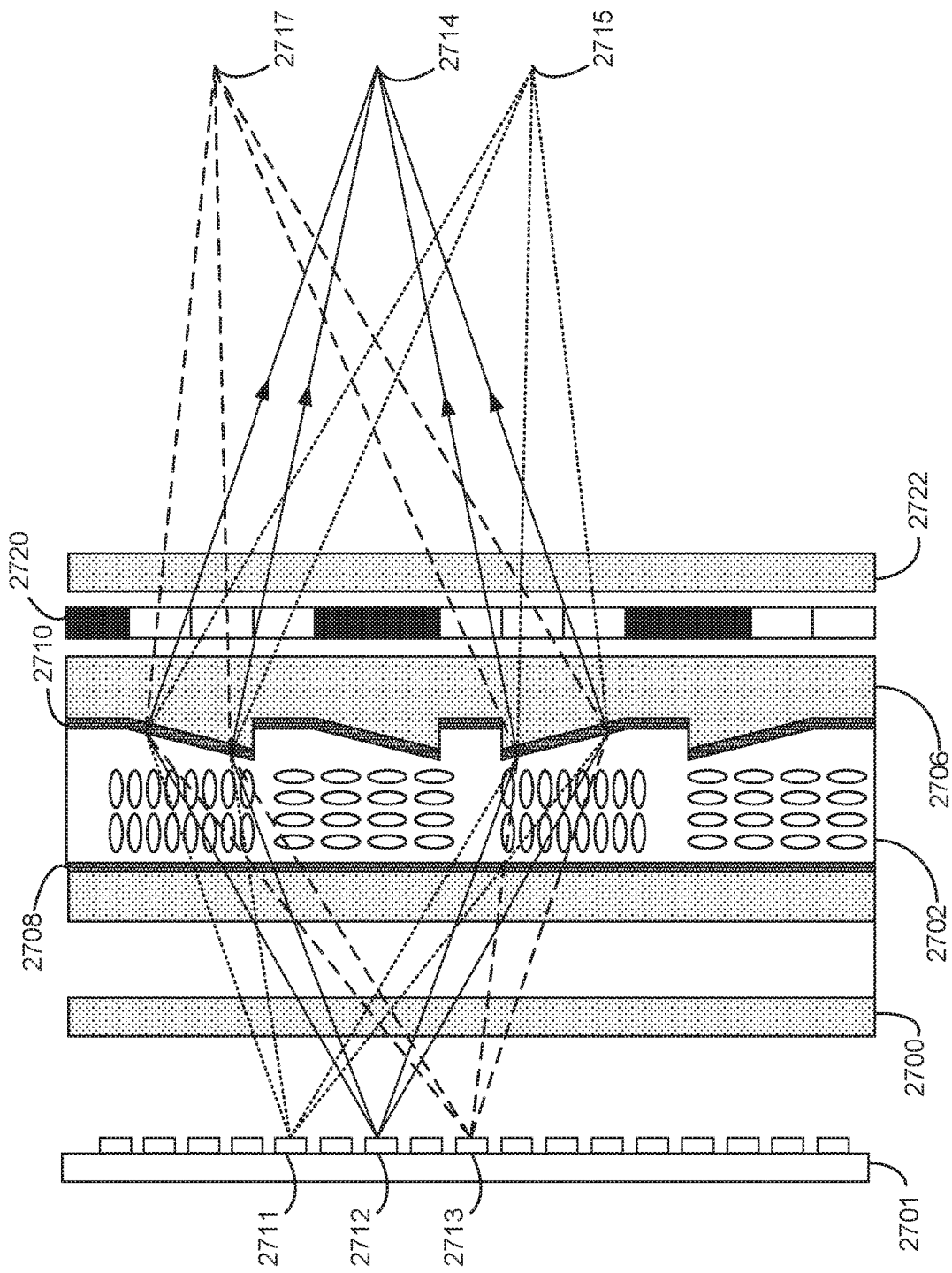
FIG. 28 illustrates the use of a common mosaic feature cluster for imaging three sources to the same distance from a display device, in accordance with some embodiments.

When more than one light emitting element is used simultaneously with a cluster of mosaic features, the source images are projected to different directions from display normal. The further away the source is from common optical axis of a feature cluster, the larger is the angle of the beam. FIG. 28 illustrates the use of a common mosaic feature cluster for imaging three sources to the same distance from a display device, in accordance with some embodiments. The display illustrated in FIG. 28 is the same as the display of FIG. 27. The example of FIG. 28 illustrates how light sources 2711, 2712, 2713 are imaged to the same distance from the display when the beam sections incident on same specific mosaic features are allowed to pass through the SLM and second polarizer combination. Portions of the SLM 2720 have been rendered opaque (shown in solid black) to prevent the transmission of stray light. (Stray light has not been illustrated to avoid unduly complicating the figure.)

Source 2712, located on the common optical axis of the imaging feature cluster, creates two beam sections that form the source image 2714 in the optical axis direction. Source 2711 and Source 2713 are located at the same distance but on opposite sides of the central source. The beam sections of Sources 2711 and 2713 project images to both sides of the optical axis. Source 2711 is imaged at 2715 and source 2713 is imaged at 2717. If these two sources are positioned at the limit allowed for the optical system, then they define the field of view (FOV) of the display. Because the light emitting layer can be made continuous and because the imaging feature apertures can be configured to overlap on the display surface, the FOV of the system can be very large. A large FOV may be preferable, e.g. for multiuser designs and/or for large tolerances to accommodate viewer movement.

In some embodiments, an optical system is used for forming voxels with crossing beams. The voxels can be located at different distances both in front of and behind the display as well as on the display surface. FIG. 9B depicts the formation of a voxel, in accordance with some embodiments. In the example, a voxel is created in front of the display at a specific focal distance. The voxel is created from two beams originating from sources 960 and 961 inside the 3D display. Each beam consists of two beam sections that also cross at the voxel position. The two beam sections are used for creating a single beam focus for the correct eye retinal focus cues, whereas the two combined beams are used for covering the larger FOV of the viewer eye pair. In this manner the visual system may be provided with the correct eye convergence for creating the stereoscopic effect. With regard to the optical structure, the generation of the smaller light emission angles that provide the single-eye retinal focus cues is controlled separately from the generation of the larger emission angles that provide the proper eye convergence Two beam sections per source image may be used in order to provide the correct focus cues for a single eye. The number of beam sections may be larger, e.g. for creating beam sections in both vertical and horizontal directions. The mosaic lens pattern presented in FIG. 24 is one example of a structure that can be used for splitting the beam into four sections that form two beam section pairs: one for the vertical direction and one for the horizontal direction. Because the single beam sections start from multiple positions on the display surface, it is possible to make a focal point that is smaller than the mosaic lens aperture size, even if geometric magnification makes the source image larger. As a result, when a single eye focuses to the display, it sees a wider spot than when it focuses on the focal point where the beam sections cross. Accordingly, if the corresponding retinal focus cue is coherent with the eye convergence angle created with two separate source beams, the voxel is perceived without VAC.

Some embodiments include a spatial light modulator (SLM). The spatial light modulator may be placed in front of the mosaic lens and may be configured to selectively block or pass parts of the projected beams. In some embodiments, an LCD panel is used as an SLM. An SLM may operate to block the unwanted stray light from entering viewer eye pupils. Stray light may be generated, for example, at the VFML mosaic features that have wrong orientation and/or optical power. These features can be effectively masked with e.g. a combination of an LCD panel and a polarizer that absorbs the unwanted light. In some embodiments where an LCD and polarizer are used as the SLM, it may be helpful to synchronize the pixels to the VFML drive controls. For example, the linearly polarized light may be twisted by each component, but it may be desirable for the polarized light to achieve a particular orientation for proper absorption in the second polarizer. In some embodiments, this synchronization is achieved by using a look-up table that lists the drive parameter values for both components for each unique voxel xyz-location relative to a repeating display structure. The location of the second polarizer is also beneficial for suppressing the other stray light propagation paths originating e.g. from mosaic lens apertures. These stray reflections and refractions tend to be randomly polarized and because the second polarizer is designed to transmit light with specific polarization state, stray light can be attenuated while the beams for the image pass though.

It may be preferable for the SLM pixel size to be in the same size range or smaller than the mosaic feature size. If the pixels are much smaller than the features, there may be less need for an accurate alignment of the mosaic layer to the SLM. However, if the pixels are the same size, accurate alignment may be desirable. Pixels may be arranged, for example, in a regular rectangular pattern or in a pattern that is custom to fit the mosaic layers optical features. The pixels may also contain color filters for color generation if the light emitted from the LEL is white as in the case of e.g. a phosphor overcoated blue PLED matrix. If the LEL contains colored pixels (e.g. separate red, green and blue µLEDs), then the SLM may be used for intensity adjustment of the beams. FIGS. 29A and 29B depict two example color filter arrangements of a spatial light modulator (SLM), in accordance with some embodiments. FIG. 29A depicts a first example of a color filter arrangement on an SLM, where the pixel matrix contains color filters for red, green and blue arranged into a rectangular interlaced pattern. The array also has a white pixel that can be used for e.g. high dynamic range (HDR) images where the white pixels can highlight some image areas with higher luminance. FIG. 29B depicts a second example color filter arrangement, where the array has three color filters arranged into band structures.

Figure 30:
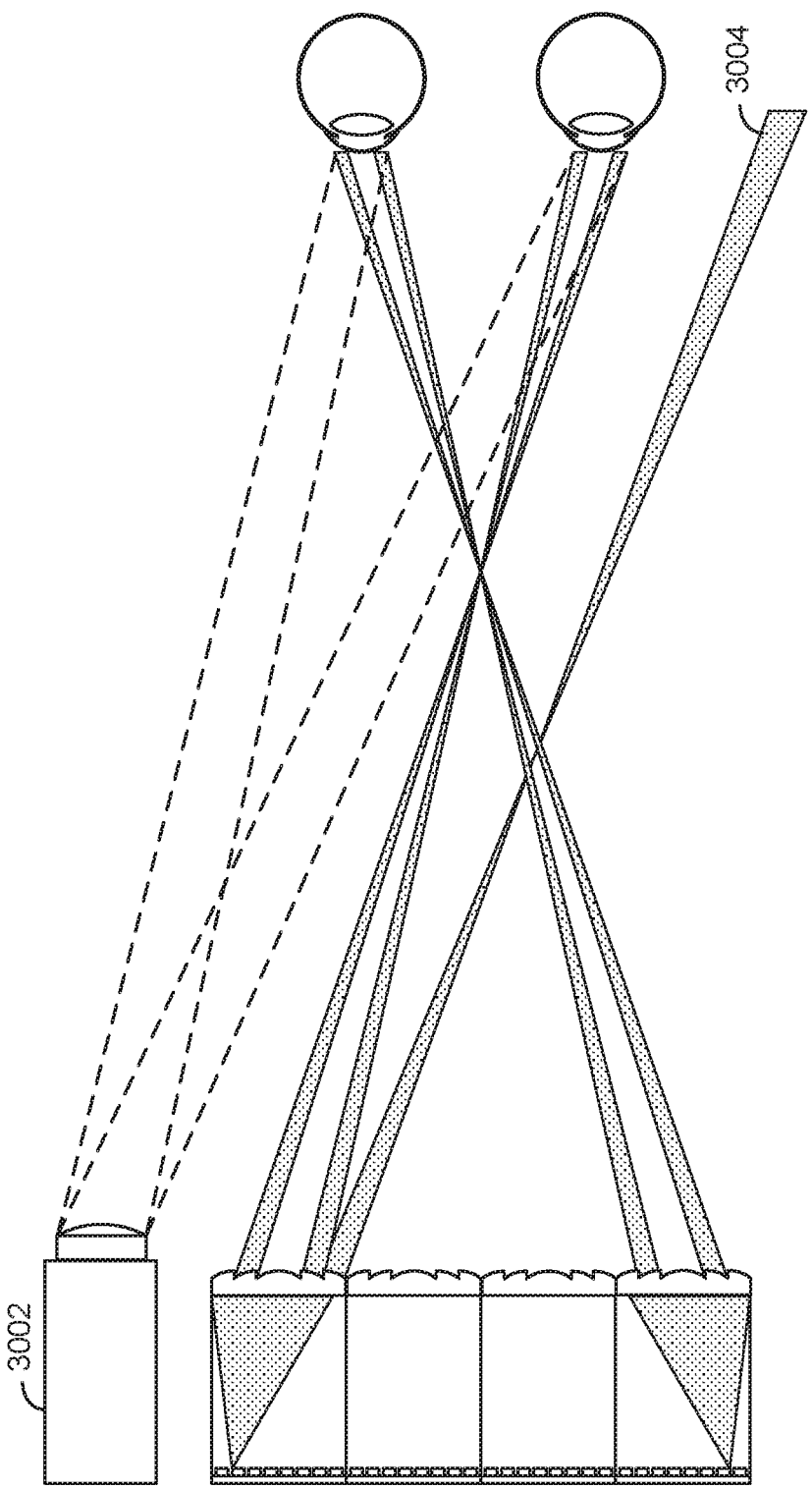
FIG. 30 depicts a 3D display with an eye tracking module, in accordance with some embodiments.

Some embodiments implement an eye tracking module to provide a 3D field display without the use of a spatial light modulator in front of the VFML. FIG. 30 depicts a 3D display with an eye tracking module 3002, in accordance with some embodiments. The eye tracking module may operate to locate eye boxes around the viewer's eye pupils. By synchronizing the light emitting components and the VFML control signals, the intended beams can be directed to these eye boxes. A clear image for one user can be created by rendering (at one point in time) only those rays that form the image voxel and hit eye pupils. Stray light that would not reach the users pupils, such as stray light 3004, can be disregarded in the rendering of a 3D image and need not be blocked by an SLM. Stray rays emitted from the sources can be directed away from the pupils by using the VFML not only to focus beams, but also to tilt the direction of off-axis beams via refractive index tuning. This configuration may call for rendering algorithms to take care of forbidden ray direction zones in addition to the voxel forming beams, but it may be configured to operate without an SLM. By leaving the SLM out, the system may no longer call for the synchronization and drive electronics associated with the SLM. Benefits of this configuration may include a thinner display, lower cost, and brighter images due to the lack of a second polarizer layer. In this case the LEL may call for having colored emitters if a color image is required.

Mobile phones are one application example where the display structure variation without a SLM could be used.

Current phones already have front facing cameras that may perform eye tracking, their computational power is adequate for the rendering task, and they are most often used by a single person. Mobile phones typically call for thin display structures with high spatial resolution, which is a good fit to this particular display structure variation. Because stray light may be visible outside the eye boxes, the image is visible only to the viewer's pupils, in some embodiments, the optical structure can be used as an effective privacy filter.

3D Display Properties.

In some embodiments, a 3D display system uses a combination of spatial and temporal multiplexing. In such embodiments, it is desirable for the VFML and SLM to have adequate refresh rates for a flicker-free image. The SLM, VFML and light emitting layer may be synchronized to work in unison when the image is rendered. In some embodiments, the SLM can be used as an adaptive stray light mask that has an aperture pattern that is e.g. swept across the display surface when a single source or a group of sources are activated. Several of these patterns may be used simultaneously masking source clusters at the same time at different parts of the LEL. The refresh frequency of the VFML may be configured to have the same refresh frequency as the SLM. Alternatively, in some embodiments, the VFML is configured to switch focal distances faster than the refresh rate of the SLM in order to provide several focal depth voxels during a single SLM mask configuration. The typically faster refresh rates of light emitting components (e.g. µLEDs) may be used advantageously so that light sources can be activated several times within the refresh period of the SLM (e.g. an SLM having a 60 Hz refresh rate). In embodiments utilizing eye tracking, lower update speeds may be more feasible, since the images can be rendered to some specified eyebox regions instead of the whole display FOV.

Both the VFML and SLM may be driven by a table of component control values. In such embodiments, whenever one set of distributed VFML mosaic features is used for voxel forming, the associated apertures are open in the SLM layer. It is also possible to use the same VFML features and SLM apertures during a temporal sweep of focal distances by altering the VFML drive voltage while keeping the SLM controls constant. A single look-up table of drive signal values can also be extended to the light emitting layer controls since the source selection can be used for creating the correct beam directions, in which case a pre-determined set of discreet voxel locations may be determined for controlling all of the active layers simultaneously. This approach may help speed up the rendering processes. Overall, the use of three active layers makes the whole display system hardware very flexible for many different rendering approaches.

Because the whole continuous optical structure can be used for the creation of the multiple beam sections, in some embodiments, display pixel structures may not be clearly defined. On the optical mosaic layer, the same pattern may be repeated over the whole display surface. This results in less of a need to accurately align the light emitting layer with the mosaic layer in the horizontal or vertical directions. The depth direction may be more important for alignment because it affects the location of focal surfaces outside the display surface. However, because the voxel focal positions can be adjusted with the VFML, the depth tolerance may still be relaxed considerably. Benefits of this configuration may include cost savings in the manufacturing process and robustness against environmental factors such as temperature changes by e.g. calibrating the VFML with different drive parameters for different temperatures. This latter feature may be especially useful for mobile devices that are used in varying environments.

Generated beams propagate to different directions after the mosaic layer. The distance between LEL and VFML may be used as an aperture expander in some embodiments. Achieving a specific optical performance may call for the applicable distance to be matched to the periodic layer feature size/pitch and sizes of the individual mosaic features. The single beam exit aperture may be expanded in such way that the focused image of the source is smaller while accounting for the geometric magnification factor. A large distributed aperture may also reduce the diffraction effects associated with single small apertures. This may be especially important for voxel layers created closer to the viewer since the eye resolution becomes higher and geometric magnification forces voxel sizes to be larger. It may be preferable that all beam sections cross at the voxel position and reach the viewers single eye pupil in order to create the correct retinal focal cues without too much diffraction blur.

One factor to be considered in the implementing a 3D display is the fact that optical materials refract light with different wavelengths to different angles (color dispersion). If three colored pixels (e.g. red, green, and blue) are used, the different colored beams are tilted and focused to somewhat different directions and distances from the refractive features. In some embodiments, color dispersion may be compensated in the optical structure itself by using a hybrid layer where e.g. diffractive features are used for the color correction. Because the colored sub-pixels can be spatially separated on the light emitting layer, there may be some small angular differences to the colored beam projection angles. If the projected images of the source components are kept small enough on the focal points, the three colored pixels will be imaged next to each other and combined into full-color voxels by the eye in a similar manner analogous to what is seen with the current regular 2D screens where the colored sub-pixels are spatially separated. The colored sub-pixel images of the 3D display may be highly directional, and it may be useful to ensure that all of the three differently colored beams enter the eye through the pupil The physical size of the light emitting elements and the total magnification of the display optics may affect the achievable spatial resolution on each 3D image's virtual focal position. When the light emitting pixels are focused to a surface that is located further away from the display device, the geometric magnification can make the pixel images larger than in the case where the focal surface is located closer to the display. In some embodiments, using a mosaic lens is helpful for increasing the focal length without making the optics' aperture size and source images at the display surface too large. Some embodiments operate to achieve relatively high-resolution 3D image layers not only at the display surface but also at the focal surfaces outside the display.

Diffraction may also affect the achievable resolution, e.g. in the case where the light emitter and optical aperture sizes are very small. The depth range achievable with the display and rendering scheme may be affected by the quality of beam collimation coming from each optical feature. Parameters that may determine collimation quality include the sizes of the light emitting pixels, the size of the mosaic feature aperture, and the effective focal length. Small SLM apertures in front of the mosaic lens may also cause diffraction if the pixel size is small such as in the case of e.g. mobile devices. However, the selection of aperture size can be made in such a way that larger distributed apertures (or aperture cluster distances) and more mosaic features are used when the voxel distance is larger, and it is especially desirable to minimize diffraction effects to achieve better resolution.

A continuous emitter matrix on the LEL may allow for very wide FOVs. Because the focal length used in geometric imaging can be affected separately with the mosaic layer, high resolution and a large viewing zone may be achieved simultaneously.

The mosaic lens in front of the light sources makes it possible to better utilize the wide light emission patterns typical for components like OLEDs and µLEDs. Because the lens is continuous, there may be no need to align the mosaic tiles to specific sources if the source layer has a continuous matrix of emitters. However, as the typical Lambertian emission pattern makes light intensity drop for greater angles from the surface normal direction, it may be helpful to calibrate the beam intensities with respect to beam angle. This calibration or intensity adjustment can be made e.g. by selecting the spatial light modulator transmissions accordingly or by adjusting the light emission of the source with current or pulse width modulation.

3D Display Rendering Schemes.

Several different kinds of rendering schemes can be used together with the display structures and optical methods described herein. Depending on the selected rendering scheme, a display device can be a 3D display with multiple views and focal surfaces or a regular 2D display. In some embodiments, a 2D display mode can be activated by displaying the same image to all possible directions at the same time using the same hardware that is used for generating the 3D images. In some embodiments, the 2D functionality is supported with the mosaic lens by utilizing switchable diffusing surfaces, as previously discussed.

In some embodiments, a 3D rendering scheme creates several focal points or focal surfaces in front of the viewer(s) in front of or behind the physical display surface in addition to the multiple viewing directions. It may be useful to generate at least two projected beams for each 3D object point or voxel. Reasons for using at least two beams may include (i) that a single sub-pixel inside the display should have an FOV that makes it visible to only one eye at any given time, and (ii) that the created voxel should have an FOV that covers both eyes simultaneously in order to create the stereoscopic view. The voxel FOV may be created as a sum of individual beam FOVs when more than one beam is used at the same time. For all voxels that are between the display and observer, it may be helpful to have the convergence beams cross in front of the display at the correct voxel distance. In a similar way, it may be helpful for the voxels positioned at a further distance from the observer than the display to have a beam pair virtually crossing behind the display. The crossing of the (at least) two beams helps to generate a focal point (or surface) that is not limited to the display surface. The crossing of the beams can also initiate the eye convergence necessary for stereoscopic 3D image perception. It may be useful to have the separate beams focus to the same spot where they cross. The use of a mosaic lens makes may help create the desired single beam focuses with the beam sections so that more natural retinal focus cues can be created.

Rendering a continuous range of depths on a 3D display may involve heavy computation. In some embodiments, the 3D data may be reduced to certain discrete depth layers in order to reduce computational requirements. In some embodiments, discrete depth layers may be arranged close enough to each other to provide the observers visual system with a continuous 3D depth experience. Covering the visual range from 50 cm to infinity may take about 27 different depth layers, based on the estimated human visual system average depth resolution. In some embodiments, the presented methods and optical hardware allow creation of multiple focal surfaces that can be displayed to the same direction at different points in time by controlling the focus distance of the VFML mosaic features. In some embodiments, observer positions may be actively detected in the device and voxels may be rendered to only those directions where the observers are located. In some embodiments, active observer eye tracking is used to detect observer positions (e.g., using near-infrared (NIR) light with cameras around or in the display structure).

One trade-off situation associated to the rendering scheme may be found between spatial/angular and depth resolutions. With a limited number of pixels and component switching speeds, emphasizing high spatial/angular resolution may have the cost of fewer focal planes (lower depth resolution). Conversely, having more focal planes for better depth resolution may come with the cost of a more pixelated image (low spatial/angular resolution). The same tradeoff may apply to the data processing at the system level, as more focal planes may involve more calculations and higher data transfer speeds. In the human visual system, depth resolution decreases logarithmically with distance, which may allow for the reduction of depth information when objects are farther away. Additionally, the eyes can resolve only larger details as the image plane goes farther away, which may allow for the reduction of resolution at far distances. In some embodiments, rendering schemes are configured to produce different voxel resolutions at different distances from the viewer in order to lower the processing requirements for image rendering. The tradeoffs connected to the rendering scheme may also be addressed on the basis of the presented image content, enabling, e.g., higher resolution or image brightness.

In some embodiments, three differently colored pixels are implemented on the light-emitting layer (LEL) and/or on the spatial light modulator (SLM) in order to create a full-color picture. The color rendering scheme may involve systems and/or methods to adapt to the fact that different colors are refracted to somewhat different angular directions at the periodic layer. In addition to a special color rendering scheme, some of this dispersion may be removed with hardware, e.g. by integrating diffractive structures for color correction. This is especially useful in compensating for the different focus distances of the refractive features. An example color rendering scheme, in accordance with some embodiments, is to use white illumination and an SLM that has color filters. White beams can be generated, for example, with a combination of blue µLEDs and thin layer of phosphor. In this case, the beam colors may be selected in the SLM layer (e.g. an LCD panel) for each focal layer voxel separately. Colors may be combined in the eye in a manner similar to that of current 2D displays.

IMPLEMENTATION EXAMPLES

Figure 31:
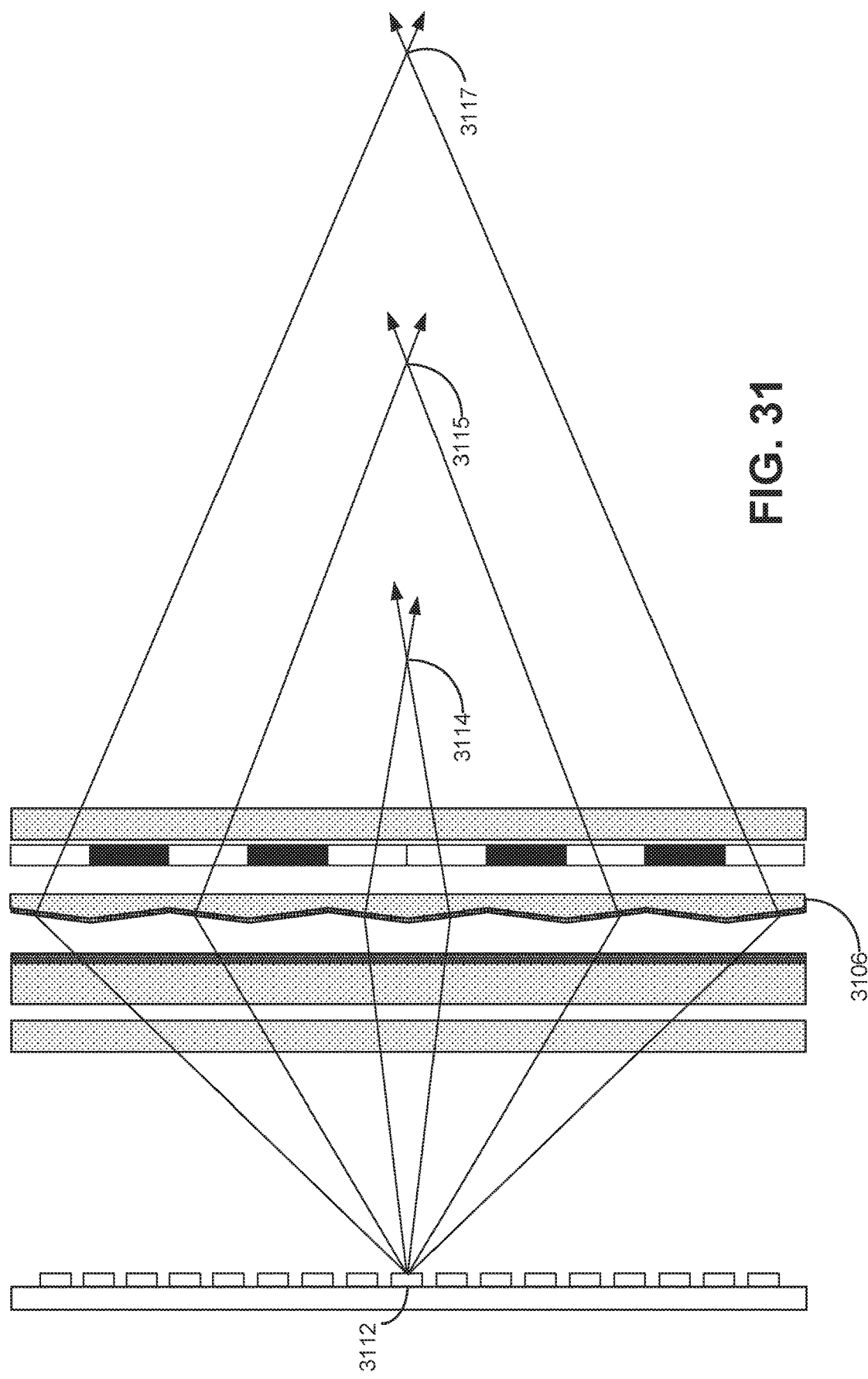
FIG. 31 depicts a variation of a 3D display with extended depth of focus (EDoF), in accordance with some embodiments

FIG. 31 depicts a variation of a 3D display with extended depth of focus (EDoF), in accordance with some embodiments. In this case, the mosaic lens optical features 3106 are designed in such a way that different aperture sizes can be used simultaneously. This may be achieved by e.g. selecting several different areas from different radial distances from a larger lens to the mosaic tile. With such a structure, the features located at shorter distances from each other can be used along with the larger aperture features and the resulting beam sections can still be projected to the same direction.

The example shown in FIG. 31 illustrates that if the central and edge feature focal lengths are adjusted to have slightly different focal distances, an extended depth of focus (EDoF) beam can be created. Two EDoF beams can be used for forming a voxel by crossing them at all distances inside the extended focus range without causing mixed cues for eye convergence and retinal focus. This arrangement may simplify matching the beam internal focus and two beam crossing locations. It may also provide brighter images and less energy consumption since larger areas of the VFML are used for single beam generation, and thus less light is blocked or wasted. The extended focus depth range can be adjusted with the VFML LC material index tuning. The EDoF range may be created using the same hardware described previously, but by utilizing the LC material index tuning dynamic range. In this latter case, the variation can be done at system level by controlling the VFML drive parameters instead of changing the hardware design. In the example of FIG. 31, light from the light source 3112 is simultaneously focused at three different distances 3114, 3115, 3117.

FIG. 16 depicts a scenario where a mobile device with 7" 3D display is placed at 350 mm distance from a single viewer. The display forms an image to a virtual image zone, which is located behind the mobile device. The display may give the appearance of being a window to the 3D space. In some embodiments, a continuous image zone covers distances from 390 mm to 800 mm as measured from the viewer eye position. A deeper image zone may be possible with the focal adjustment range. The display may be configured to generate multiple voxel forming beams both in the horizontal and vertical directions with the presented optical structure.

Figure 32:
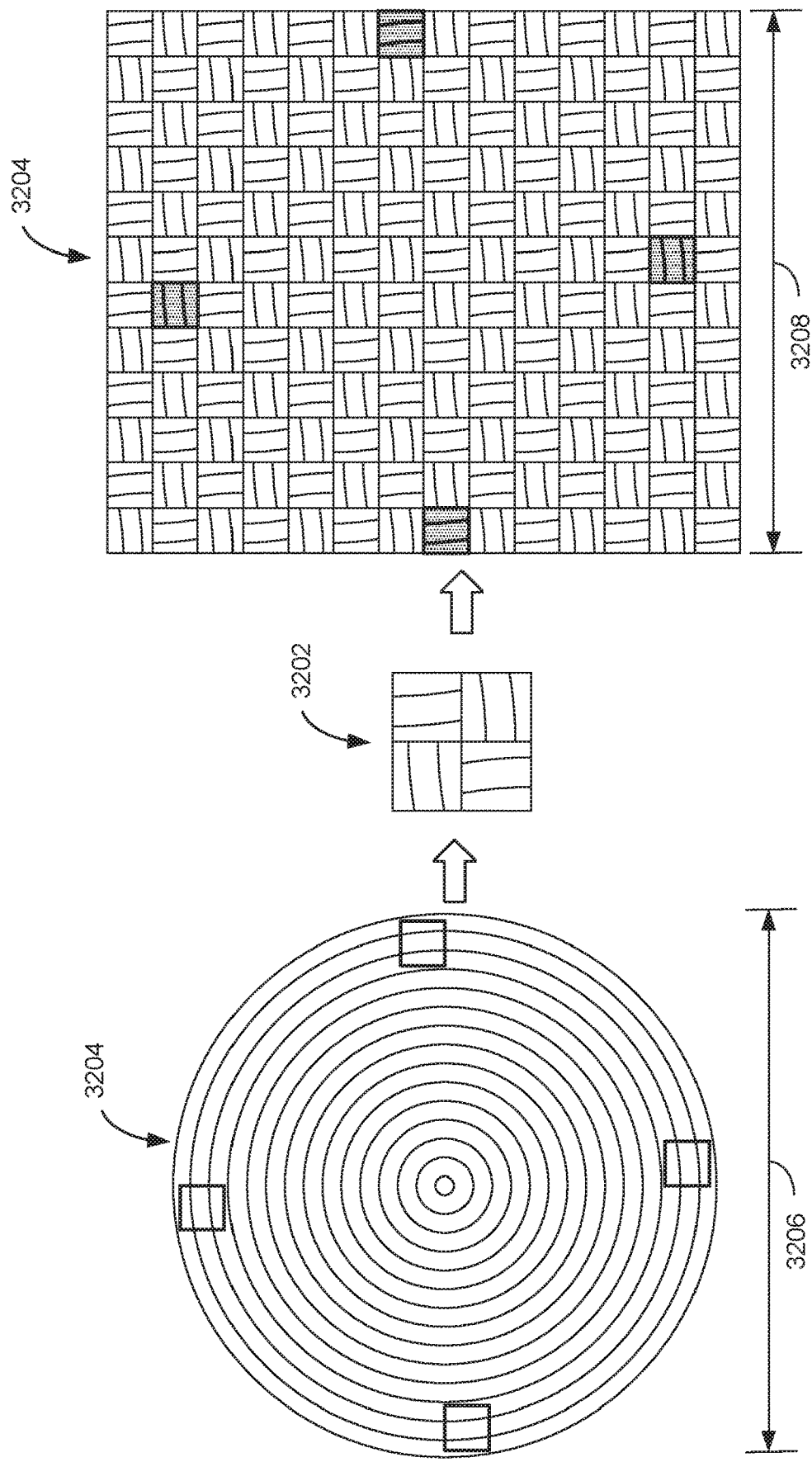
FIG. 32 depicts the structure and measurements (in μm) of an example VFML mosaic lens design, in accordance with some embodiments.

FIG. 32 depicts the structure and measurements (in μm) of an example VFML mosaic lens design. In the example, each mosaic tile 3202 may be conceptualized as being sampled from four areas taken from a circularly symmetric lens 3204, which has a focal length of 2 mm at the LC material refractive index nominal state. In some embodiments, each quadrant within mosaic tile 3202 is 27.5 μm×27.5 μm in size, and the resulting tile 3202 is 55 μm square. As illustrated at 3204 the tile may be tessellated across a rectangular grid pattern over a display surface area. This size is also the pitch that neighboring voxels can have in one angular direction. With 55 μm pixel size, the 7" display has an array of 1440×2880 pixels, which can be considered high resolution for current mobile phones. Four lens features may be used together for each beam, where each beam has two separate beam sections in the horizontal direction and two in the vertical. When these four sections are selected from the mosaic lens appropriately, the optical functionality of the full 330 μm aperture of the original continuous lens (indicated at 3206) can be imitated, as shown at 3208. The mosaic lens may be manufactured, for example, on a PMMA foil substrate with UV-curable optical material.

Figure 33:
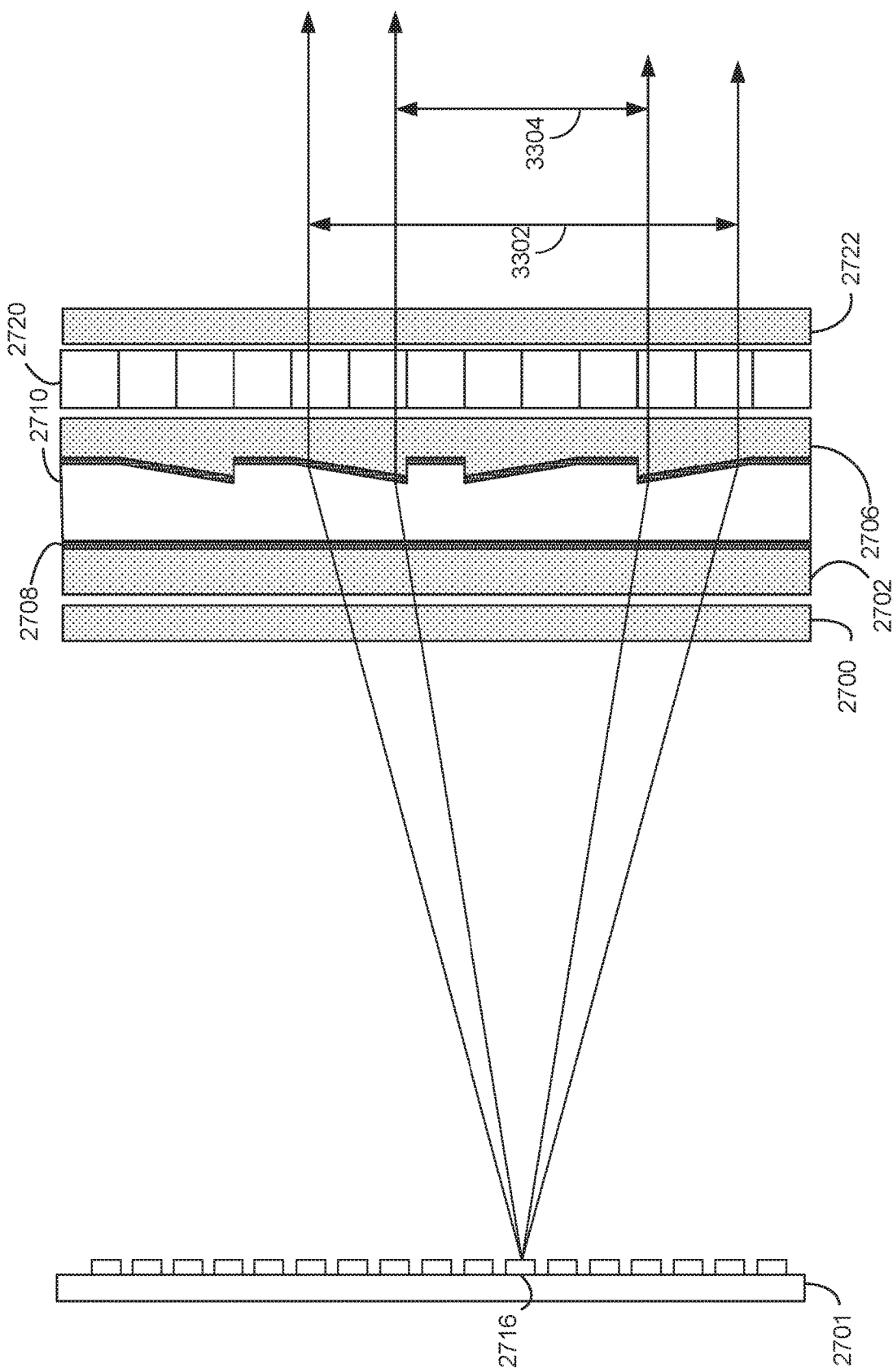
FIG. 33 depicts the structure and measurements (in μm) of an example 3D display optical design.

FIG. 33 depicts the structure of an example 3D display optical design. In the example, light is emitted from a continuous μLED matrix where the component size is 2 μm×2 μm and the pitch is 3 μm. Components are overcoated with a phosphor layer (not illustrated) that converts the emitted blue light into wider white light spectrum. The VFML and the LCD display sub-assemblies may be glued together with accurate alignment. In some embodiments, the VFML and the LCD are both 300 μm thick. Two 50 μm thick linear polarizer sheets 2700, 2722 are laminated on both sides of the active components making the whole stack thickness ~700 μm. The μLED matrix 2701 may be positioned approximately at the 2 mm VFML lens nominal focal distance (which may be 1950 μm from the polarizer 2700), making the whole display optics design thickness below 3 mm. Single sources produce well-collimated beams that, in some embodiments, have four sections coming from four mosaic lens apertures: two sections separated in the horizontal direction and two in the vertical. The total width 3302 of the beam in both directions at the display surface may be 330 μm, and the space 3304 between sections may be 220 mm wide, as given by the mosaic optical feature spacing and size.

In the example, the VFML is constructed from a thin glass sheet substrate and a mosaic lens structure. Both components have ITO electrode coatings and confine a thin layer of nematic liquid crystal material. The refractive index of the liquid crystal material is tuned to fit the mosaic lens index in such a way that the nominal focal length of the lens features is 2.0 mm. The tuning range of the LC material refractive index is used for increasing the focus distance of the lens from the nominal value up to ~2.1 mm. This small change in focus is adequate for making the beam sections to diverge from each other. Each beam can create virtual focal points behind the display within a distance range of 40 mm to 450 mm from the optical structure.

The LCD panel has 27.5 μm×27.5 μm pixels that have red, green and blue color filters (~9 μm wide each) used for generating colored voxels. This means that resolution of the LCD panel is four times higher (2880×5760 pixels ~6K resolution) than the display voxel nominal resolution. The color filter arrangement is the same as shown in FIG. 29A. The pixel size of the panel is the same as the mosaic lens single feature size making it possible to selectively block beam sections originating from the different features.

The use of a varifocal mosaic lens and SLM allows separate control over the optical system effective focal length and geometric magnification ratio without reducing display field of view (FOV) and beam aperture size excessively. This makes it possible to image smaller voxels and improve image resolution on virtual focal planes outside the display surface.

A continuous emitter matrix on the light emitting layer allows very wide FOVs, which makes it possible to create wide viewing windows for multiple users. This also allows for displays to be made without curvature or additional focusing optics that would overlap the FOVs from display edge areas, simplifying the system further.

In some embodiments, the whole continuous optical structure is used for creation of multiple beam sections. In such embodiments, there may be a reduced need to accurately align the light emitting layer with the mosaic layer in the horizontal or vertical directions. The depth direction can also have relaxed tolerances as voxel focal distances can be adjusted with the VFML. This may lead to cost savings in the manufacturing process, and the display can also be made robust against environmental factors by e.g. calibrating the VFML with different drive parameters for different temperatures. This latter feature is especially useful with mobile devices that are used in varying environments.

In some embodiments, the varifocal feature of the 3D display may be used for correcting image focus for people with myopic or hyperopic eyes. This makes it possible to use the display e.g. without prescription glasses or in a situation where the display is positioned close to viewer and eye lenses cannot properly accommodate.

As the single voxel-forming beam is split to several sections, diffraction effects can be somewhat reduced by expanding the overall beam aperture size.

Some embodiments are especially suitable for mobile devices as the mosaic varifocal lens allows high resolution voxels and relatively thin display structures. Mobile devices are used at close range, making spatial resolution as high priority. These devices also usually come with a front facing camera that can be used for eye tracking, making it possible to utilize the presented display structure variant without SLM making the structure simpler, thinner and lower cost.

The SLM functionality may be implemented with LCD panels. The SLM pixels may be used only with binary on-off functionality if the light emitting pixels (e.g. μLEDs) are modulated separately. However, an LCD panel can also be used for the pixel intensity modulation in some embodiments, making it possible to keep light emitting layer controls simpler. Switching speed requirements for the SLM and VFML are not hard as the goal is to reach flicker free images of ~60 Hz. Main 3D image generation is done with the faster pixelated light emitter module behind the focusing and aperture controlling structures and the SLM is only used for passing or blocking parts of the beams that need to reach the viewer eyes, making the human visual system the determining factor for SLM update frequency.

Example Rendering Method.

Figure 34:
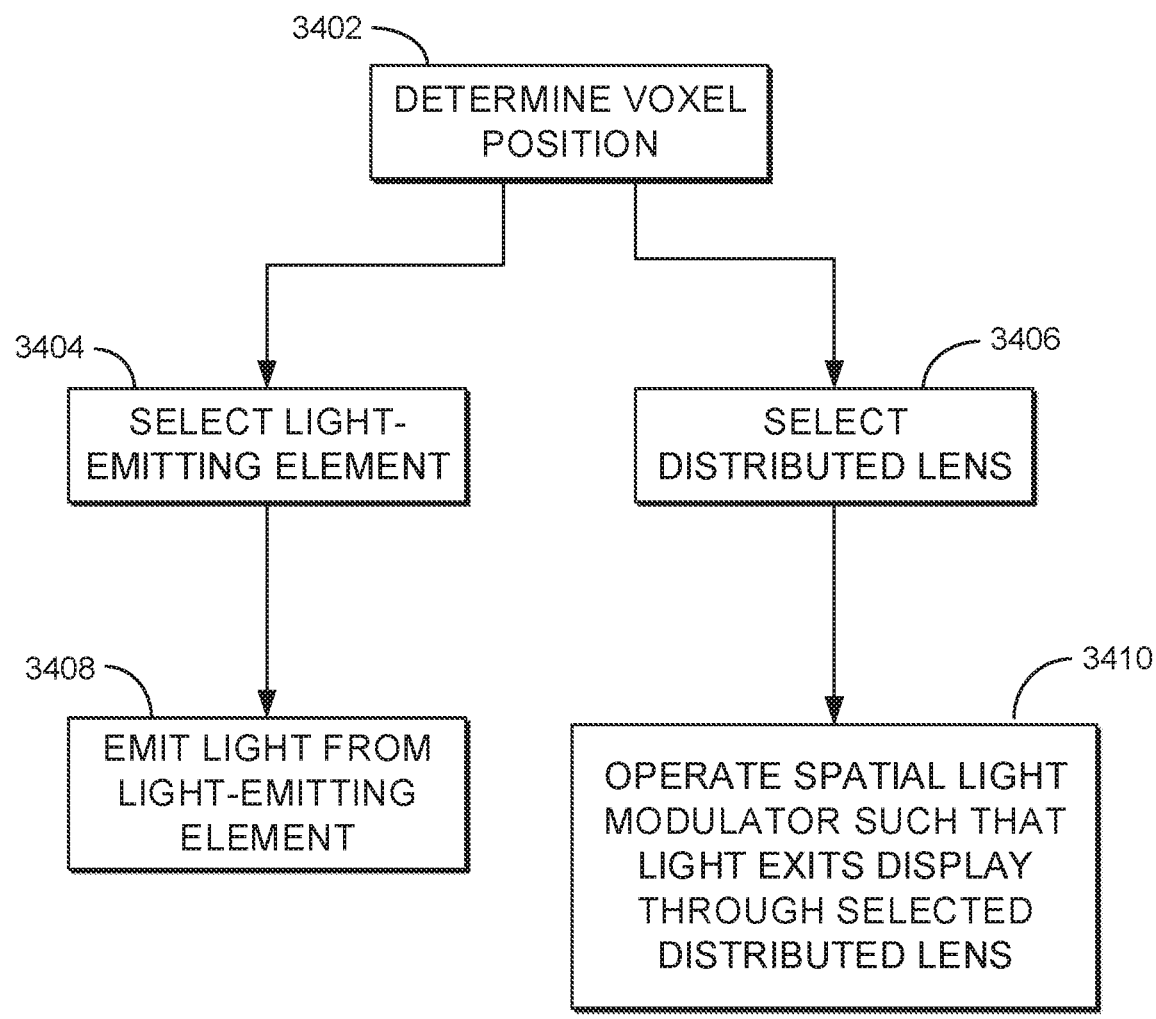
FIG. 34 is a flow diagram of a method of operating a display according to some embodiments.

An example method of operating a display device is illustrated in FIG. 34. In the example method, light is selectively emitted from at least one light-emitting element (e.g. elements 1308, 1318, 1320, 2711, 2712, 2713, 2716) in an addressable array (e.g. 1302, 2701) of light-emitting elements. The emitted light is emitted toward an optical layer (e.g. 1304, 2706) comprising a plurality of lens regions. A spatial light modulator (e.g. 1306, 2720) is operated to allow the emitted light to travel outside the display device through a selected plurality of the lens regions. The selected plurality of lens regions includes at least two selected lens regions within a selected first distributed lens.

To perform such a method, in some embodiments, a position is determined (3402) of a voxel to be displayed. Based on the voxel position, at least one of the light-emitting elements is selected (3404), and at least a first distributed lens is selected (3406).

The selected lens regions may include at least two non-contiguous lens regions within the first distributed lens. The selected non-contiguous lens regions may have substantially the same principal focus point. The first distributed lens may have a first optical center, and the first distributed lens may be interlaced with at least a second distributed lens having a second optical center different from the first optical center, as shown, for example in FIGS. 15A-150, 17C, 18-22, 24, 25, and 32. In some embodiments, at least one lens region of the first distributed lens is located between at least two lens regions of the second distributed lens.

In some embodiments the selection of the light-emitting element (3404) and the distributed lens (3404) is made such that the light-emitting element and an optical center of the first distributed lens are substantially collinear, as shown for example in FIG. 10. In some embodiments, a plurality of light-emitting element (e.g. elements 1318 and 1320) and corresponding distributed lenses may be selected for a single voxel position (e.g. position 1316). The light-emitting element(s) and the distributed lens(es) may be selected such that light from the light-emitting element is substantially focused at the determined voxel position (e.g. position 1316), or they may be selected such that the emitted light is substantially collimated toward the determined voxel position.

In some embodiments, the selection of the light-emitting element(s) and distributed lens(es) may be made with the use of a lookup table or other preconfigured information that indicates, for each of a plurality of voxel locations, which combination or combinations of light-emitting elements and distributed lenses are to be used to display the voxel. In embodiments that use varifocal lenses, such configuration information may further include information on settings for the varifocal lens (e.g. information indicating a level of voltage to apply across the liquid crystal layer).

Light is selectively emitted from the selected light-emitting element(s) (3408), and the spatial light modulator is operated (3410) to allow the emitted light to travel outside the display device through the lens regions of the distributed lens(es). The spatial light modulator may also be operated to block light rays that would cause stray light (e.g. light rays that do not contribute to the display of a desired image). The spatial light modulator may be configured on either side of the lens layer, allowing undesired light to be blocked either before it reaches the lens layer or after it has passed through the lens layer.

Additional Embodiments

A display device according to some embodiments includes: a light-emitting layer comprising an addressable array of light-emitting elements; an optical layer overlaying the light-emitting layer, wherein the optical layer includes a plurality of distributed lenses, each distributed lens having an optical center, and wherein each of the distributed lenses is interlaced with at least one other distributed lens having a different optical center; and a spatial light modulator operative to provide control over which lens regions transmit light from the light-emitting layer outside the display device.

In some embodiments, each of the distributed lenses comprises a plurality of lens regions, and at least one lens region of a first distributed lens is located between at least two lens regions of a second distributed lens, the first and second distributed lenses having different optical centers.

In some embodiments, each of the lens regions within a respective distributed lens has substantially the same principal focus point.

In some embodiments, each distributed lens includes at least two non-contiguous lens regions.

In some embodiments, the spatial light modulator comprises a plurality of light-modulating pixels, and wherein each pixel of the spatial light modulator corresponds to no more than one of the lens regions.

In some embodiments, for each of a plurality of the distributed lenses, the respective distributed lens is configured to focus light from at least one predetermined light-emitting element to at least one predetermined voxel position.

In some embodiments, for each of a plurality of the distributed lenses, the respective distributed lens is configured to collimate light from at least one predetermined light-emitting element toward at least one predetermined voxel position.

A display device according to some embodiments includes: a light-emitting layer comprising an addressable array of light-emitting elements; an optical layer overlaying the light-emitting layer, wherein the optical layer includes a plurality of distributed lenses, each distributed lens comprising at least two non-contiguous lens regions; and a spatial light modulator operative to provide control over which lens regions transmit light from the light-emitting layer outside the display device.

In some embodiments, the non-contiguous lens regions within the distributed lens have substantially the same principal focus point.

In some embodiments, each distributed lens has an optical center, and each of the distributed lenses is interlaced with at least one other distributed lens having a different optical center.

In some embodiments, at least one lens region of a first distributed lens is located between at least two lens regions of a second distributed lens having a different optical center.

In some embodiments, for each of a plurality of the distributed lenses, the respective distributed lens is configured to focus light from at least one predetermined light-emitting element to at least one predetermined voxel position.

In some embodiments, for each of a plurality of the distributed lenses, the respective distributed lens is configured to collimate light from at least one predetermined light-emitting element toward at least one predetermined voxel position.

A method of operating a display device according to some embodiments includes: selectively emitting light from a light-emitting element in an addressable array of light-emitting elements, the emitted light being emitted toward an optical layer comprising a plurality of lens regions; and operating a spatial light modulator to allow the emitted light to travel outside the display device through a selected plurality of the lens regions, the selected plurality including at least two selected lens regions within a selected first distributed lens.

In some embodiments, the selected lens regions include at least two non-contiguous lens regions within the first distributed lens.

In some embodiments, the first distributed lens has a first optical center, and the first distributed lens is interlaced with a second distributed lens having a second optical center different from the first optical center.

In some embodiments, at least one lens region of the first distributed lens is located between at least two lens regions of the second distributed lens.

In some embodiments, the selected non-contiguous lens regions have substantially the same principal focus point.

In some embodiments, the method further includes: determining a position of a voxel to be displayed; and selecting the light-emitting element and the first distributed lens based on the determined voxel position. The light-emitting element and the distributed lens may be selected such that the light-emitting element and an optical center of the first distributed lens are substantially collinear. The light-emitting element and the distributed lens may be selected such that light from the light-emitting element is substantially collimated toward the determined voxel position. The light-emitting element and the distributed lens may be selected such that light from the light-emitting element is substantially focused at the determined voxel position.

A display device according to some embodiments includes: a light-emitting layer comprising an addressable array of light-emitting elements; an optical layer overlaying the light-emitting layer, wherein the optical layer includes a plurality of varifocal distributed lenses, each varifocal distributed lens having an optical center, and wherein each of the varifocal distributed lenses is interlaced with at least one other varifocal distributed lens having a different optical center; and a spatial light modulator operative to provide control over which varifocal distributed lenses transmit light from the light-emitting layer outside the display device.

In some embodiments, each of the varifocal distributed lenses comprises a plurality of varifocal lens regions, and at least one varifocal lens region of a first varifocal distributed lens is located between at least varifocal two lens regions of a second varifocal distributed lens, the first and second varifocal distributed lenses having different optical centers.

In some embodiments, the varifocal lens regions within a respective distributed lens are operable to focus light to a variable common focal point, the common focal point being controlled by an input to the optical layer.

In some embodiments, each varifocal distributed lens includes at least two non-contiguous varifocal lens regions.

In some embodiments, the spatial light modulator comprises a plurality of light-modulating pixels, and wherein each pixel of the varifocal spatial light modulator corresponds to no more than one of the varifocal lens regions.

In some embodiments, for each of a plurality of the varifocal distributed lenses, the respective varifocal distributed lens is configured to focus light from at least one predetermined light-emitting element to at least one voxel position, where a focal distance of the voxel position is controllable by input to the optical layer.

In some embodiments, for each of a plurality of the varifocal distributed lenses, the respective varifocal distributed lens is responsive to input to the optical layer to collimate light from at least one predetermined light-emitting element toward at least one voxel position.

A display device according to some embodiments includes: a light-emitting layer comprising an addressable array of light-emitting elements; an optical layer overlaying the light-emitting layer, wherein the optical layer includes a plurality of varifocal distributed lenses, each varifocal distributed lens comprising at least two non-contiguous varifocal lens regions; and a spatial light modulator operative to provide control over which varifocal lens regions transmit light from the light-emitting layer outside the display device.

In some embodiments, the non-contiguous varifocal lens regions within the varifocal distributed lens are operable to focus light to a variable common focal point, the common focal point being controlled by an input to the optical layer.

In some embodiments, each varifocal distributed lens has an optical center, and each of the varifocal distributed lenses is interlaced with at least one other varifocal distributed lens having a different optical center.

In some embodiments, at least one varifocal lens region of a first varifocal distributed lens is located between at least two varifocal lens regions of a second varifocal distributed lens having a different optical center.

In some embodiments, for each of a plurality of the varifocal distributed lenses, the respective varifocal distributed lens is configured to focus light from at least one predetermined light-emitting element to at least one voxel position, where a focal distance of the voxel position is controllable by input to the optical layer.

In some embodiments, for each of a plurality of the varifocal distributed lenses, the respective varifocal distributed lens is configured to collimate light from at least one predetermined light-emitting element toward at least one voxel position.

In some embodiments, the optical layer comprises at least one liquid crystal layer.

In some embodiments, the optical layer comprises a polarizing layer.

A method of operating a display device according to some embodiments includes: selectively emitting light from a light-emitting element in an addressable array of light-emitting elements, the emitted light being emitted toward an optical layer comprising a plurality of varifocal lens regions; and operating a spatial light modulator to allow the emitted light to travel outside the display device through a selected plurality of the varifocal lens regions, the selected plurality including at least two selected varifocal lens regions within a selected first varifocal distributed lens.

In some embodiments, the selected varifocal lens regions include at least two non-contiguous varifocal lens regions within the first varifocal distributed lens.

In some embodiments, the first varifocal distributed lens has a first optical center, and the first varifocal distributed lens is interlaced with a second varifocal distributed lens having a second optical center different from the first optical center.

In some embodiments, at least one varifocal lens region of the first varifocal distributed lens is located between at least two varifocal lens regions of the second varifocal distributed lens.

In some embodiments, the selected non-contiguous varifocal lens regions are operable to focus light to a variable common focal point, the common focal point being controlled by an input to the optical layer.

In some embodiments, the method further includes: determining a position of a voxel to be displayed; and selecting the light-emitting element, the first varifocal distributed lens, and a focal distance of the first varifocal distributed lens based on the determined voxel position. In some embodiments, the light-emitting element and the varifocal distributed lens are selected such that the light-emitting element and an optical center of the first distributed lens are substantially collinear. In some embodiments, the light-emitting element, the varifocal distributed lens, and the focal distance of the varifocal distributed lens are selected such that light from the light-emitting element is substantially collimated toward the determined voxel position. In some embodiments, the light-emitting element, the varifocal distributed lens, and the focal distance of the varifocal distributed lens are selected such that light from the light-emitting element is substantially focused at the determined voxel position.

In some embodiments, a display method includes: emitting light from a plurality of light emitting elements; producing beams of light by focusing the emitted light using a varifocal mosaic layer comprising a plurality optical features arranged in a mosaic pattern, where at least one of the plurality of optical features includes a controllable focal length; selectively passing beams of light using a spatial light modulator; and altering control inputs to the light emitting elements, the varifocal mosaic layer, and the spatial light modulator in a time synchronized manner.

In some embodiments, altering the control inputs comprises altering control inputs based on a desired color, angle, focal depth, and intensity.

In some embodiments, altering the control inputs comprises using a lookup table to drive the light emitting elements, the varifocal mosaic layer, and the spatial light modulator in a coordinated manner to create the desired voxel distribution and block unwanted stray light.

A display device according to some embodiments includes: a light-emitting layer comprising a plurality of controllable light emitting elements; a varifocal mosaic layer comprising a repeating pattern of optical elements, each optical element having a set of optical properties and an adjustable focal length; and a controllable spatial light modulator operative to selectively pass light emitted from the light emitting layer to the outside of the display.

In some embodiments, a light field display apparatus includes: a controllable light emitting element array; and an optical element stack comprising: a polarizing layer; a controllable varifocal mosaic layer operative to control focal distances of generated light beams; and a controllable spatial light modulation layer operative to block stray light using adjustable apertures.

A display device according to some embodiments includes: a light emitting layer (LEL) comprising an array of light emitting elements; an optical layer comprising a plurality of tiles with optical properties; and a spatial light modulator (SLM); wherein the tiles focus light emitted from the light emitting elements into beams of light; wherein each beam of light is focused to a direction depending on the optical properties of the respective tile; wherein the optical properties of at least one of the plurality of tiles includes an adjustable focal length; and wherein the SLM controls the beams of light in a synchronized manner with the light emitting layer in order to replicate the properties of a light field.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Simulation Results.

In order to investigate the small aperture spatial resolution problem further, a set of simulations was made with optical design program OpticStudio 18. A rectangular 2 μm×2 μm source with single 550 nm wavelength was placed behind a projection lens to a 2 mm distance. The used green light represented a central wavelength of the visible range used in a full-color display. A projection lens imaged the source to 50 mm distance with a single beam of light that continued propagation to an eye model positioned at 350 mm distance from the lens representing the display surface. The projection lens aperture was changed for each simulation case in order to see the optical effects. The eye model had a 4 mm diameter pupil, 17 mm focal length eye lens, and a second focusing lens that was adjusted to three different eye focus distances. The eye model was used in order to obtain the retinal images created with the projected beam. The first eye focus distance of 350 mm was set to the projection lens aperture location on the display surface and the second focus distance of 300 mm was set to the projected voxel location. The third focus distance was 250 mm, which was 50 mm from the voxel towards the eye model. Both geometric and diffraction based simulations were performed in order to see the different optical effects and their relation to each other.

Figure 35:
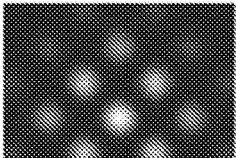
FIG. 35 illustrates simulated irradiance distributions of small apertures.

FIG. 35 shows the results of simulations performed with two small projection lens circular aperture sizes of 50 µm and 250 µm. In the first two cases, a single central aperture was used, but in the third case a distributed aperture cluster with four 50 µm apertures placed at 100 µm distance from the center was tested. Columns present the results of geometric and diffraction simulations of one aperture type side by side as 2D irradiance maps connected to the three different eye focus distances shown on the three rows. Detector area size in each retinal image is 50 µm×50 µm. The geometric distributions of the bottom row show the circular aperture shapes as the eye is focused directly to the display surface. Geometric distributions of the second row show small rectangular irradiance distributions that are the magnified images of the single rectangular source. All of these three images have the same size and shape as geometric imaging factors were the same in each simulated case, and the only difference is the total optical power in each spot determined by the different areas of the optical apertures.

When the geometric simulation results of the single 50 µm aperture in FIG. 35 are compared at different eye focus distances, it becomes apparent that the optics is not able to produce a smaller spot at the 300 mm voxel distance than what it shows on the display surface. This is caused by the fact that the 2 mm focal length projection lens images the 2 µm source into a 50 µm spot at the 50 mm voxel distance from the display. In this case the rectangular image of the source in the eye retina has almost the same width than the circular aperture seen at the further display distance of 350 mm. At the shortest eye focus distance of 250 mm, the beam and eye combination is still imaging a rectangular pattern. But as the distance from the display projection lens is larger, geometric magnification ratio is higher and it follows that the source image is bigger and also somewhat blurred as the image is out of focus. The geometric irradiance distributions show that the 50 µm aperture would make the eye to focus to the display surface where the smallest spot is visible instead of the intended voxel location. However, it can be seen from the diffraction simulation results that with such a small aperture, diffraction effects dominate irradiance distributions, and geometric magnification as well as beam focus distance become non-relevant. The diffraction blur also increases the source retinal image size considerably, setting a hard limit to the achievable voxel resolution.

In order to make the display projection lens aperture geometric image appear bigger than the voxel size, and in order to lower the amount of diffraction blur, one may increase the size of the projection lens. The second column of FIG. 35 shows the results of simulations performed with a 250 µm aperture lens. Geometric irradiance distributions show that now the five times larger aperture size makes it possible to create a situation where the source retinal image size is considerably smaller when the eye is focused to the voxel location (300 mm distance) than when it is focused either to the display surface (350 mm) or 50 mm in front of (250 mm) the voxel. Unfortunately the diffraction effect simulations show that the diffraction blur still dominates the overall imaging performance and even if the aperture size is 250 µm, the beam is not able to create an adequate retinal focus cue. However, as the diffracted beams now show a practically constant retinal image through a 100 mm deep eye focus range, the lens actually works like an extended-depth-of-field (EDoF) projection system. This makes it possible to create voxels with crossing beams by inducing the eye convergence alone and there should be no VAC as the retinal spots remain constant. When the eye is focused to the voxel location, the source retinal image is not as small as the geometric magnification would predict, but it is much smaller than the large blurred spot obtained with the smaller 50 µm aperture. This means that by increasing the aperture size from 50 µm to 250 µm it is possible to obtain a more reasonable spatial resolution for the voxels projected in front of the display.

One example mosaic aperture cluster is shown in the simulation results presented in the last column of FIG. 35. In this case a 250 µm wide circular aperture was sampled with four 50 µm wide circular apertures that were placed to cover, in a cross-shaped pattern, the same horizontal and vertical dimensions as the single larger aperture shown in the second column. Results of the geometric simulations show that such an arrangement is able to produce the proper small source retinal image when the eye is focused to the voxel location. When the eye is focused to the display, it sees the aperture cluster and when it is focused in front of the voxel, it sees a cluster of four blurred source images. In both of these latter cases the overall illuminated retinal surface area is larger than the size of the imaged spot visible at the voxel location. If only geometric imaging would occur, the eye would have a proper retinal focus cue and the eye lens would adapt naturally to the correct voxel distance. This would apply to a case where the single apertures in the cluster are large enough for the geometric factors to dominate irradiance distributions. Unfortunately the situation is different with small apertures where diffraction starts to dominate. The example case diffraction simulations show that the distributed cross-shaped aperture cluster creates not only a single central spot image, but also a series of side spots diffracted from the small apertures. Distributed aperture design may take into account diffraction phenomena from small apertures in order to reach adequate voxel spatial resolution with the projected beams.

Figure 36:
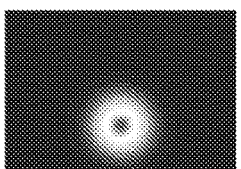
FIG. 36 illustrates simulated irradiance distributions of different sized apertures.

To compare geometric and diffraction dominated imaging cases, a set of three optical simulations was made with the same basic optical configuration as described earlier. In this case the projection lens aperture sizes were set to 250 µm, 500 µm and 750 µm. FIG. 36 shows the results. As previously discussed, the 250 µm aperture produces very similar retinal images with all of the three eye focus distances. This situation is changed when the aperture is increased to 500 µm as the diffracted retinal image is clearly bigger at the 350 mm eye focus distance than at the 300 mm focus distance where the eye is looking at the voxel location. Also the nearest 250 mm eye focus distance causes some diffraction blur around the brighter central spot. By using this 500 µm aperture size, it would be possible to create proper retinal focus cues to the single eye in the 50 mm space in front of the display. The last column of FIG. 36 shows results obtained with a 750 μm aperture. This aperture size is now large enough to make the geometric imaging factors to dominate the retinal images as the spot obtained by focusing the eye to the voxel distance is considerably smaller than the spots seen with the two other distances on both sides of the voxel. It must be noted that these simulation results apply to only the described simulation case where a 2 μm source with single 550 nm wavelength and a 2 mm focal length projection lens were used. If e.g. red light with longer wavelength would have been used, the results would have been somewhat different. However, the simulated cases show the complexity associated to designing 3D display structures with several trade-offs and it emphasizes the fact that diffraction is a real problem in small scale displays aiming for high resolution projected 3D images.

In order to illustrate the potential and functionality of distributed apertures, a set of simulations was made with optical design program OpticStudio 18. A rectangular 2 μm×2 μm source with single 550 nm wavelength was placed behind a projection lens to a 2 mm distance. The used green light represented a central wavelength of the visible range used in a full-color display. A projection lens imaged the source to 50 mm distance with a single beam of light that continued propagation to an eye model positioned at 350 mm distance from the lens representing the display surface. The projection lens aperture was changed for each simulation case in order to see the optical effects. The eye model had a 4 mm diameter pupil, 17 mm focal length eye lens and a second focusing lens that was adjusted to three different eye focus distances. The eye model was used in order to obtain the retinal images created with the projected beam. The first eye focus distance of 350 mm was set to the projection lens aperture location on the display surface and the second focus distance of 300 mm was set to the projected voxel location. The third focus distance was 250 mm, which was 50 mm from the voxel towards the eye model. Both geometric and diffraction-based simulations were performed in order to see the different optical effects and their relation to each other.

Figure 37:
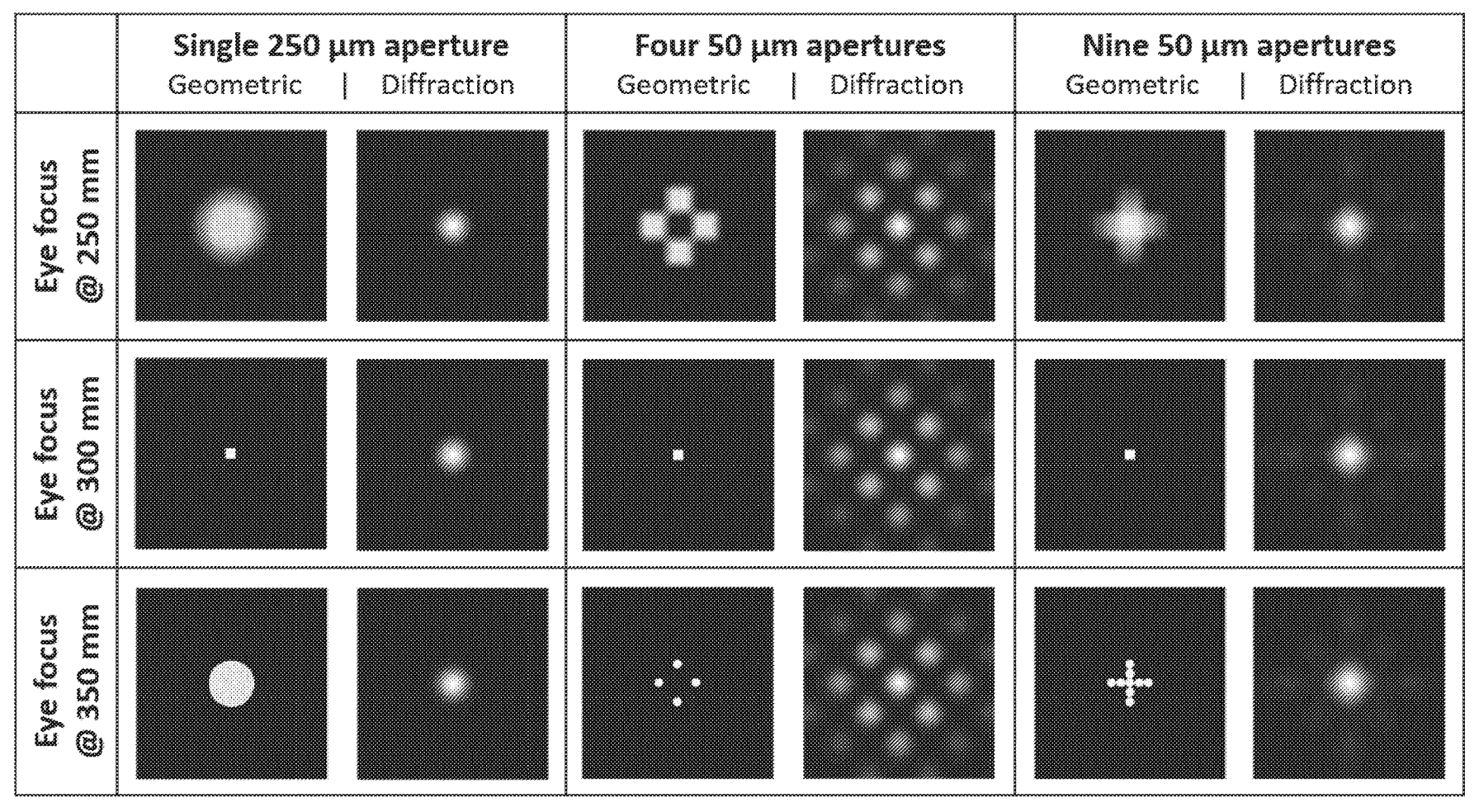

FIG. 37 shows the results of simulations performed with two different distributed aperture designs as well as the results of a simulation performed with single 250 μm circular aperture that is used for comparison. Columns present the results of geometric and diffraction simulations of one aperture type side by side as 2D irradiance maps connected to the three different eye focus distances shown on the three rows. Detector area size in each retinal image is 50 μm×50 μm. The geometric distributions of the bottom row show the aperture geometries as the eye is focused directly to the display surface. Geometric distributions of the second row show small rectangular irradiance distributions that are the magnified images of the single rectangular source. All of these three images have the same size and shape as geometric imaging factors were the same in each simulated case and the only difference is the total optical power in each spot determined by the different areas of the optical apertures.

In the first distributed aperture case presented in the second column of FIG. 37, a cluster of four 50 μm circular apertures placed at 100 μm distance from the center was tested. The results show that whereas the geometric imaging would provide a good retinal focus cue for the voxel location (eye focus at 300 mm has the smallest spot), the diffracted retinal image remains practically the same across all eye focus distances. The image also contains several diffracted secondary source images making it impossible to use this distributed aperture case for retinal focus cue creation. The second distributed aperture case presented in the last column shows an aperture geometry where nine 50 μm circular apertures are used in a cross-shaped pattern that is 250 μm wide. Geometric simulation results show again a good retinal focus cue when the eye is focused to the voxel location, but the diffraction images show that the spot size remains the same through the whole eye focus range. However, in this case most of the light energy is concentrated in the central spot and the diffracted secondary spots are very faint. This indicates that potential 3D image resolution can be increased considerably by using a proper distributed aperture design. In this latter case, the central spot is somewhat larger than the spot obtained with the continuous 250 μm circular aperture, but the difference is not very large. The fact that the projection beam retinal spot size remains the same through the whole eye focus range means that the distributed aperture can also be used in an extended-depth-of-field (EDoF) system and voxels can be formed with eye convergence only.

Figure 38:
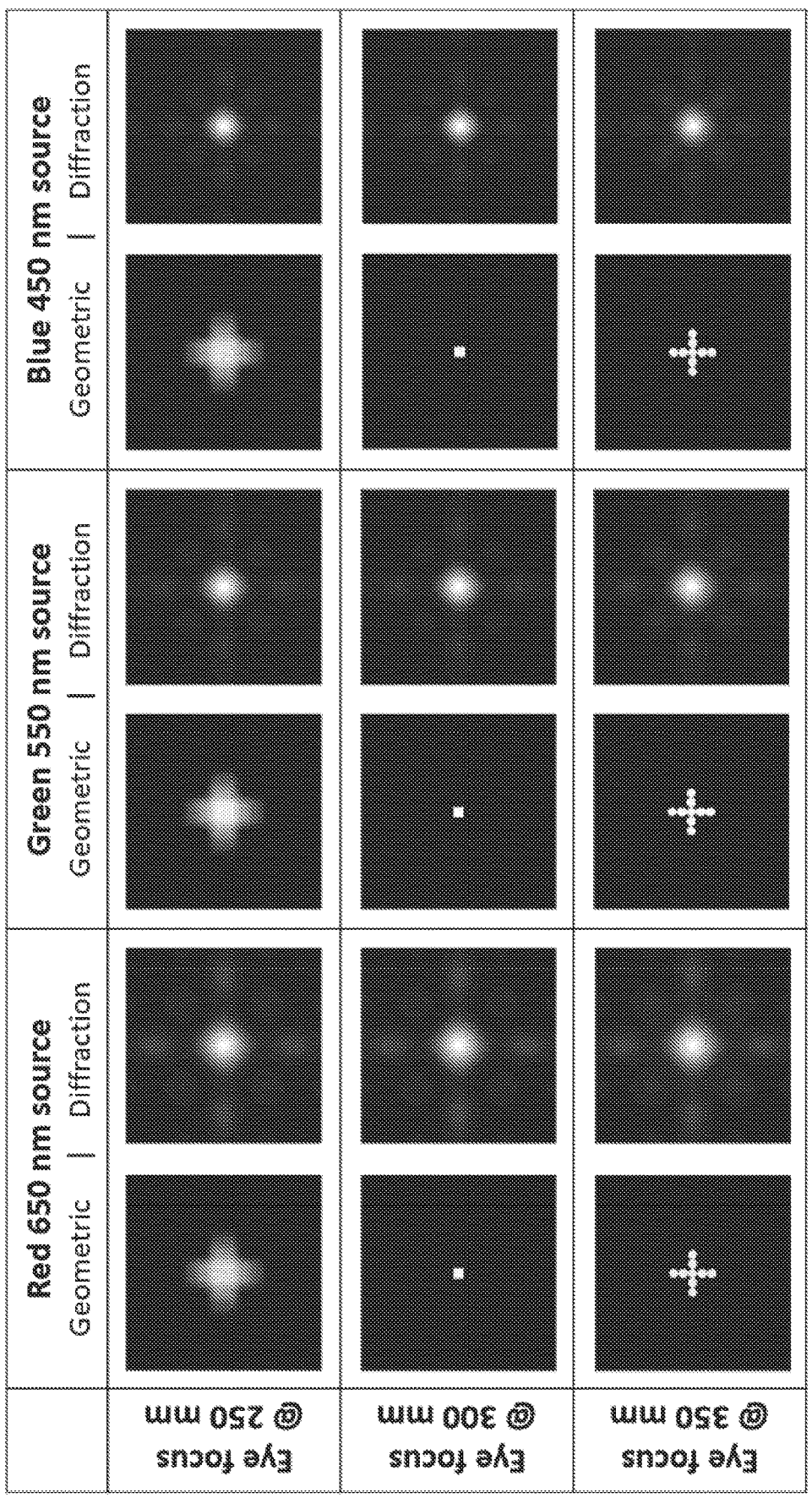
FIG. 38 illustrates simulated irradiance distributions of three different color sources.

FIG. 38 presents the results of a simulation that was made in order to test the diffraction pattern dependency on light wavelength. The same cross-shaped pattern from the previous simulation case was used, but now also red 650 nm and blue 450 nm sources were simulated. In all cases the geometric imaging was done with color corrected optics and all projection lenses had the same imaging distance of 50 mm. Diffracted images show that the retinal spots obtained with a red source are slightly bigger than the spots obtained with a green source and the blue source gives the smallest retinal spot size. The red source images also have faint but distinct secondary diffraction spots around the central intensity maxima and those are almost missing in the blue source case. These are expected results as diffraction phenomena is dependent on light wavelength and red light with longer wavelength diffracts more easily than blue light with shorter wavelength. However, the simulations show that the differences between different color spots are relatively small and that the general diffraction behavior of the distributed aperture can be estimated fairly well by using a single central green color wavelength of 550 nm.

Figure 39:
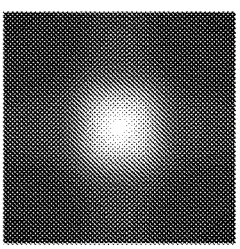
FIG. 39 illustrates simulated irradiance distributions of three different size sources.

FIG. 39 presents the results of simulations that were used in testing imaging behavior of the same cross-shaped distributed aperture with three different-sized sources. All sources had a single green 550 nm wavelength and they had square shape. The three source sizes used were 2 μm, 8 μm and 16 μm, which could represent e.g. some very small μLED components. With the medium source size of 8 μm, the geometric retinal images are approximately the same in size when the eye is focused to the voxel (300 mm) and to the aperture on the display (350 mm), but at closer range of 250 mm the spot image is considerably larger. However, this behavior is not visible in the diffracted images where the spot sizes are the same with all eye focus distances. When the results of the 2 μm and 8 μm sources are compared to each other, it becomes apparent that the geometric imaging factor is not very important with the used distributed aperture as both source sizes produce the same constant spot size through the simulated eye focus range. Geometric image magnification factor suggests that the 8 μm source should have four times wider spot images than the 2 μm sources, but this is not the case as imaging is now dominated by diffraction. The 8 μm source retinal spot size is only ~2× the size of the 2 μm source retinal image. This also means that diffraction can efficiently fuse together two beams that are created with two 2 μm sources positioned right next to each other. Such a feature is bad for spatial resolution, but it can also be utilized e.g. in fusing together different color beams from a matrix of small different color source components.

The last column of FIG. 39 shows the simulation results of a 16 μm wide source. In this case the diffracted retinal images show a blurred rectangular shape, which is clearly bigger than the retinal spots on the two smaller source cases. This indicates that the largest simulated source is approaching the size at which geometric factors are starting to dominate imaging performance. Diffraction still blurs the edges of the source image, but the rectangular shape is already visible. The last example shows that also the source size may be taken into account when designing a system with small distributed apertures as the imaging performance is dependent on the fine balance between geometric and diffraction effects.

Figure 40:
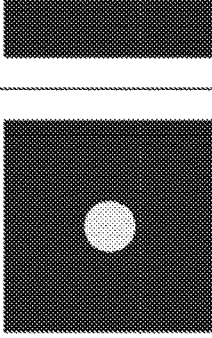
FIG. 40 illustrates simulated irradiance distributions of five different distributed apertures.

The two example distributed aperture cases presented in FIG. 37 illustrate that it may be desirable to select particular arrangements of smaller apertures rather than simply to place a group of smaller apertures to the extreme dimensions of a single large aperture to be sampled. In order to test the behavior of different geometries, a set of five different distributed apertures were modelled with the same optical simulation setup as described previously. FIG. 40 presents the results at the bottom row as diffracted retinal irradiance patterns obtained when the eye is focused to the intermediate voxel location at the distance of 300 mm from the viewer and 50 mm from the display. Simulation result of the single 250 μm circular aperture was included as a reference. In each case, the first row image shows the aperture cluster geometry that was set to the total width and height of 250 μm, sampling the circular single aperture geometry with different fill-factors and shapes.

The first distributed aperture case of FIG. 40 with four 50 μm apertures produces a retinal spot that may have too much noise for good quality voxel formation. The second case right next to that shows an improved result obtained with eight 50 μm apertures. This latter retinal spot may be an improvement over the first one but is not as good as the one obtained with nine 50 μm apertures as presented in previous simulation results of FIG. 38. Although the central small aperture does not add much area to the distributed aperture, the central location of the added small aperture may help to remove the faint diffracted spots visible on the eight aperture retinal image of FIG. 40. The effect of the central aperture area is emphasized in the third simulated distributed aperture case, where four rectangular apertures are used. In this example the central hole in the aperture pattern causes more clear secondary diffraction spots around the central intensity maximum.

The fourth distributed aperture case shown in FIG. 40 has eight triangular apertures connected to each other along vertical and horizontal lines crossing the aperture center point of symmetry. Simulation result shows that although the aperture geometry has smaller overall surface area than e.g. the previous four rectangular apertures, it is still able to produce a clear central intensity maxima and the surrounding secondary diffraction spots are relatively faint. The fifth and last example aperture case has twelve 42 μm wide squares arranged into a checkerboard pattern. This distributed aperture shape is able to produce a good retinal diffraction image that has very faint secondary spots around the central maxima. The spot size is also comparable to the spot size obtained with the continuous circular 250 μm aperture in one diagonal direction. This last example shows that with good design of a distributed aperture, it is possible to get imaging performance that is close to the functionality of a single sampled continuous larger aperture.

Figure 41:
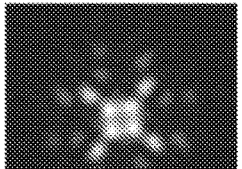
FIG. 41 illustrates simulated irradiance distributions of two different size distributed apertures.

The overall size of the optical aperture used has a large effect on the amount of retinal image diffraction blur. FIG. 41 shows results of a simulation performed with two differently sized distributed apertures as well as the results of a simulation performed with a single 250 μm continuous aperture that is used as comparison. Both distributed aperture cases use the same connected triangle geometry that was presented as the fourth case in the previous FIG. 40, but in the first size simulation case, the total aperture cluster height and width is 250 μm, whereas in the second case the cluster is three times larger. When the smaller and larger triangular apertures are compared, it become evident that the larger aperture is able to create a proper retinal focus cue also with diffraction as the spot size is smallest when the eye is focused to voxel location (300 mm). It is also evident that the distributed 750 μm wide aperture is able to make a smaller diffracted spot than the single continuous 250 μm circular aperture although the single triangles are only ~188 μm wide. Thus the simulation indicates that proper retinal cues can be created with distributed apertures that have large enough total size.

In order to test the structure functionality and achievable resolution, a set of simulations was performed with the optical simulation software OpticsStudio 17. The display optical structure was placed at 350 mm distance from the viewing window. A simplified eye model was constructed from a 4 mm aperture (eye pupil) and two ideal paraxial lenses that were used for adjusting the eye focal length (~17 mm) to the appropriate focus distances. Simulation sources were made with the μLED measurements of 2 μm×2 μm surface area and three colors red 650 nm, green 550 nm and blue 450 nm were used in order to show the diffraction patterns with the different visible wavelengths. The eye model was focused to three different distances 281 mm, 350 mm and 463 mm, representing the three voxel forming depth planes. A set of comparison simulations was also made in order to show the resolution enhancement coming from distributed small aperture design. In these simulations, square 88 μm×88 μm apertures were used, and they were the same size as the central square of the specially designed distributed aperture.

Figure 42:
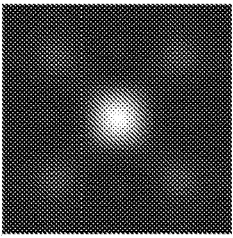
FIG. 42 illustrates simulation results comparing single and distributed aperture retinal images at different eye focus distances and light wavelengths.

FIG. 42 shows voxel resolution simulation results as irradiance distributions on a 50 μm×50 μm size detector surface located on the eye model retina. Only diffraction simulations were performed in order to show the effects of the distributed aperture design. The three main columns show results obtained with the three different source wavelengths, and the rows show the used eye focus distances. In each wavelength/focus distance case, a pair of simulated irradiance distributions is shown. The distributions on the left show retinal images obtained with the single rectangular aperture and the distributions on the right show the images obtained with the distributed aperture design.

When the simulated spots are compared over the used eye focus range, diffraction from the small apertures dominates imaging. All retinal spots are approximately the same in size through the whole eye focus range and there are no proper retinal focus cues available. FIG. 42 also shows that there are differences between diffracted spot sizes between source colors. In all cases the spots obtained with red light are larger than the spots simulated with green and blue spots have the smallest diameter. Overall, the diffraction blur helps in color mixing as the diffracted differently colored beams are fused together to a full-color imaging beam.

When the single aperture cases shown in FIG. 42 are compared to the distributed aperture cases, the resolution enhancing properties of the distributed apertures is evident.

The aperture cluster arrangement creates some diffracted secondary spots, but most of the light energy is concentrated in one central maximum. The distributed apertures may be able to create retinal images that have central spots that are about half the width of image spots generated with a single aperture. This may allow for doubling of spatial resolution where the aperture sizes are small.

In order to test the functionality of a varifocal mosaic lens (VFML), a set of simulations was performed with optical simulation software OpticsStudio 17. The display optical structure was placed at 350 mm distance from a simplified eye model that was constructed from a 4 mm aperture (pupil) and two ideal paraxial lenses that were used for adjusting the eye focal length (~17 mm) to the appropriate focus distance. Three focus distances were used with 0.7 diopter spacing: 390 mm, 500 mm and 800 mm distance from the eye model. A total of 9 simulations were made by first fixing the eye focus to one of the distances mentioned and then adjusting the VFML focal distance to the three example voxel projection distances.

Simulation sources were made with the µLED measurements of 2 µm square surface area. Only one green 550 nm source was used as the purpose was to demonstrate creation of single eye retinal focus cues. For this reason, LCD aperture sizes were fixed to the green filter aperture size of 9 µm×27 µm. The simulations were also made only with geometric raytracing and they did not include diffraction effects. However, because the diffraction patterns would only blur the spots further and e.g. fuse the four beam section spots together, geometric simulations were seen as adequate for showing the desired effect.

Figure 43:
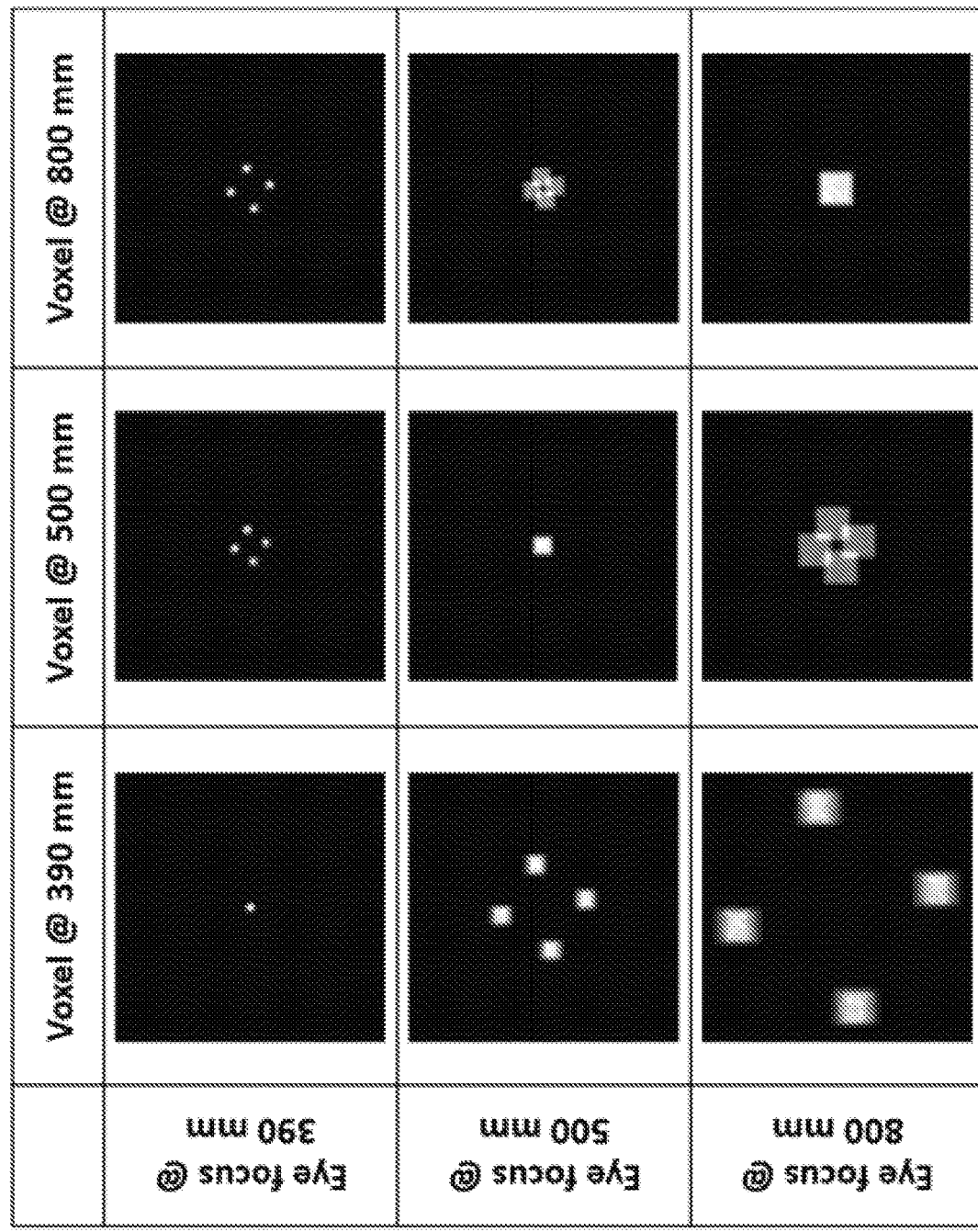
FIG. 43 depicts simulation results of retinal spots simulated for three different VFML and eye focus distances

FIG. 43 depicts simulation results of retinal spots simulated for three different VFML and eye focus distances. Simulation results are presented as a table of retinal images on a detector surface whose size is 80 µm×80 µm in all cases. The columns correspond to different voxel focus distances and the rows correspond to the eye focus distances. The table shows that when the eye is focused to the same position as the voxel, a single clear square image of the source is visible on the retina. The source image also increases in size when the voxel is moved further away from the display positioned at the 350 mm viewing distance. It is also clear that when the eye is not focused to the same depth than the voxel, a group of four source images become visible. These four spots come from the four beam sections created at the mosaic lens. As the beam sections meet at the voxel focus position, a single source image follows whenever the two distances are the same. In all simulated eye focus cases, the four out-of-focus spots occupy a larger surface area than the single image with correct focus. This means that the single eye would have an exact focus to the voxel only at the designated voxel focus distance. Overall, simulation results show that the method can be used for creating 3D images with crossing beams without substantial VAC.

What is claimed:

1. A display device comprising:
   a light-emitting layer comprising an addressable array of light-emitting elements;
   an optical layer overlaying the light-emitting layer, wherein the optical layer includes interlaced distributed lenses, comprising:
      a first distributed lens formed by lens regions that constitute a portion of a first lens having a first principal focus point and a second distributed lens formed by lens regions that constitute a portion of a second lens having a second principal focus point,
      wherein the lens regions of the first and of the second distributed lenses are capable of being interlaced without an overlap; and
   a spatial light modulator operative to provide control over which of the lens regions of the distributed lenses transmit light from the light-emitting layer to the outside of the display device, wherein lens regions that are allowed to transmit light focus the light at a position of a voxel to be displayed.

2. The display device of claim 1, wherein at least one lens region of the first distributed lens is located between at least two lens regions of the second distributed lens, the first and the second distributed lenses having different optical centers.

3. The display device of claim 1, wherein each of the distributed lenses includes at least two non-contiguous lens regions.

4. The display device of claim 1, wherein the spatial light modulator comprises a plurality of light-modulating pixels, and wherein each pixel of the spatial light modulator corresponds to no more than one of the lens regions.

5. The display device of claim 1, wherein at least one of the distributed lenses is a varifocal distributed lens.

6. The display device of claim 1, wherein the first lens and the second lens are circularly symmetric lenses.

7. The display device of claim 1, wherein the first distributed lens is a mirror image of the second distributed lens.

8. The display device of claim 1, wherein the interlaced distributed lenses have a different pitch in the horizontal and in the vertical directions.

9. A method of operating a display device, the method comprising:
   selectively emitting light from a light-emitting element in an addressable array of light-emitting elements, the emitted light being emitted toward an optical layer of interlaced distributed lenses, comprising:
      a first distributed lens formed by lens regions that constitute a portion of a first lens having a first principal focus point and a second distributed lens formed by lens regions that constitute a portion of a second lens having a second principal focus point,
      wherein the lens regions of the first and of the second distributed lenses are capable of being interlaced without an overlap; and
   operating a spatial light modulator to allow the emitted light to travel outside the display device through selected lens regions of the distributed lenses, wherein the selected lens regions focus the emitted light at a position of a voxel to be displayed.

10. The method of claim 9, wherein the selected lens regions include at least two non-contiguous lens regions within the first distributed lens.

11. The method of claim 9, wherein the first distributed lens has a first optical center, and wherein the first distributed lens is interlaced with a second distributed lens of the distributed lenses having a second optical center different from the first optical center.

12. The method of claim 11, wherein at least one lens region of the first distributed lens is located between at least two lens regions of the second distributed lens.

13. The method of claim 9, further comprising:
   determining a position of a voxel to be displayed; and
   selecting the light-emitting element and the first distributed lens based on the determined voxel position.

14. The method of claim 13, wherein the light-emitting element and the distributed lens are selected such that the light-emitting element and an optical center of the first distributed lens are substantially collinear.

15. The method of claim 9, wherein the first lens and the second lens are circularly symmetric lenses.

16. The method of claim 9, wherein the first distributed lens is a mirror image of the second distributed lens.

17. The method of claim 9, wherein the interlaced distributed lenses have a different pitch in the horizontal and in the vertical directions.

* * * * *